United States Patent [19]
Fujita et al.

[11] Patent Number: 6,084,329
[45] Date of Patent: Jul. 4, 2000

[54] VIBRATION MECHANISM HAVING A MAGNETIC SPRING

[75] Inventors: Etsunori Fujita; Yutaka Sakamoto; Hiroki Honda; Yasuhide Takata; Hiroki Ohshimo; Kazuyoshi Chizuka, all of Hiroshima, Japan

[73] Assignee: Delta Tooling Co., Ltd., Hiroshima, Japan

[21] Appl. No.: 09/079,232

[22] Filed: May 15, 1998

[30] Foreign Application Priority Data

May 15, 1997 [JP] Japan ..................................... 9-125398
May 1, 1998 [JP] Japan .................................... 10-121910

[51] Int. Cl.[7] .............................. H02K 7/09; H02K 5/24; F16M 13/00; B60G 17/02
[52] U.S. Cl. ........................... 310/90.5; 310/51; 248/566; 280/5.515
[58] Field of Search ................. 310/90.5, 51; 280/5.515, 280/124.1; 248/560, 562, 566; 296/65.02, 189, 180

[56] References Cited

U.S. PATENT DOCUMENTS

| | | | |
|---|---|---|---|
| 3,088,062 | 4/1963 | Hudimac | 318/128 |
| 3,609,425 | 9/1971 | Sheridan | 310/103 |
| 3,638,963 | 2/1972 | Van Leuwen | 280/124 |
| 3,770,290 | 11/1973 | Bottalico | 280/106.5 R |
| 3,842,753 | 10/1974 | Theodore et al. | 105/157 R |
| 3,941,402 | 3/1976 | Yankowski et al. | 280/124 R |
| 3,952,979 | 4/1976 | Hansen | 248/20 |
| 4,189,699 | 2/1980 | Burke, Jr. | 335/229 |
| 4,300,067 | 11/1981 | Schumann | 310/80 |
| 4,432,441 | 2/1984 | Kurokawa | 188/267 |
| 4,498,038 | 2/1985 | Malueg | 318/648 |
| 4,502,652 | 3/1985 | Breitbach | 244/75 A |
| 4,583,752 | 4/1986 | Breitbach | 280/6 R |
| 4,595,166 | 6/1986 | Kurokawa | 248/559 |
| 4,605,194 | 8/1986 | Binnig et al. | 248/559 |
| 4,664,352 | 5/1987 | Shibuki et al. | 248/562 |
| 4,710,656 | 12/1987 | Studer | 310/51 |
| 4,802,660 | 2/1989 | Engdahl | 267/182 |
| 4,913,482 | 4/1990 | Hanai et al. | 296/65.1 |
| 4,950,931 | 8/1990 | Goldenberg et al. | 310/36 |
| 4,969,624 | 11/1990 | Ustelenrsev et al. | 248/550 |
| 5,017,819 | 5/1991 | Patt et al. | 310/90.5 |
| 5,120,030 | 6/1992 | Lin et al. | 267/120 |
| 5,231,336 | 7/1993 | Van Namen | 310/12 |
| 5,415,140 | 5/1995 | Rigazzi | 123/197.1 |
| 5,419,528 | 5/1995 | Carter et al. | 248/585 |
| 5,467,720 | 11/1995 | Korenaga et al. | 248/566 |
| 5,487,533 | 1/1996 | Kurita et al. | 267/140.5 |
| 5,584,367 | 12/1996 | Berdut | 188/267 |
| 5,587,615 | 12/1996 | Murray et al. | 310/30 |
| 5,633,547 | 5/1997 | Coombs | 310/90.5 |

FOREIGN PATENT DOCUMENTS

| | | |
|---|---|---|
| 0 393 492 | 10/1990 | European Pat. Off. . |
| 31 17 377 | 12/1982 | Germany . |
| 36 01 182 | 7/1987 | Germany . |
| 58-89077 | 5/1983 | Japan . |
| 61-231871 | 3/1985 | Japan . |
| 63-149446 | 6/1988 | Japan . |
| 1-16252 | 1/1989 | Japan . |
| 434246 | 2/1992 | Japan . |
| 7217687 | 8/1995 | Japan . |
| 2 006 958 | 5/1979 | United Kingdom . |
| 2222915 | 3/1990 | United Kingdom . |
| 2 296 068 | 6/1996 | United Kingdom . |

*Primary Examiner*—Clayton LaBalle
*Attorney, Agent, or Firm*—Wenderoth, Lind & Ponack, L.L.P.

[57] ABSTRACT

A vibration mechanism having a magnetic spring includes a lower frame, an upper frame vertically movably mounted on the lower frame via a plurality of link mechanisms, and at least two permanent magnets mounted on the lower frame and the upper frame, respectively, with the same magnetic poles opposed to each other. A plurality of springs are connected to the link mechanisms to produce a lifting force of the upper frame. The total spring constant of the permanent magnets and the springs is partially set to a negative value or substantially zero.

2 Claims, 66 Drawing Sheets

FIG. 28A     FIG. 28B
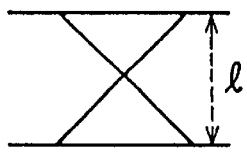
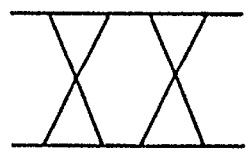
FIG. 28C
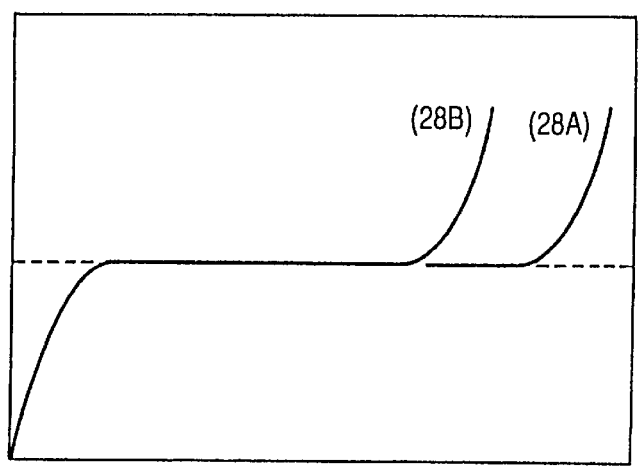
FIG. 28D
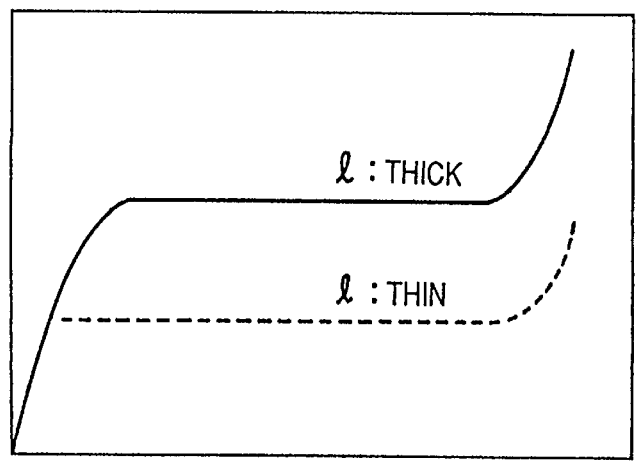

VIBRATION MECHANISM HAVING A MAGNETIC SPRING

BACKGROUND OF THE INVENTION

1. Field of the Invention

The present invention relates to a vibration mechanism applicable to a vibration isolator or an exciter and having a magnetic spring that includes a plurality of permanent magnets with the same (repulsive) magnetic poles opposed to each other.

2. Description of Related Art

Currently, various vibration models have been proposed and put to practical use. In general, vibration characteristics depend on the loaded mass and the input. It is considered that there is a correlation between the loaded mass and the curvature of load-deflection characteristics, and between the input and the hysteresis of load-deflection characteristics.

By way of example, metal springs, air springs or the like have been hitherto employed in a vibration isolator unit for suppressing vibrations transmitted to an automobile seat through a vehicle floor. When soft springs are used in the vibration isolator unit, the resonant point is shifted to a low-frequency side but the vibration transmissibility becomes high. To reduce the vibration transmissibility at the resonant point, it is necessary to enlarge the damping ratio of a damper. However, enlargement of the damping ratio results in an increase in the vibration transmissibility at high frequencies and, hence, conventional passive vibration models have a limit on their performance. Optimization under all the conditions requires an active control.

Recently, an active suspension seat has been proposed wherein an actuator mounted on an automobile seat works to active-control vibrations to enhance the ride comfort.

On the other hand, the exciter is generally used to investigate vibration characteristics of various articles or used for a vibration generating source for a machine in an amusement park.

Of the vibration mechanisms referred to above, the vibration isolator unit employing the metal springs, air springs or the like cannot enhance the ride comfort or the feeling of use by decreasing a vibration frequency of 2–12 Hz from among vibrations transmitted through the vehicle floor.

Furthermore, the active suspension seat is heavy and expensive and is also required to always activate the actuator. If the actuator is turned off, vibrations are transmitted to a seat occupant through the actuator, thus losing the ride comfort.

In addition, realization of a seat suspension unit having a low S.E.A.T. value (explained later) with a small stroke has been difficult, because the absorbency of vibration energy depends on the stroke.

On the other hand, the exciter requires an actuator for exciting or bouncing articles against the gravity thereof and is relatively complicated in construction and expensive.

SUMMARY OF THE INVENTION

The present invention has been developed to overcome the above-described disadvantages.

It is accordingly an objective of the present invention to provide an improved vibration mechanism having a magnetic spring that can be simplified in construction and can be readily manufactured at a low cost by appropriately setting a total spring constant of the magnetic spring and metal springs.

In accomplishing the above and other objectives, a vibration mechanism having a magnetic spring according to the present invention includes a lower frame, an upper frame vertically movably mounted on the lower frame, a plurality of link mechanisms for connecting the lower frame and the upper frame, at least two permanent magnets mounted on the lower frame and the upper frame, respectively, with the same magnetic poles opposed to each other, and a plurality of springs connected to the link mechanisms to produce a lifting force of the upper frame, wherein the total spring constant of the permanent magnets and the springs is partially set to a negative value or substantially zero.

A phase lag or reverse phase is caused in a low-frequency region by setting the total spring constant to be greater than about −1 kg/mm.

Each of the link mechanisms may include a parallel link wherein a vibration transmissibility is suppressed below 1 G/G at frequencies of 2 to 10 Hz.

The total spring constant can be set to be greater than about −2 kg/mm to accelerate return of one of the upper and lower frames to the other after the upper and lower frames have approached each other, thereby pushing up the upper frame against a gravity thereof.

The vibration mechanism according to the present invention can be used for an automobile suspension unit. In this case, the lower frame is mounted on a vibration-source side, and the vibration mechanism can be set so that the vibration transmissibility at frequencies of 2 to 10 Hz is below 1 G/G, while the vibration transmissibility in a high-frequency region over 10 Hz is about 1 G/G.

Preferably, each of the link mechanisms includes at least one X-shaped link, a plurality of Y-shaped links, or a pantograph-type link mechanism.

The total spring constant of the permanent magnets and the springs can be set below 2 kg/mm.

Each of the link mechanisms may include a parallel link.

Advantageously, the at least two permanent magnets are inclined to the upper frame and the lower frame, respectively, wherein a force acting in parallel with opposing surfaces of the at least two permanent magnets and generated when a vertical movement of the upper frame relative to the lower frame changes the opposing area of the at least two permanent magnets is utilized as the lifting force of the upper frame.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 28A is a schematic view of one X-shaped link mounted on each side of the vibration mechanism of FIG. 25;

FIG. 28B is a schematic view of two X-shaped links mounted on each side of the vibration mechanism of FIG. 25;

FIG. 28C is a graph showing the influence which the link and links of FIGS. 28A and 28B exert on the load-deflection curve;

FIG. 28D is a graph showing the influence which the height of the link or links of FIGS. 28A or 28B exerts on the load-deflection curve;

DETAILED DESCRIPTION OF THE PREFERRED EMBODIMENTS

This application is based on applications Nos. 9-125398 and 10-121910 filed May 15, 1997 and May 1, 1998, respectively, in Japan, the content of which is incorporated hereinto by reference.

A magnetic spring made up of at least two spaced permanent magnets with the same magnetic poles opposed to each other provides reversible load-deflection characteristics if the friction loss is small enough to be ignored.

Figure 1:
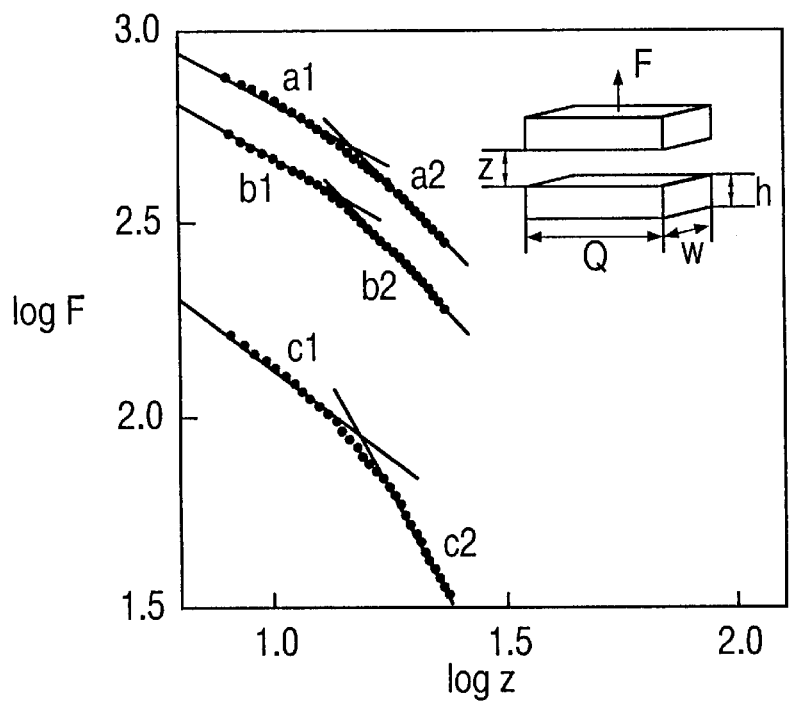
FIG. 1 is a graph showing a relationship between the surface-to-surface distance and the repulsive force of two permanent magnets having the same magnetic poles opposed to each other.

When two permanent magnets (Nd-Fe-B based) are opposed so as to repulse each other, they present a relationship between the surface-to-surface distance (z) and the repulsive force (F) as shown in FIG. 1. Table 1 shows the values of n (the exponent of z) corresponding to various magnet sizes. The repulsive force acting between the magnets varies from $k/z$ to $k/z^4$ according to the surface-to-surface distance. In view of input conditions, a region approximated by $k/z$ is used for the characteristics of a magnetic spring in a suspension seat. The repulsive force F is given by $k/z+F_0$ where $F_0$ is a constant, while $k=k(m)$, i.e., k varies depending on the loaded mass. Table 2 shows the value of k and that of $F_0$ both corresponding to various magnet sizes.

TABLE 1

|   | Q × w × h (mm) | n 1 | 2 |
|---|---|---|---|
| a | 75 × 75 × 25 | −0.67 | −1.22 |
| b | 75 × 75 × 15 | −0.71 | −1.28 |
| c | 50 × 50 × 15 | −0.93 | −2.16 |

TABLE 2

|   | Q × w × h (mm) | 1 $k_{(N-m)}$ | $F_{0(N)}$ | 2 $k_{(N-m)}$ | $F_{0(N)}$ |
|---|---|---|---|---|---|
| a | 75 × 75 × 25 | 4.27 | 224 | 7.31 | −24 |
| b | 75 × 75 × 15 | 3.21 | 142 | 5.39 | −37 |
| c | 50 × 50 × 15 | 1.67 | −8 | 2.26 | −56 |

Accordingly, when a weight is placed on an upper magnet, an equation of motion is given by:

$$m\ddot{z}+c\dot{z}-(k/z+F_0)+mg=F(t) \quad (1)$$

where m is the total mass of the weight ($m_1$) and the upper magnet ($m_2$), c a viscosity coefficient, and F(t) an external force. The second term is a damping term, while the fourth term is a gravity term. The balanced position $z_0$ of the magnet on which the weight is placed is given by:

$$-\left(\frac{k}{z_0}+F_0\right)+mg=0 \quad (2)$$

From Equations (1) and (2), an equation of motion with respect to an amount of deflection $\zeta=z-z_0$ is approximately expressed as follows with the balanced position $z_0$ as an origin, when $\zeta/z_0 \ll 1$ $$m\ddot{\zeta}+c\dot{\zeta}+k^1/\zeta=F(t) \quad (3)$$

Hereupon, $$k'=\frac{k}{z_0^2}=\frac{(mg-F_0)^2}{k} \quad (4)$$

From Equation (3), the natural frequency $\omega_0$ is given by:

$$\omega_0=\frac{1}{2\pi}\sqrt{\frac{(mg-F_0)^2}{mk}} \quad (5)$$

The relationship between the natural frequency and the spring constant is the reverse of the metal spring.

Hereupon, in a spring structure, a damping term with respect to a periodic external force is considered. When spring terms up to a term of the third degree is considered, Equation (3) is expressed as follows.

$$m\ddot{\zeta}+c\dot{\zeta}+a\zeta-b\zeta^2=F(t) \quad (6)$$

where $$a=\frac{(mg)^2}{k},\ b=\frac{(mg)^3}{k^2} \quad (7)$$

In a vibration region with a small amplitude, a constant repulsive force $b\zeta^2$ is continuously applied to a periodic external force to attenuate it.

Figure 2:
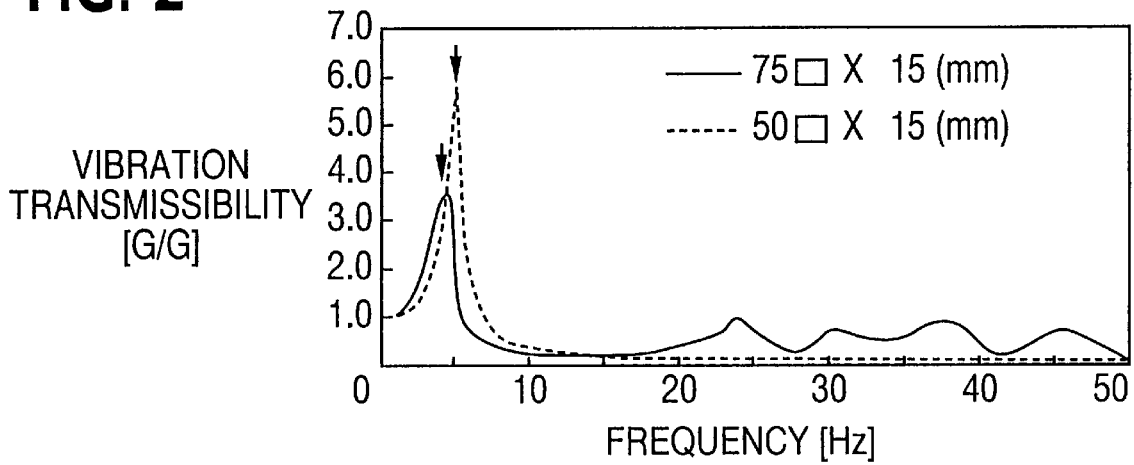
FIG. 2 is a graph showing dynamic characteristics of a magnetic spring made up of two permanent magnets when the magnet size was changed.

FIG. 2 depicts vibration characteristics when the loaded mass was 30 kg (constant) and when the opposing areas of the magnets were 50×50 mm² and 75×75 mm², respectively. When the loaded mass is identical, the distance between the magnets increases with an increase in the opposing area of the magnets. Because k becomes large, $\omega_0$ becomes small, as can be seen from Equation (5). That is, the resonant points (indicated by arrows in FIG. 2) are shifted to a low-frequency region and the vibration transmissibility decreases.

Figure 3:
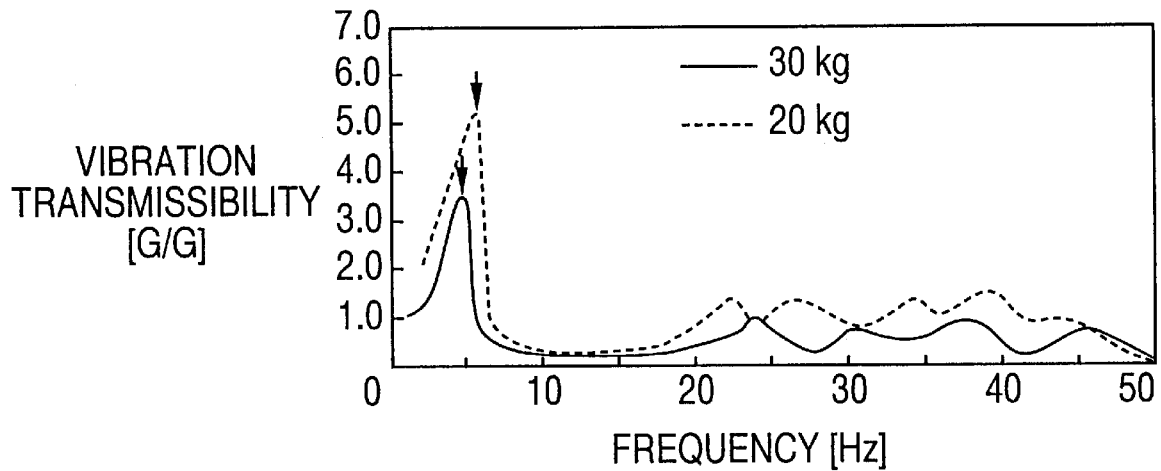
FIG. 3 is a graph similar to FIG. 2 when the loaded mass was changed.

FIG. 3 depicts vibration characteristics when the loaded masses were 30 kg and 20 kg, respectively, and when a magnet having an opposing area of 75×75 mm² and a thickness of 15 mm was used. The vibration transmissibility decreases with an increase in the loaded mass.

By making use of instability of the floating control system and by changing the static magnetic field with a small amount of input, static magnetic energy which the magnets have can be extracted, making it possible to realize a mechanical amplifier.

Figure 4:
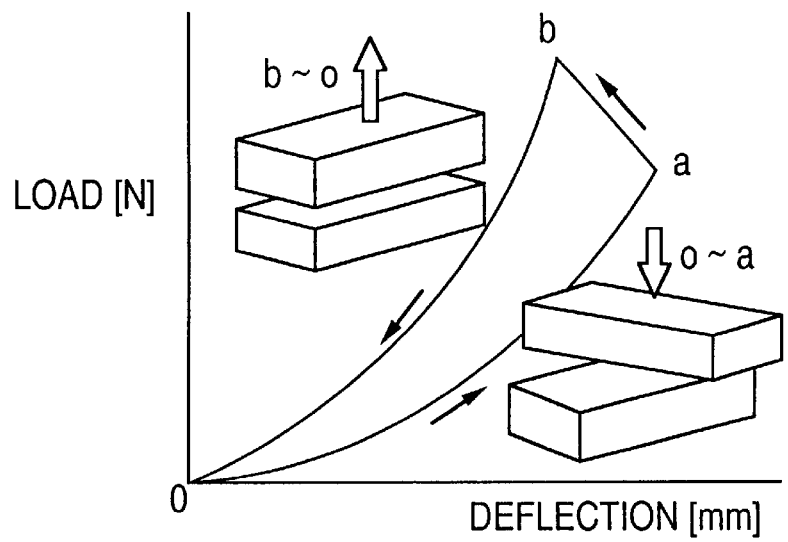
FIG. 4 is a graph showing a relationship between the load and the deflection when the geometric dimensions were changed by rotating one of the two permanent magnets relative to the other.

FIG. 4 depicts load-deflection characteristics when the geometric dimensions between the permanent magnets in a repulsion system are changed by an external force wherein the repulsive force at b→0 is made larger than that at 0→a. The maximum repulsive force is generated at a position slightly shifted from the position where the distance between the magnets is minimum.

In an area conversion model shown in FIG. 4 in which area conversion is conducted by rotating one of two spaced magnets relative to the other, an external force for shifting the state at a point (a) to the state at a point (b) is now considered. To simplify the calculation, a sliding-type model is considered in which the area conversion rate varies linearly.

Figure 5:
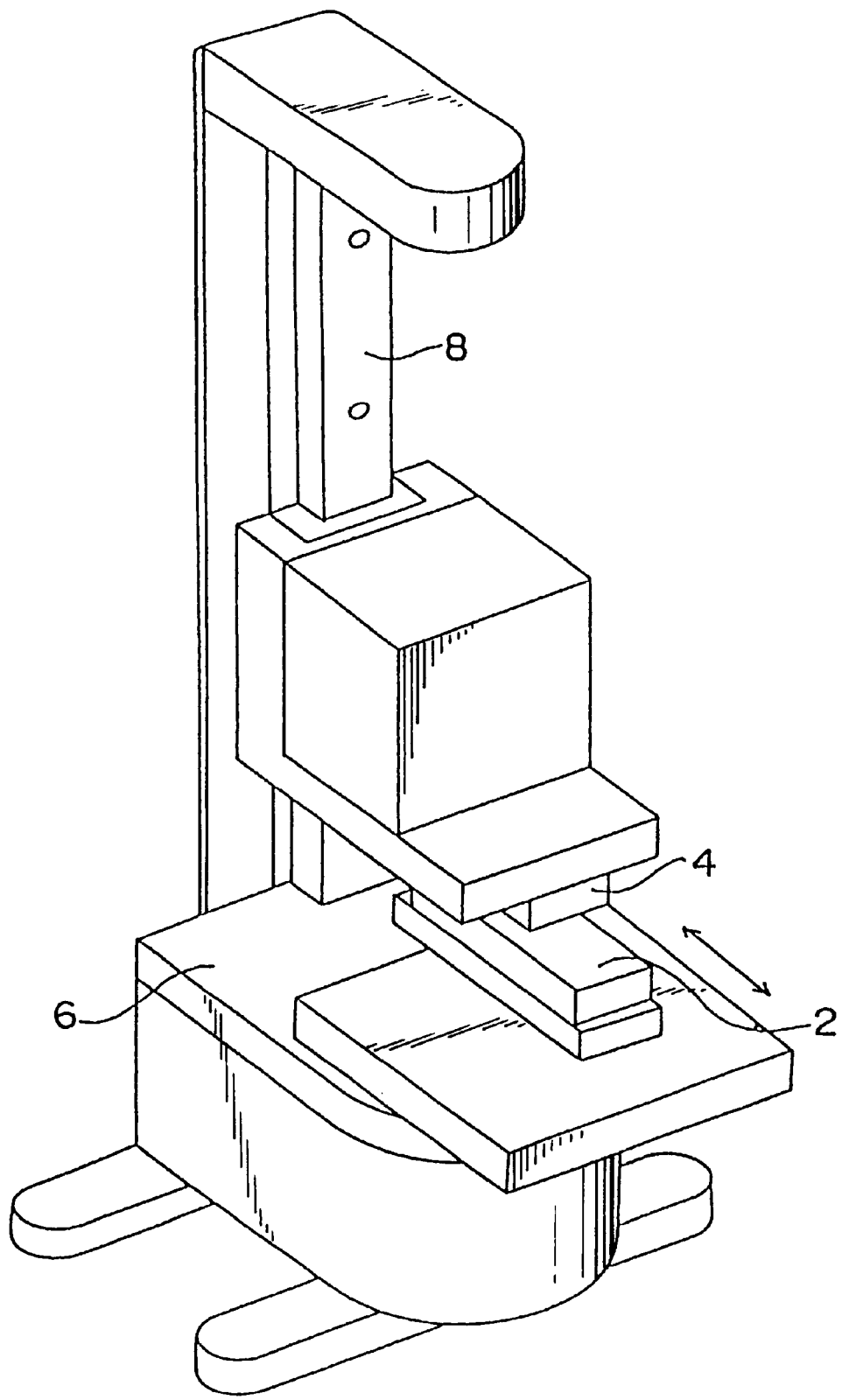
FIG. 5 is a perspective view of a sliding-type model.

FIG. 5 depicts the sliding-type model including a lower permanent magnet 2 horizontally slidably mounted on a base 6 and an upper permanent magnet 4 vertically slidably mounted on a slider 8.

As for rare-earth magnets, the internal magnetic moment is not easily influenced by the magnetic field, and the strength of magnetization on a demagnetization curve hardly changes. Accordingly, the value of strength of magnetization is maintained substantially as same as that of saturation magnetization. When forces are calculated using a charge model in which a magnetic load is regarded as being uniformly distributed on its surface, x- and y-components Fx, Fy of the repulsive force are given by:

$$F_\alpha = \int_{-1}^{1}\int_{-d}^{d}\int_{-(\xi+1)}^{\xi-1}\int_{-d}^{d}[-2f_\alpha^{(1)}+f_\alpha^{(2)}+ \quad (8)$$

$$f_\alpha^{(3)}]\,dx_1\,dx_2\,dy_1\,dy_2,\ (\alpha=x,y)$$

Figure 6:
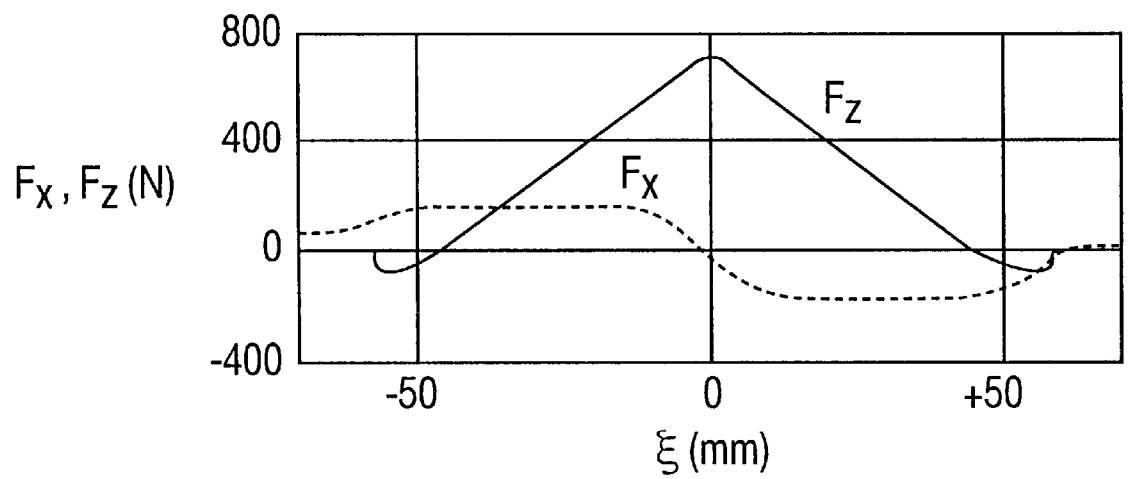
FIG. 6 is a graph showing a relationship between input and output when one of the two permanent magnets was caused to slide relative to the other with the distance between the two magnets kept 3 mm.

FIG. 6 is a graph obtained by the calculation and indicating a relationship between Fx (dotted line) and Fy (solid line) when the distance between the magnets is kept 3 mm, and the condition of the magnets is changed from a completely slipped condition (x=−50 mm) to a completely lapped one (x=0 mm), and again to the completely slipped one (x=50 mm). The calculation results agree well with experimental values within an error of 5 percent.

Figure 7:
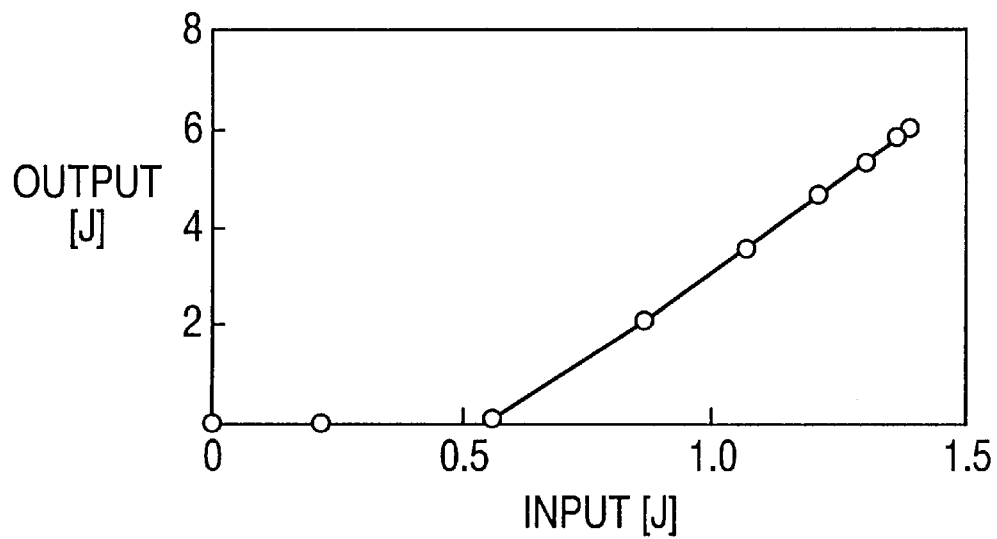
FIG. 7 is a graph showing experimental values of the input and the output in the sliding-type model.

FIG. 7 shows experimental values of input and output in a sliding-type principle model provided with magnets having an opposing area of 50×25 mm$^2$ and a thickness of 10 mm, wherein the friction loss was reduced as small as possible. An appropriate selection of an operation point can derive an output of 6 joules from an input of 1 joule. Similarly, the case where a sliding-type model having an area conversion rate of 80% (opposing area: 250→1250 mm$^2$) is changed to a rotating-type model having an area conversion rate of 50% (625→1250 mm$^2$), in which the area conversion is nonlinearly achieved, is described.

Figure 8:
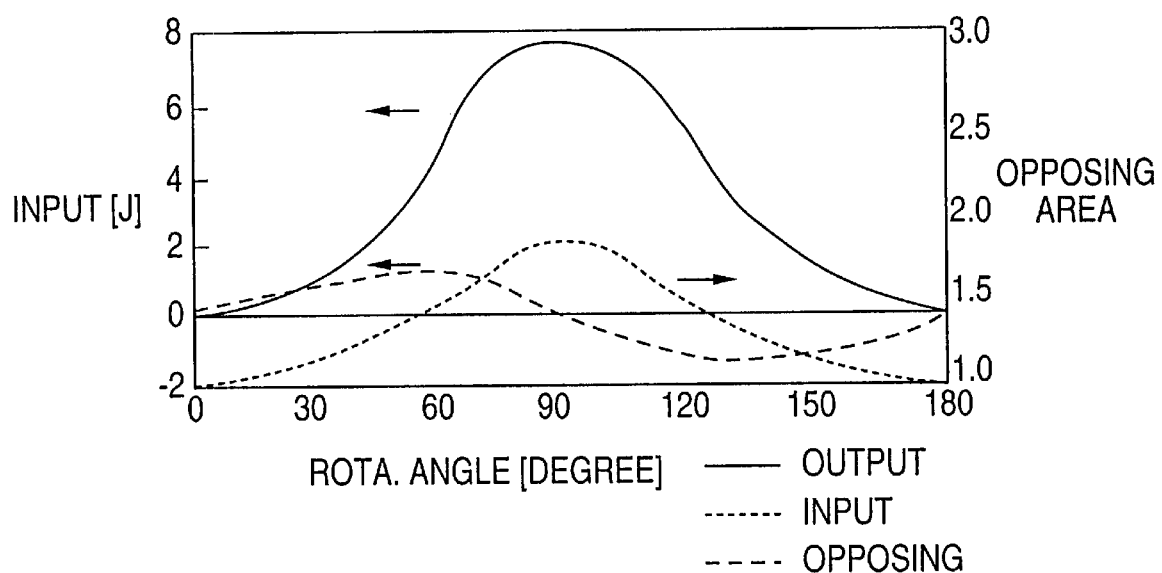
FIG. 8 is a graph showing experimental values of the input and the output relative to the rotational angle in the rotating-type model.
Figure 9:
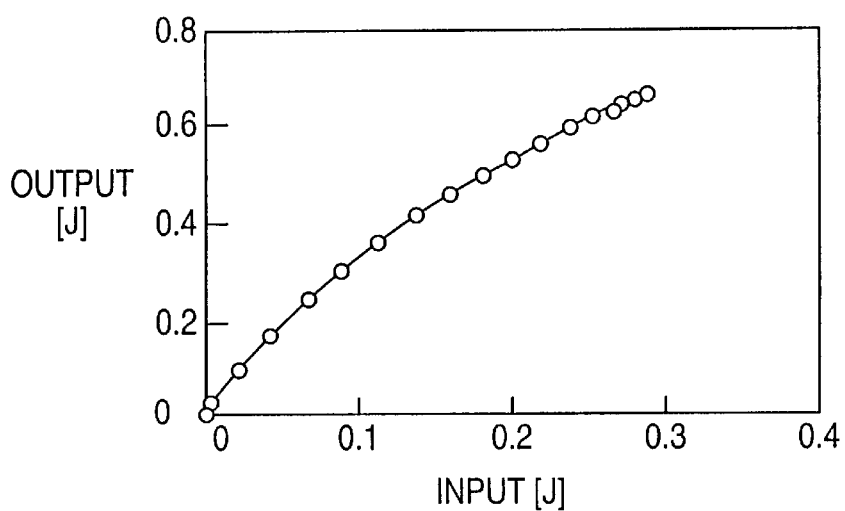
FIG. 9 is a graph showing experimental values of the input and the output in the rotating-type model.

FIGS. 8 and 9 show experimental values of input and output in a rotating-type principle model. In this case also, the output is a little greater than twice the input. These energy extracting mechanisms employing the permanent magnets derive an output from an input required for imparting motion to the magnets plus a change in static magnetic energy caused by such a motion, thus producing greater energy apparently.

Experiments were made using an electromotive-type triaxial exciter having a total stroke of 60 mm and a hydraulic uniaxial exciter having a total stroke of 100 mm. A subject was seated on various seats mounted on each of the exciters and his or her whole body was subjected to vertical vibrations. To cause the vibrations, LOG-SWEEP sinusoidal waves with a constant acceleration of 0.3 G and a constant amplitude of 5 mm and input spectrums EM4 and EM6 employed in a committee meeting associated with standard revision of ISO7096:1982 were used.

Figure 10A:
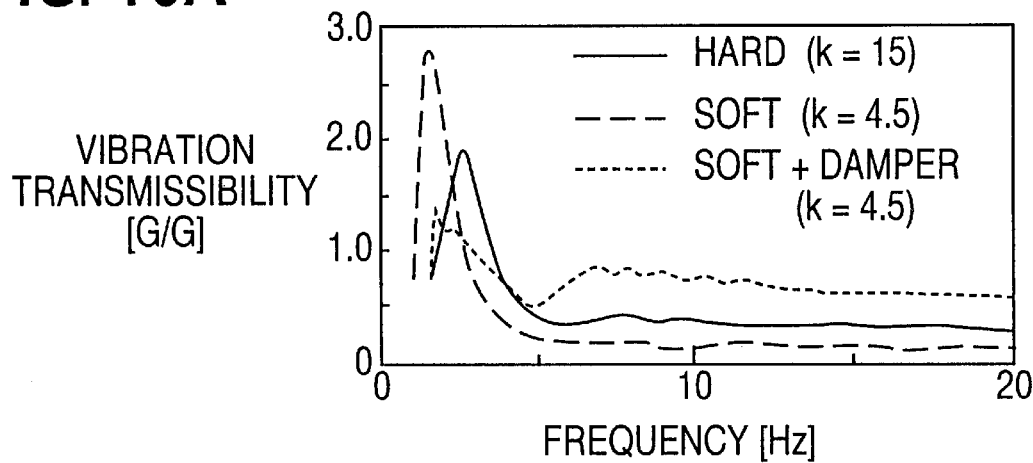
FIG. 10A is a graph showing dynamic characteristics of vibration isolator units used for suspension seats when metal springs were employed.
Figure 10B:
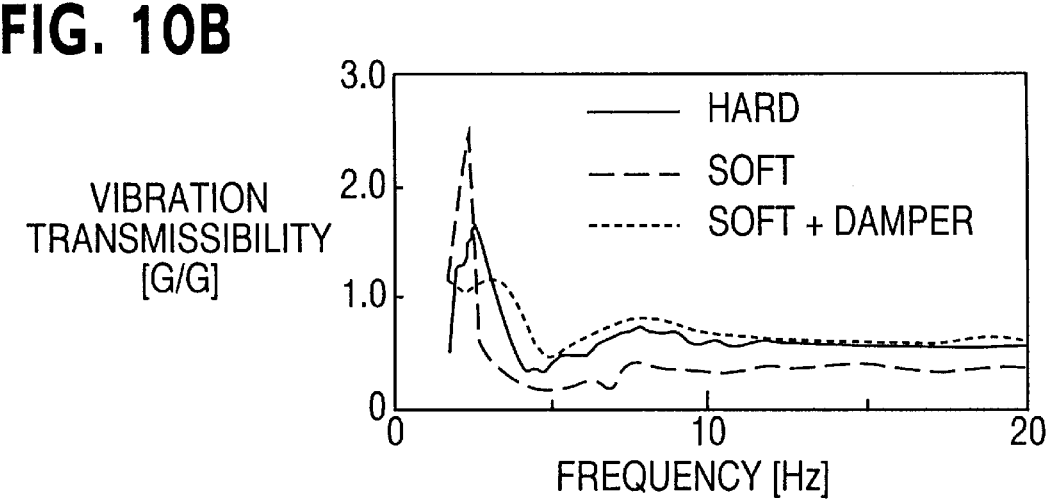
FIG. 10B is a graph similar to FIG. 10A when air springs were employed.
Figure 10C:
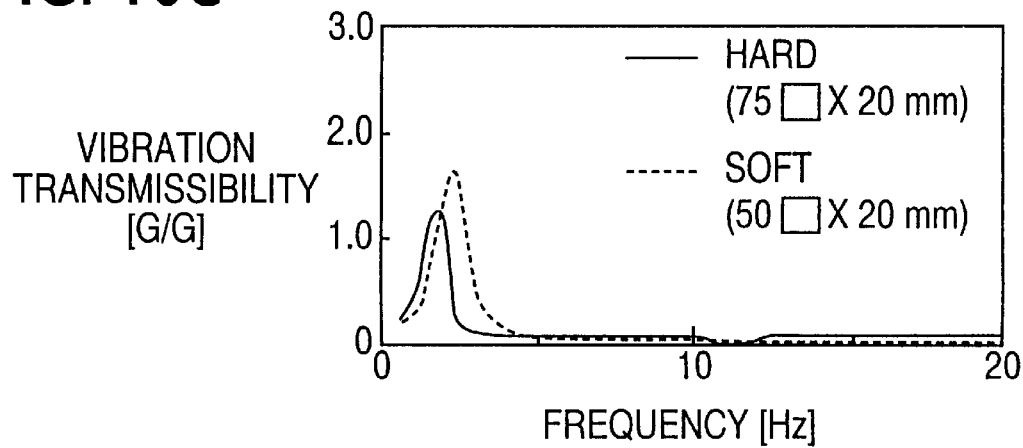
FIG. 10C is a graph similar to FIG. 10A when the magnetic spring was employed.

FIGS. 10A, 10B and 10C depict vibration characteristics of several mechanisms employed in vibration isolator units for suspension seats. FIGS. 10A and 10B depict the vibration characteristics of conventional mechanisms employing metal springs and air springs, respectively, while. FIG. 10C depicts those of a magnetic spring mechanism for use in a suspension seat.

As shown in FIGS. 10A–10C, the vibration transmissibility presented by the conventional mechanisms is high as a whole but the vibration transmissibility at a resonant frequency can be reduced by the provision of a damper, while the vibration transmissibility presented by the magnetic spring mechanism is relatively low at both a high-frequency region and a resonant frequency without the provision of any damper.

Figure 11:
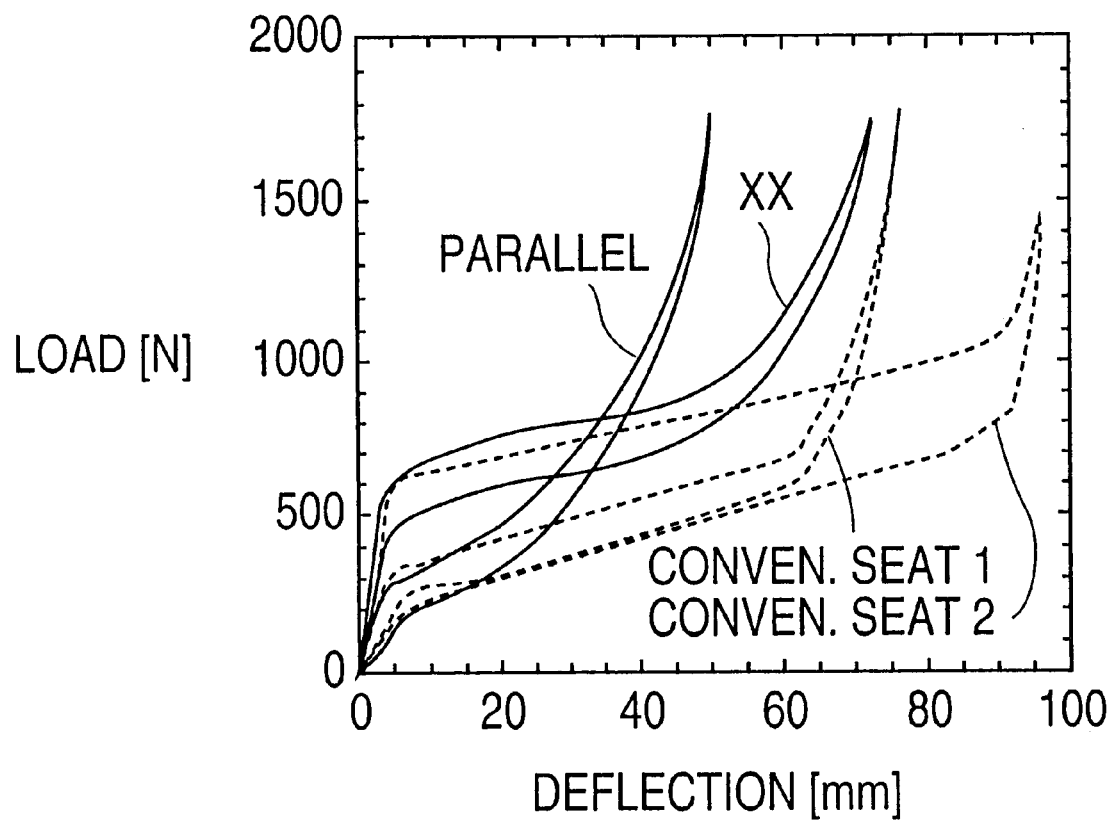
FIG. 11 is a graph showing static characteristics of suspension seats according to the present invention and those of conventional suspension seats.

FIG. 11 depicts static characteristics (dotted lines) of conventional seats for use in automotive vehicles or construction machines and those (solid lines) of suspension seats employing the magnetic spring. The structure of an XX link and that of a parallel link are explained later.

As shown in FIG. 11, the suspension seats employing the magnetic spring present high damping characteristics at a resonant point with a small stroke by making use of the independence of the loaded mass that the magnetic spring has, i.e., by applying the spring constant k=k(m), which varies depending on the mass, to the independence of input. Such suspension seats are substantially independent of an input ranging from 0.3 G to 0.6 G and exhibit high impact absorbency. By making good use of the characteristics of the magnetic spring in which even a high spring constant makes the resonant frequency low, a reduction in space and high vibration absorbency, which have not been hitherto achieved by metal springs, can be realized.

Figure 12:
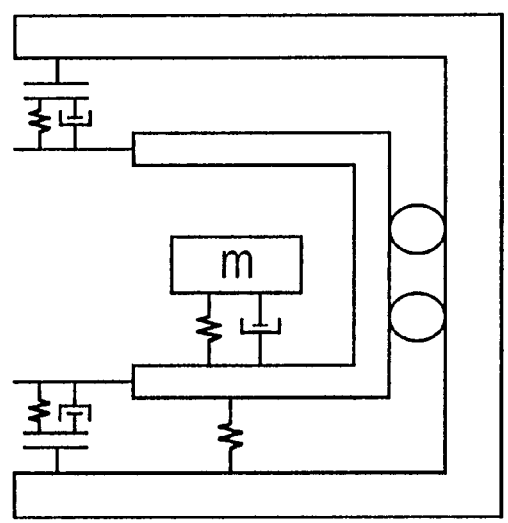
FIG. 12 is a schematic view of a vibration model of a magnetic spring unit.
Figure 13:
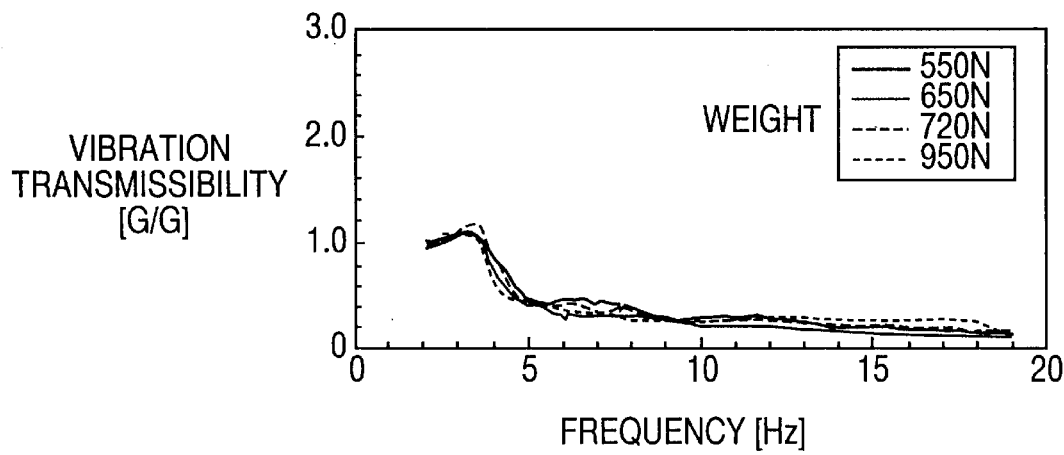
FIG. 13 is a graph showing dynamic characteristics of a magnetic spring model employing parallel links.
Figure 14:
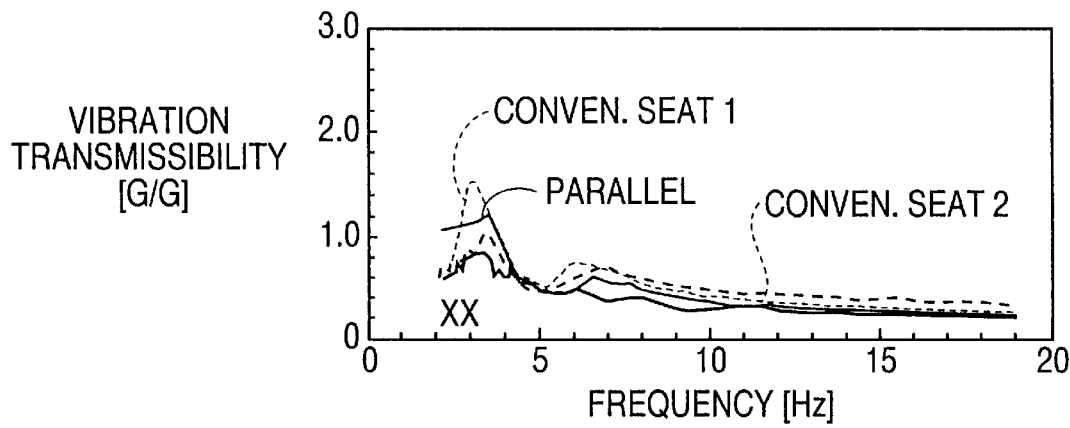
FIG. 14 is a graph showing dynamic characteristics of a suspension seat according to the present invention and those of conventional seats when the amplitude was constant.
Figure 15:
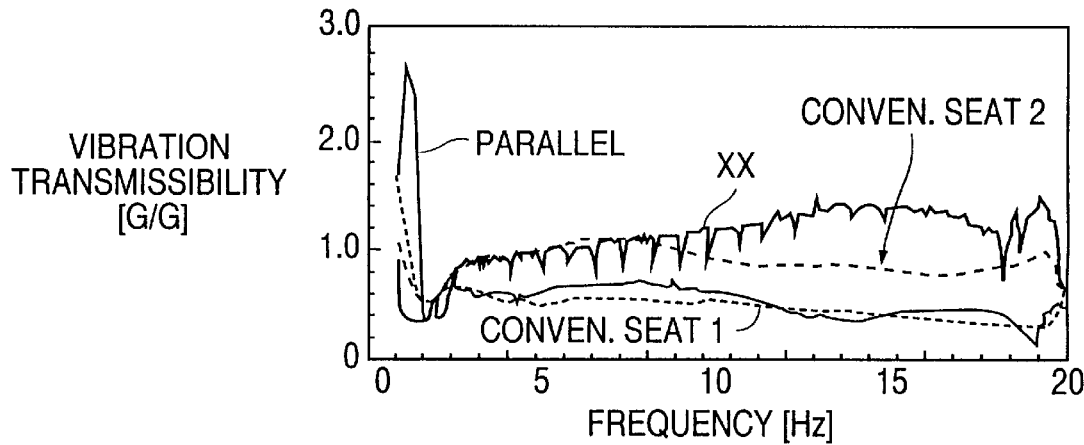
FIG. 15 is a graph similar to FIG. 14 when the acceleration was constant.

FIG. 12 schematically depicts a vibration model of a magnetic spring unit, while FIG. 13 depicts vibration characteristics of a magnetic spring unit employing parallel links without any adjustment of a weight. As shown in FIG. 13, this magnetic spring unit absorbs a difference in loaded mass and is substantially independent of the loaded mass. FIG. 14 depicts vibration characteristics of conventional suspension seats and those of the suspension seats employing the magnetic spring unit when a LOG-SWEEP sinusoidal wave with a constant amplitude of 5 mm was used. FIG. 15 depicts vibration characteristics of the conventional suspension seats and those of the suspension seats employing the magnetic spring unit when a LOG-SWEEP sinusoidal wave with a constant acceleration of 0.3 G was used. The parallel links require no weight adjustments and comply with high frequencies and high accelerations, while the XX links require weight adjustments and comply with low frequencies and large amplitudes. What is common to both the links is having presented superior vibration isolation characteristics with half the stroke of the conventional structures.

Figure 16:
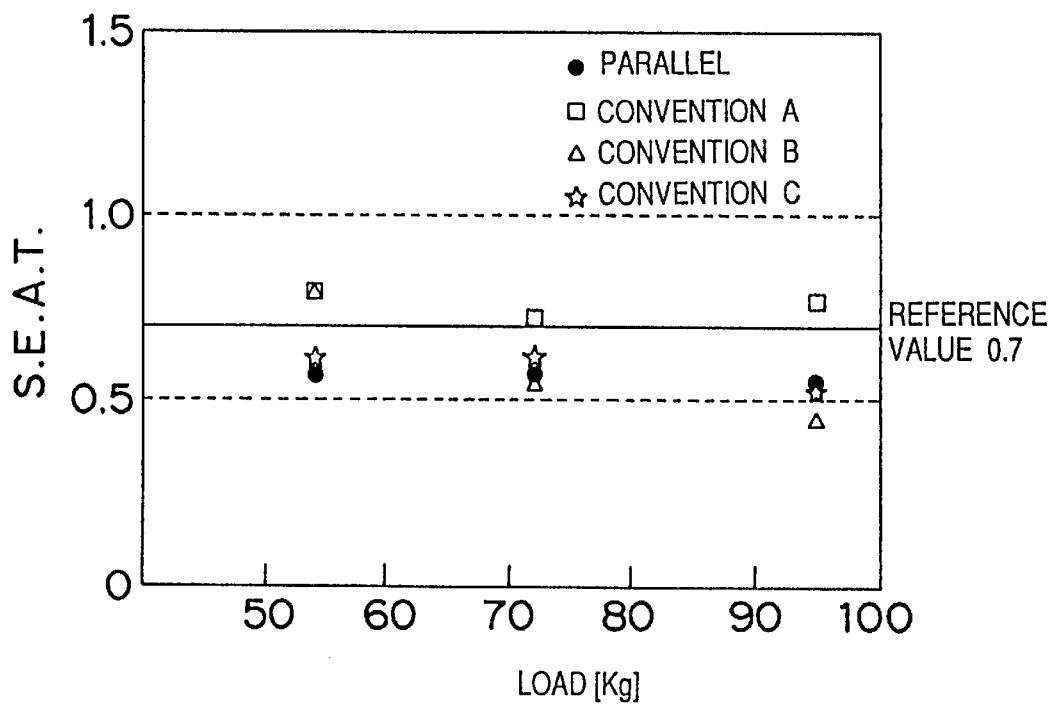
FIG. 16 is a graph showing S.E.A.T. values of the magnetic spring model employing the parallel links and those of conventional structures.
Figure 17:
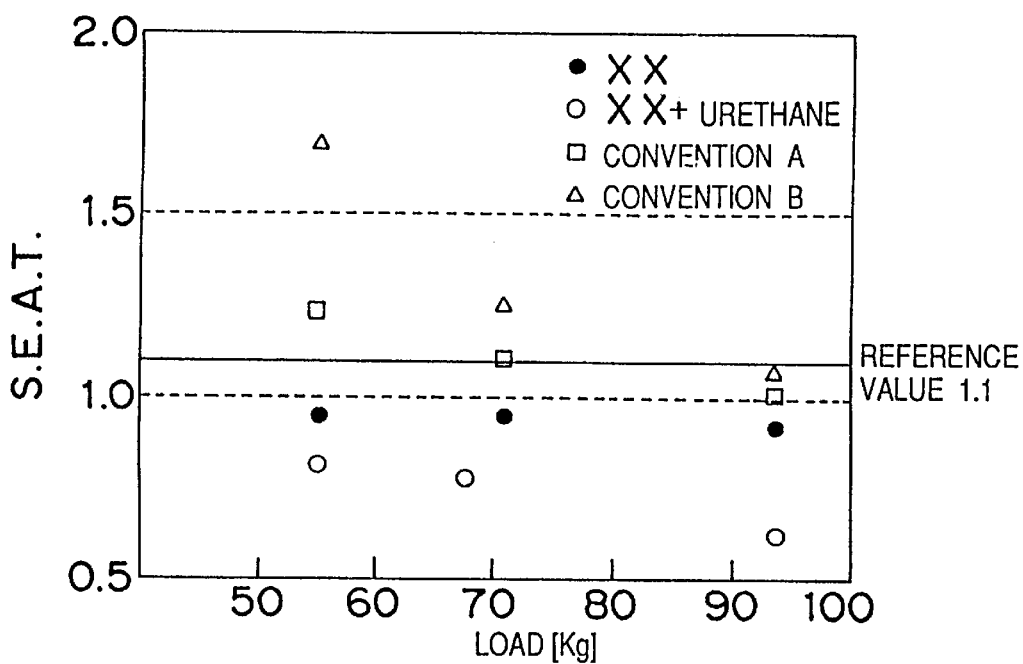
FIG. 17 is a graph similar to FIG. 16, but showing S.E.A.T. values of a magnetic spring model employing XX-links and those of conventional structures

FIGS. 16 and 17 depict comparative data of the conventional structures and the magnetic spring models when the input spectrums EM4 and EM6 employed in a committee meeting associated with standard revision of ISO7096:1982 were used. These data reveal that in spite of a reduction in stroke, the magnetic spring models reduce the S.E.A.T. value and provide high vibration isolation effects compared with the conventional structures. In general, the conventional structures absorb vibration energy by making use of elasticity of a material or substance, while the magnetic spring models are of a vibration-energy isolation structure utilizing reverse-phase vibrations by the magnetic spring and inertia of an object. Because of this, the magnetic spring models are hardly affected by frequencies and can reduce vibration energy with a small stroke.

Furthermore, a vibration isolator mechanism employing both the non-linear magnetic spring and the linear metal springs has dynamic damping effects, while a power-doubling mechanism utilizing negative damping characteristics can be used for a mechanical amplifier that derives a large output from a small input. In applications where input and output characteristics of negative damping are applied to a vertical exciter, the exciter can move a loaded mass of 70 kg vertically at frequencies of 3–20 Hz and at 0.1 G using a drive input of 8.5 kg by a voice coil motor. Also, the magnetic spring models enable non-contact power transmission to a structure having separation walls and are used for a flexible actuator capable of absorbing vibration energy.

Embodiments of the vibration mechanism employing the magnetic spring are explained hereinafter with reference to the drawings.

Figure 18:
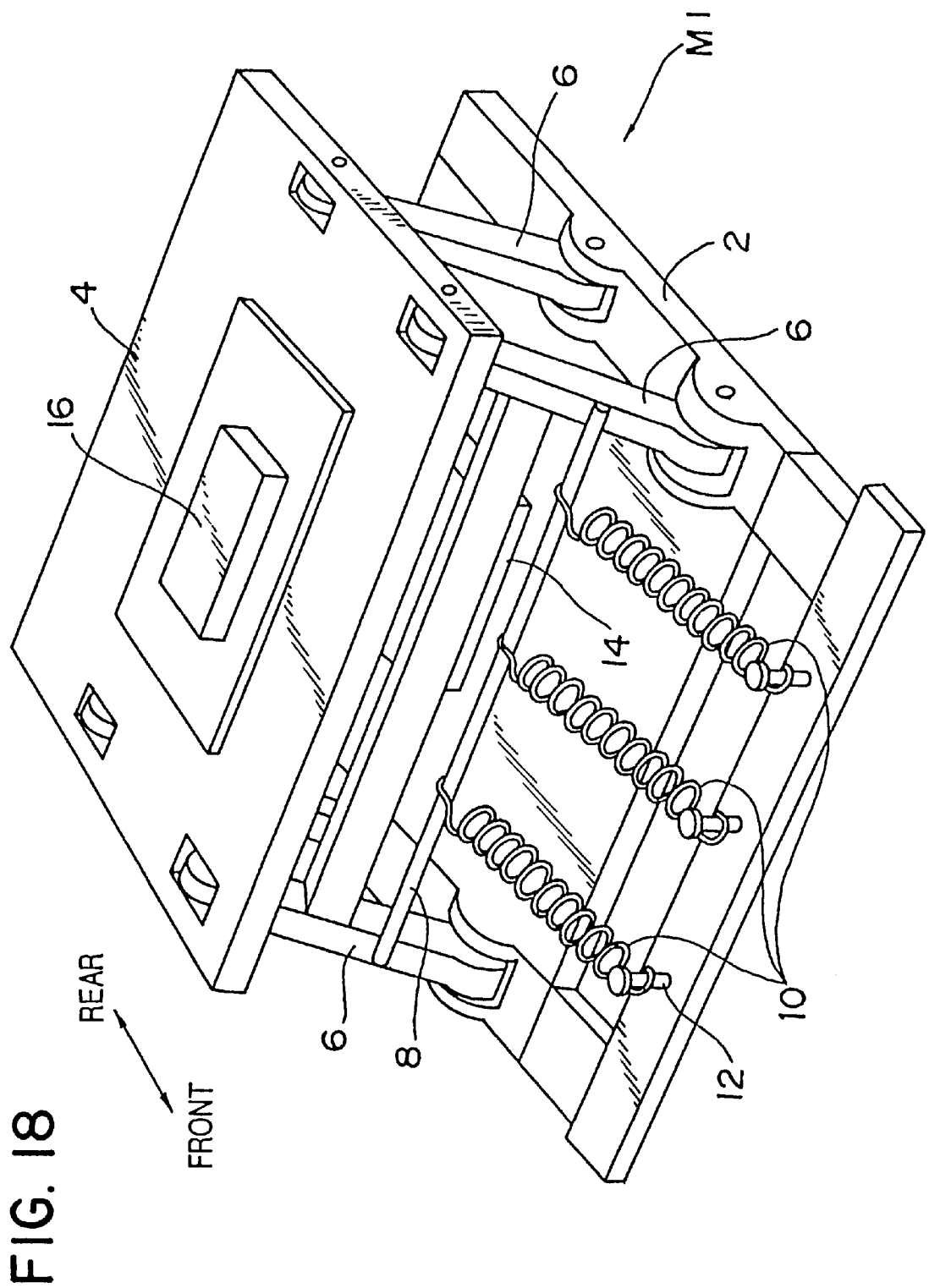
FIG. 18 is a perspective view of a vibration mechanism having a magnetic spring according to a first embodiment of the present invention.

FIG. 18 depicts a vibration mechanism M1 having a magnetic spring according to a first embodiment of the present invention. As shown therein, the vibration mechanism M1 includes a lower frame 2 mounted on a floor or the like on the side of a vibration source and an upper frame 4 vertically movably mounted on the lower frame 2 via link mechanisms. The link mechanisms are disposed on respective sides of the vibration mechanism M1 and each of them includes a parallel link having two levers 6. Each of the two levers 6 has a lower end pivotally mounted on the lower frame 2 and an upper end pivotally mounted on the upper frame 4.

Of the levers 6 constituting the parallel links, two front levers 6 are connected to each other via a rod 8, to which one end of each of a plurality of coil springs 10 is connected. The other end of each coil spring 10 is connected to a pin secured to the lower frame 2. By so doing, the coil springs 10 produce a lifting force of the upper frame 4.

The vibration mechanism M1 further includes a first permanent magnet 14 secured to the lower frame 2 at a rear center thereof and a second permanent magnet 16 secured to the upper frame 4 substantially at a center thereof with the same magnetic poles opposed to each other. The repulsive force of the two permanent magnets 14 and 16 acts to lift the upper frame 4.

Figure 19:
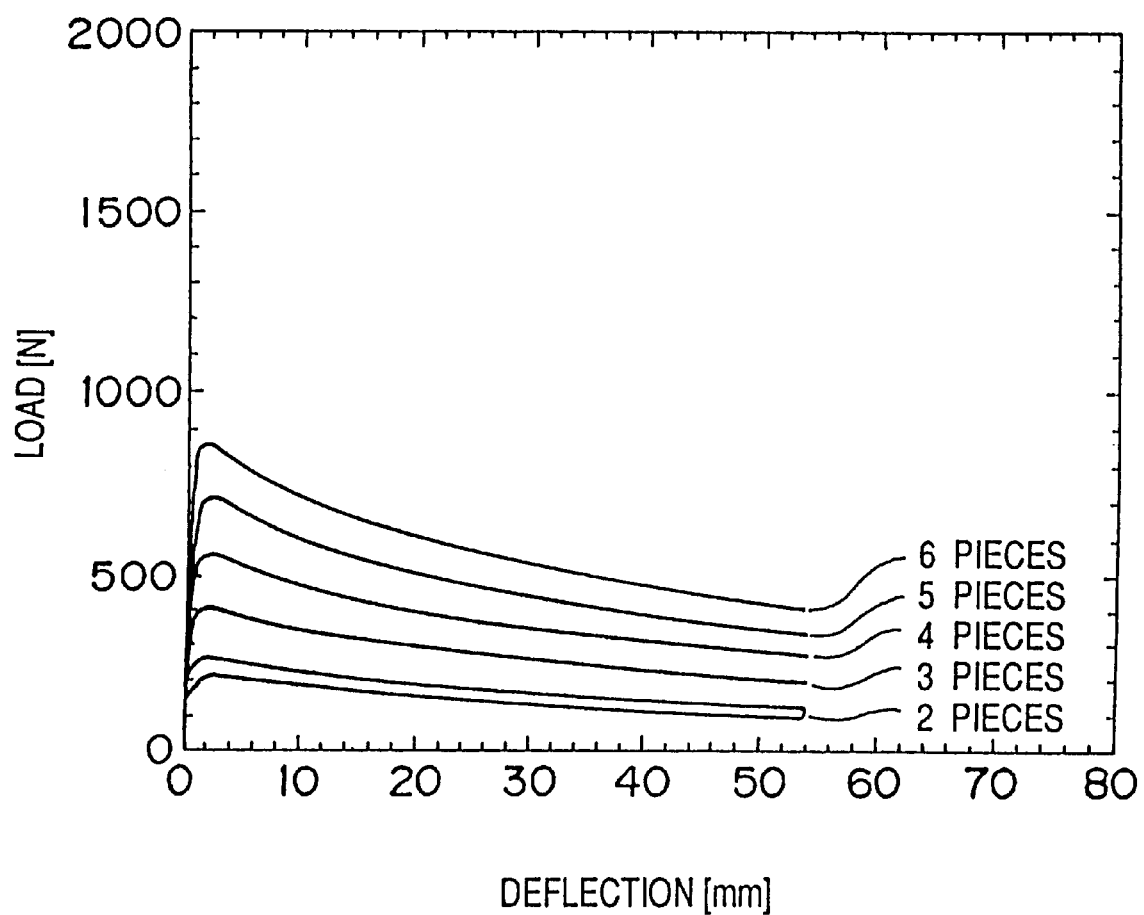
FIG. 19 is a graph showing static characteristics of only coil springs in the vibration mechanism of FIG. 18.

FIG. 19 is a graph showing static characteristics of only the coil springs 10 in the vibration mechanism of FIG. 18 with the first and second magnetic springs 14 and 16 removed, and particularly showing the lifting force of the upper frame 4 when the number of coil springs 10 is changed.

When a mass is loaded on the upper frame 4, the lifting force makes the spring constant be substantially 0 under a statically balanced condition. Furthermore, when external input moves the loaded mass at a certain speed or accelerates it, the coil springs 10 act to lower the loaded mass, inducing vibration of the loaded mass. That is, the lowering force produced by the coil springs 10 is responsive to very small vibration energy and creates a condition in which a phase lag or reverse phase is apt to occur.

As can be seen from the graph of FIG. 19, the vibration mechanism M1 of FIG. 18 has, when the permanent magnets 14 and 16 are removed therefrom, a negative spring constant with which the load that can be supported by the coil springs 10 decreases with an increase in deflection. As the number of coil springs 10 increases, the load increases and the minimum value of the negative spring constant decreases (the absolute value of the spring constant increases).

Figure 20:
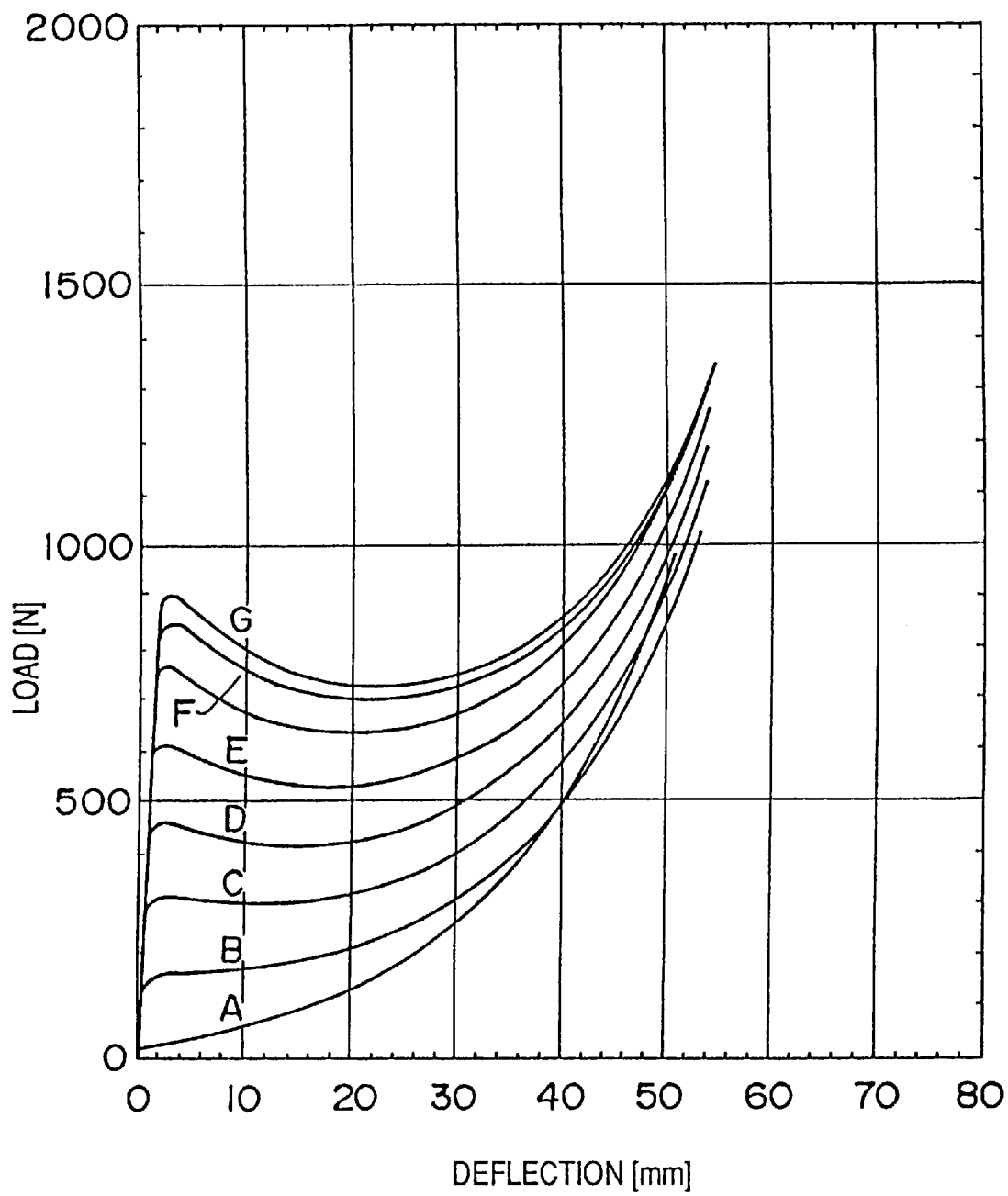
FIG. 20 is a graph showing static characteristics of only permanent magnets and those of the permanent magnets plus the coil springs in the vibration mechanism of FIG. 18.

FIG. 20 is a graph showing static characteristics of the vibration mechanism M1 of FIG. 18 having only the permanent magnets 14 and 16 with the coil springs 10 removed, and also showing static characteristics in which static characteristics of the permanent magnets 14 and 16 and those of only the coil springs 10, shown in FIG. 19, are added. In FIG. 20, a curve A shows static characteristics of only the permanent magnets 14 and 16, while curves B, C, D, E, F, and G show static characteristics of the coil springs 10 when the number thereof is increased from one to six.

As can be seen from the graph of FIG. 20, when the coil springs 10 are removed, the vibration mechanism M1 of FIG. 18 has a positive spring constant with which the load that can be supported increases with an increase in deflection. Under the condition of FIG. 18 in which the coil springs 10 have been attached, a portion having a spring constant of 0 appears in the static characteristics. Also, as the number of coil springs 10 increases, the negative spring constant gradually decreases, and the minimum spring constant of the curve G is set to about −1 kg/mm.

Figure 21:
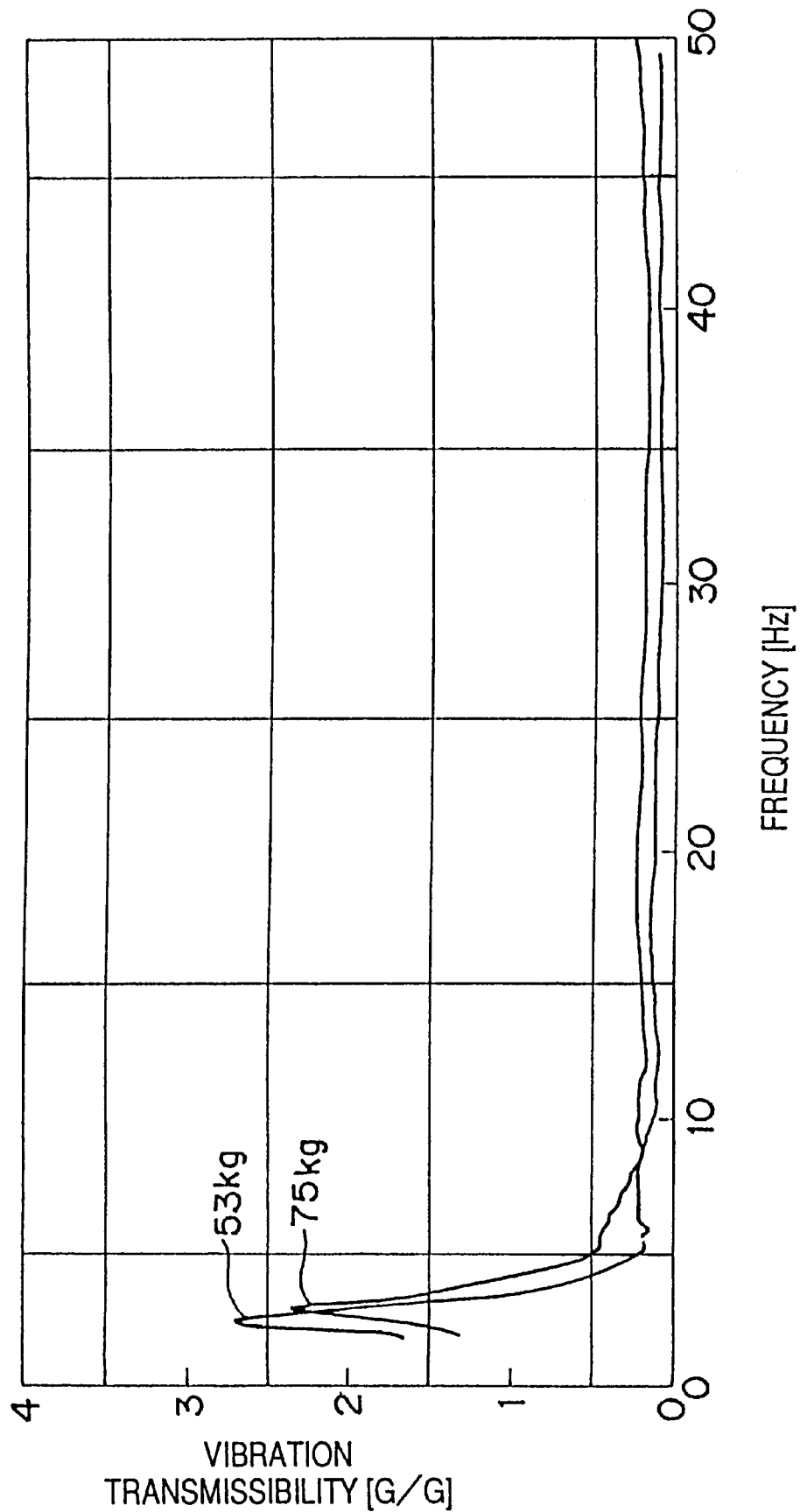
FIG. 21 is a graph showing dynamic characteristics of only the permanent magnets in the vibration mechanism of FIG. 18.

FIG. 21 depicts dynamic characteristics of the vibration mechanism M1 of FIG. 18 having only the permanent magnets 14 and 16 and no coil springs. The permanent magnets 14 and 16 used had a size of 75 mmL×75 mmW×20 mmH, while subjects weighed 53 kg and 75 kg. As can be seen from this graph, because the vibration transmissibility exceeds 2.5 G/G at a low-frequency region, the vibration isolation performance of only the permanent magnets 14 and 16 is not sufficient.

Figure 22:
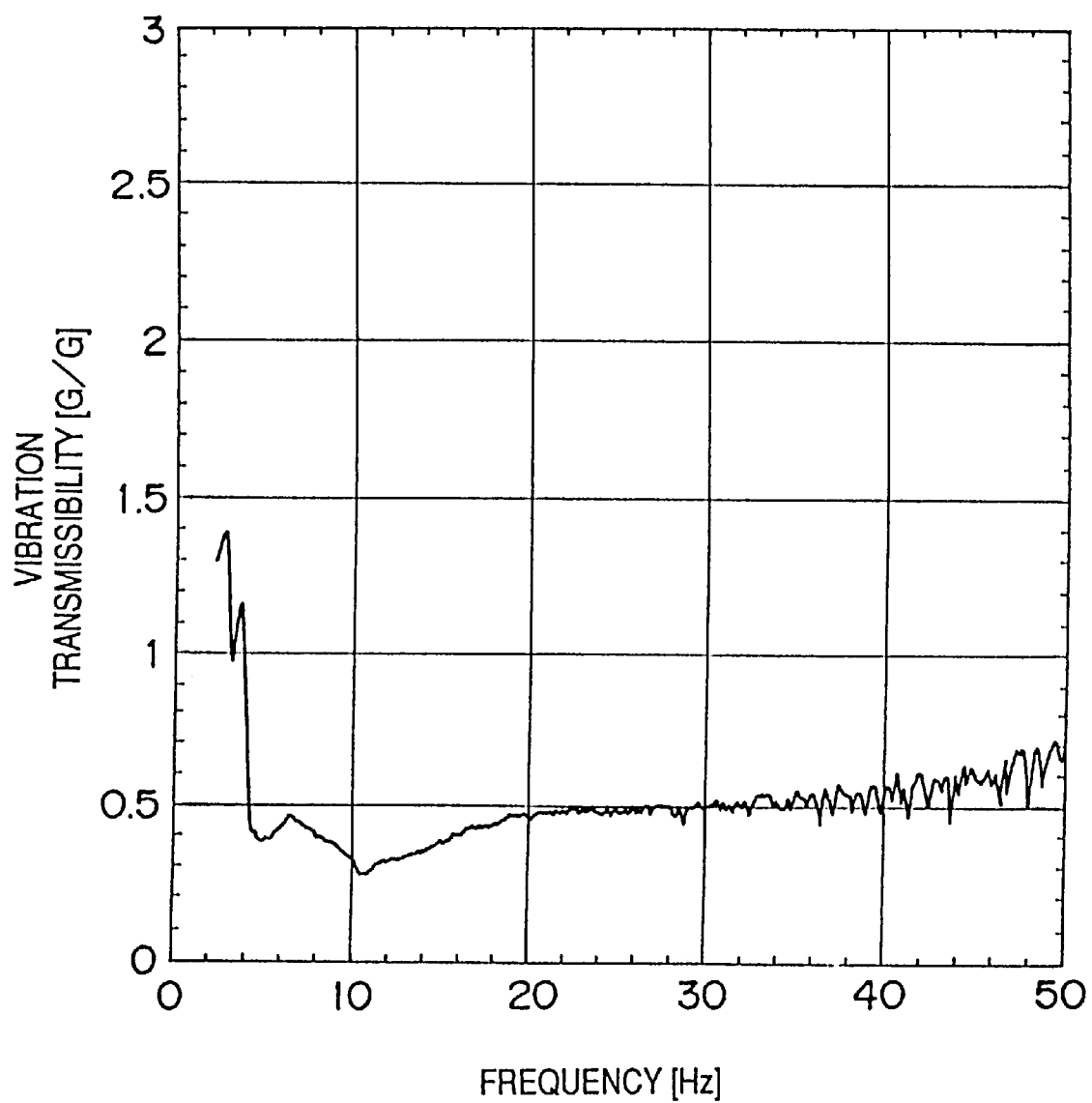
FIG. 22 is a graph showing dynamic characteristics in the case where a stopper is mounted in the vibration mechanism having the dynamic characteristics of FIG. 21.

FIG. 22 depicts dynamic characteristics (subject: 55 kg) of a mechanism in which a stopper was attached to the vibration mechanism having the dynamic characteristics of FIG. 21. As shown therein, a peak in vibration transmissibility at the low-frequency region is suppressed below 1.5 G/G, and collision damping is caused by the stopper. The S.E.A.T. value at that time was 1.2.

The S.E.A.T. value is a value represented by the following formula.

$$S.E.A.T.=awS_{12}/awP_{12}$$

$awS_{12}$: effective value of corrected vibration acceleration on a seat at a frequency of $f_1-f_2$, and $awP_{12}$: effective value of corrected vibration acceleration of a vibration platform at a frequency of $f_1-f_2$.

Figure 23:
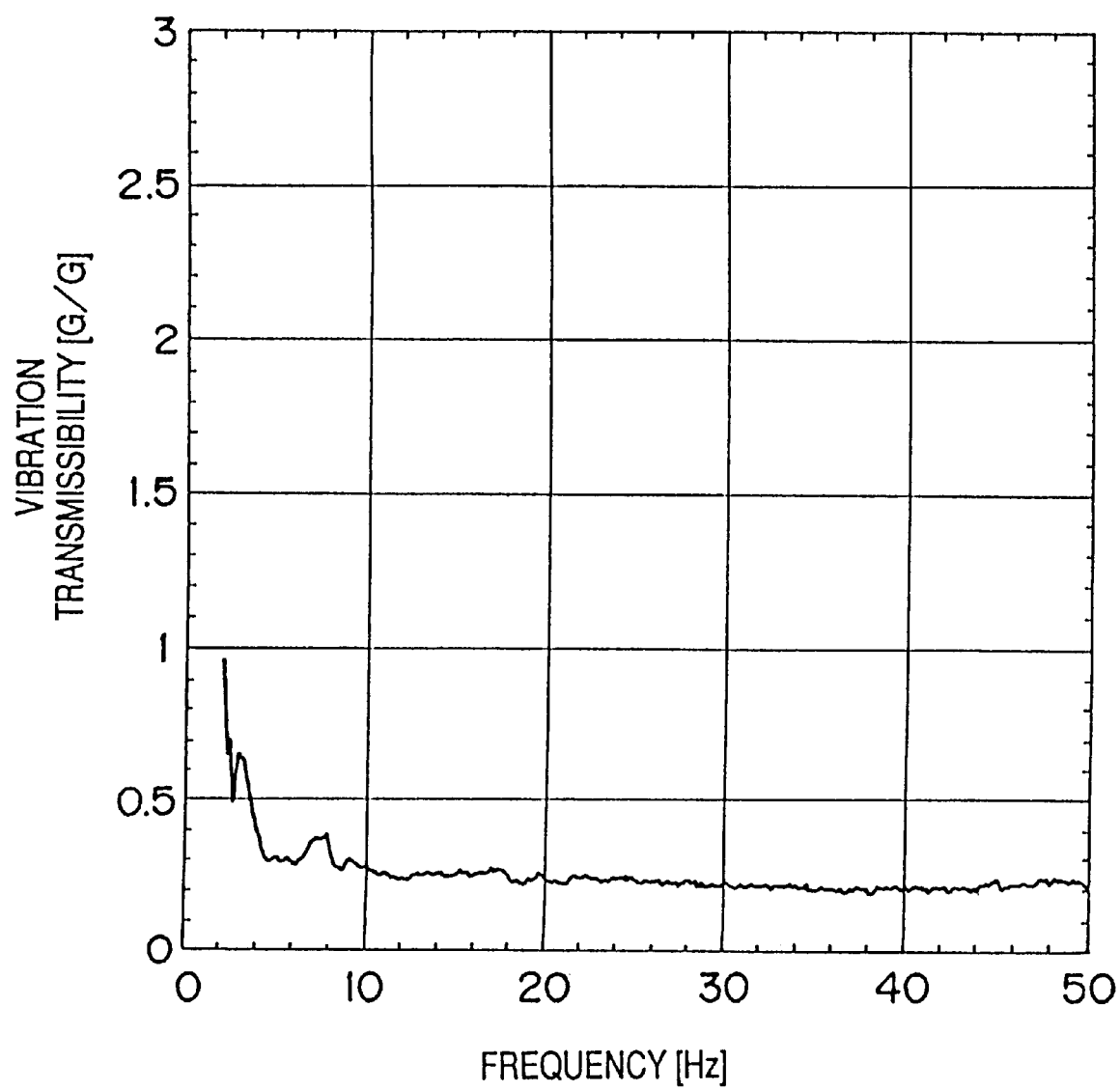
FIG. 23 is a graph showing dynamic characteristics of the vibration mechanism of FIG. 18.

FIG. 23 depicts dynamic characteristics of the vibration mechanism of FIG. 18 (subject: 68 kg). As shown therein, the vibration transmissibility at a low-frequency region (2–10 Hz) is suppressed below 1 G/G. As compared with the dynamic characteristics of FIG. 21, the vibration transmissibility at a high-frequency region is slightly increased by the spring force, but it can be reduced with the use of an elastic material such as, for example, urethane. The S.E.A.T. value at that time was 1.6.

This can be interpreted that collision damping was caused in opposition to large-amplitude vibration at the low-frequency region by imparting a negative spring constant greater than about −1 kg/mm to the vibration mechanism M1, thereby causing a phase shift and reducing the vibration transmissibility. That is, unlike the conventional vibration isolators, without the provision of any shock absorber, a portion providing a negative spring constant achieves the function of the shock absorber for suppressing the vibration transmissibility, thus making it possible to realize a suspension seat having a small S.E.A.T. value with a small stroke.

Even if the load applied to the vibration mechanism M1 is small and even if the static characteristics have no negative spring constant, an unstable condition can be created by making use of a portion having a spring constant of substantially 0 (for example, B or C in FIG. 20). Such an unstable condition has a tendency to cause a phase shift, making it possible to realize a suspension seat in which the vibration transmissibility at the resonant point is suppressed.

Figure 24:
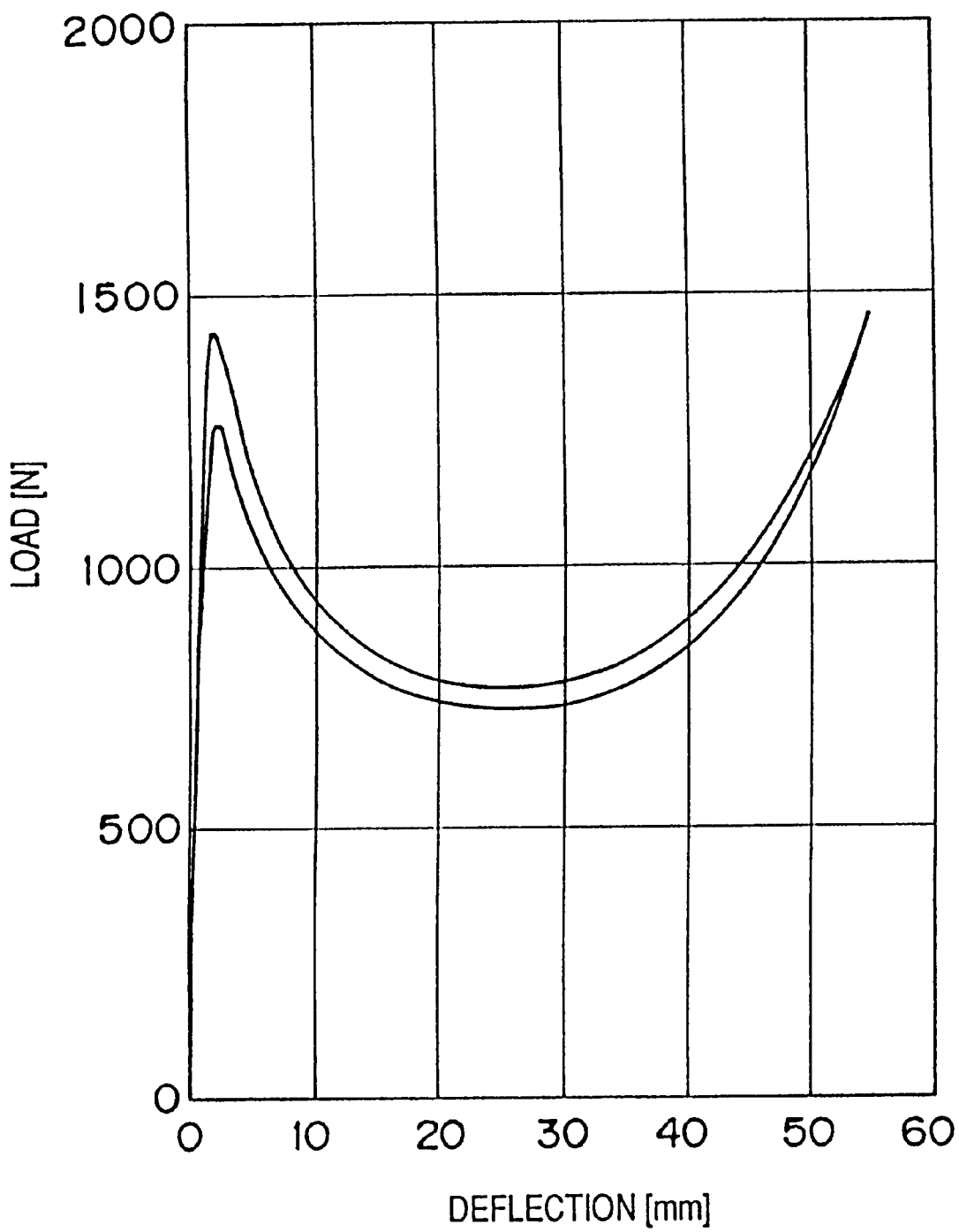
FIG. 24 is a graph showing static characteristics in the case where the minimum spring constant was reduced by adding coil springs to a vibration mechanism having static characteristics shown by a curve G in FIG. 20.

FIG. 24 is a graph showing static characteristics of a mechanism in which additional coil springs are attached to the vibration mechanism having static characteristics of the curve G in FIG. 20 to reduce the minimum spring constant to about −2 kg/mm. After external input has caused the upper and lower frames 4 and 2 to approach each other, this vibration mechanism can accelerate return of one of the two frames relative to the other by increasing the speed at which one of them moves away from the other, thereby pushing up the upper frame 4 against the gravity thereof. When the vibration mechanism having such static characteristics is used for a machine in an amusement park, it is not necessary for the machine to provide with an actuator which has been hitherto required as a vertically exciting source.

It is to be noted that although in the above-described embodiment the upper and lower frames 4 and 2 have been described as each having only one permanent magnet, each of them may have a plurality of permanent magnets with the same magnetic poles opposed to each other.

Figure 25:
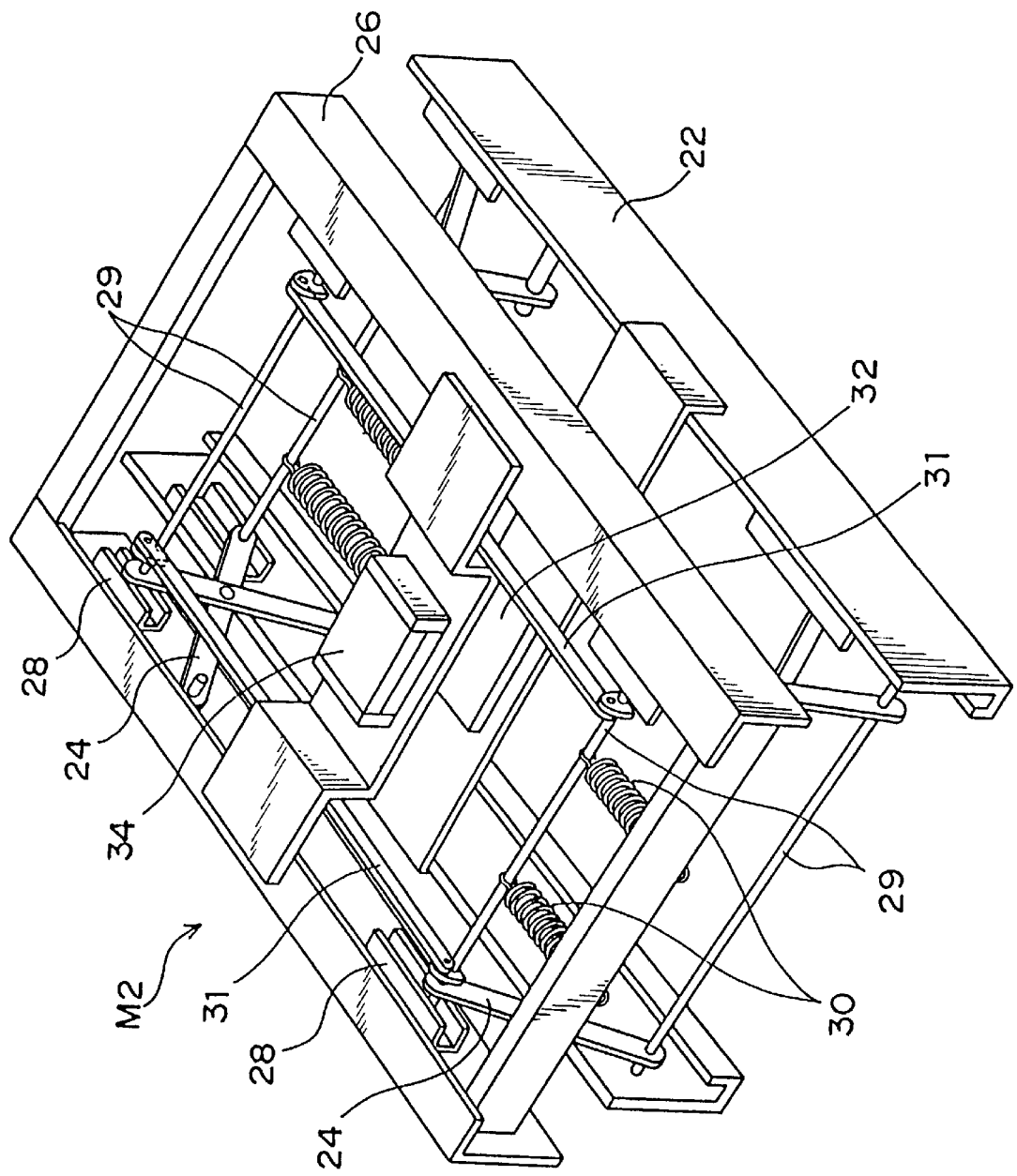
FIG. 25 is a perspective view of a vibration mechanism having a magnetic spring according to a second embodiment of the present invention.

FIG. 25 depicts a vibration mechanism M2 having a magnetic spring according to a second embodiment of the present invention. As shown therein, the vibration mechanism M2 includes a lower frame 22 mounted on a floor or the like on the side of a vibration source and an upper frame 26 vertically movably mounted on the lower frame 22 via link mechanisms each made up of a plurality of X-shaped links 24. Each link mechanism has been already referred to above as the XX link. Each X-shaped link 24 is made up of two levers, each of which has one end pivotally connected to the lower frame 22 or the upper frame 26 and the other end slidably mounted on a slider 28 secured to the internal surface of a side wall of the lower frame 22 or the upper frame 26. A plurality of tension coil springs 30 bias the X-shaped links 24 in the direction in which upper or lower ends of two coil springs 30 constituting each X-shaped link 24 are closed, thereby producing a force for lifting the upper frame 26. Furthermore, of the levers constituting the X-shaped links, two associated levers disposed on the right and left sides, respectively, are connected to each other via one of a plurality of rods 29, two of which are in turn connected to each other via a plurality of rods 31 so that front and rear X-shaped links 24 may operate in synchronization with each other to lift the upper frame 26.

Because the force for lowering the upper frame 26 when a mass is loaded thereon is substantially the same as that of the coil springs 30 in the vibration mechanism M1 referred to above, explanation thereof is omitted.

Furthermore, a first permanent magnet 32 is secured to the lower frame 22 substantially at the center thereof, while a second permanent magnet 34 is secured to the upper frame 26 substantially at the center thereof with the same magnetic poles opposed to each other. The repulsive force of the two permanent magnets 32 and 34 acts to lift the upper frame 26.

Figure 26:
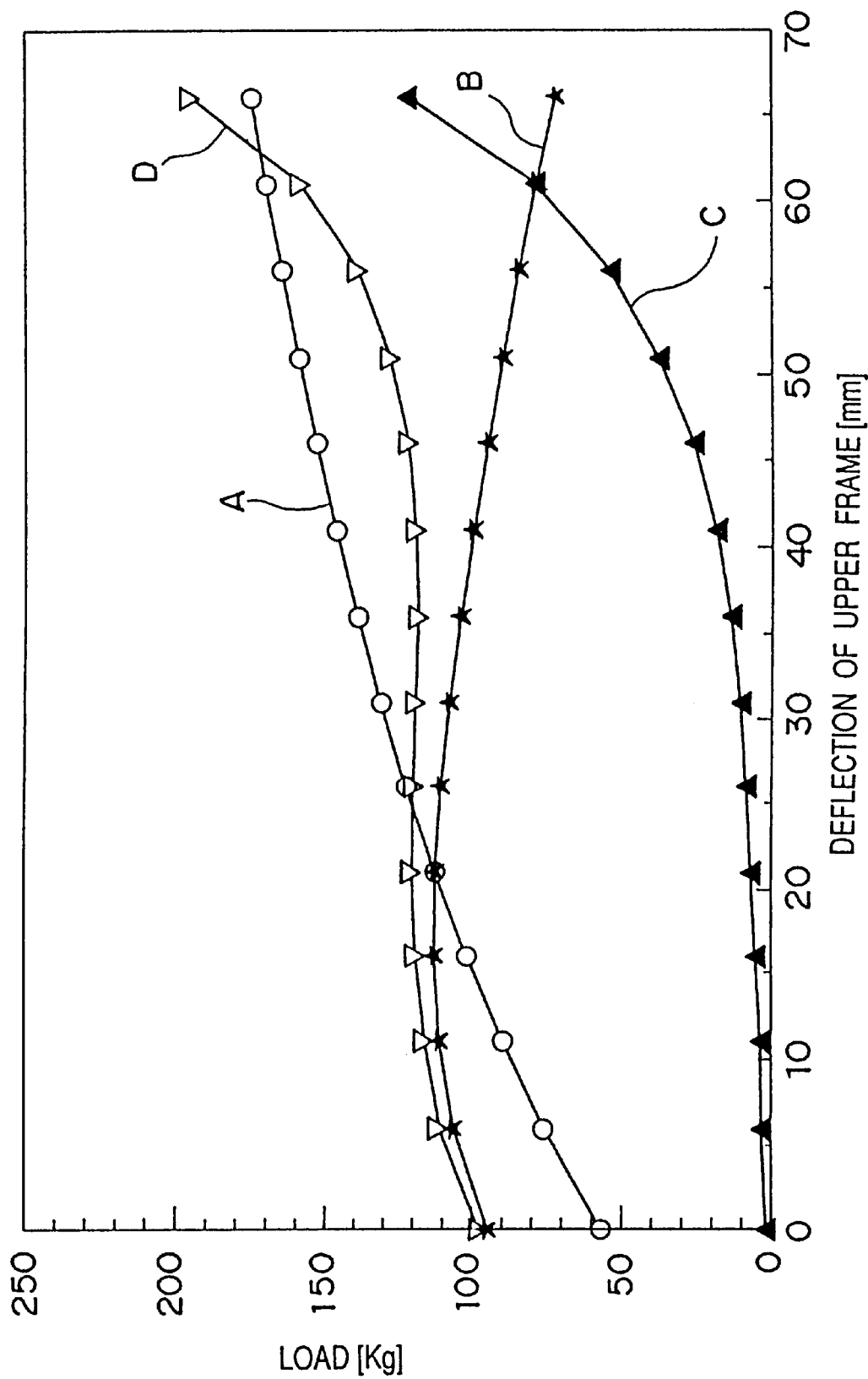
FIG. 26 is a graph showing a lifting force of an upper frame produced by X-shaped links in the vibration mechanism of FIG. 25.

FIG. 26 is a graph showing static characteristics of the vibration mechanism M2 of FIG. 25 and particularly showing the lifting force exerted on the upper frame 26 by the X-shaped links 24.

The spring force (f) and the lifting force (F) of the upper frame 26 produced by the spring force (f) are expressed as follows:

$$f = kx, \text{ and}$$
$$F = f \cdot \tan\theta = kx \cdot \tan\theta,$$

where
- $\theta$: angle of each lever constituting the X-shaped link 24 with respect to the lower frame 22,
- k: spring constant, and
- x: deflection.

When the deflection (x) is expressed by the amount of deflection of the upper frame 26, the spring force (f) and the lifting force (F) of the upper frame 26 are indicated by curves A and B, respectively, in FIG. 26. A curve C indicates the lifting force produced by means of the repulsive force of the two opposing, permanent magnets 32 and 34, while a curve D indicates the total lifting force of the lifting force of B plus that of C.

As can be seen from the graph of FIG. 26, even if the amount of deflection varies, the lifting force can be made substantially constant within a predetermined range by making use of the spring force of the coil springs 30 and the repulsive force of the permanent magnets 32 and 34. That is, the vibration mechanism of FIG. 25 has a spring constant of 0 within the predetermined range. In applications where this vibration mechanism is employed in suspension seats and when a load (vibration) is inputted thereto via a vehicle body, only the lower frame 22 deflects vertically, while the upper frame 26 with a seat placed thereon deflects little. Accordingly, a phase lag or reverse phase is caused with respect to a large-amplitude input at a low-frequency region, making it possible to absorb vibration energy. High-frequency vibrations can be further reduced by the action of the reverse phase and by means of the characteristics of highly elastic urethane.

The spring constant and the initial tension of the metal springs, the size and layout of the magnets, the link shape and the like are considered to be factors that determine a substantially horizontal set load.

Figure 27A:
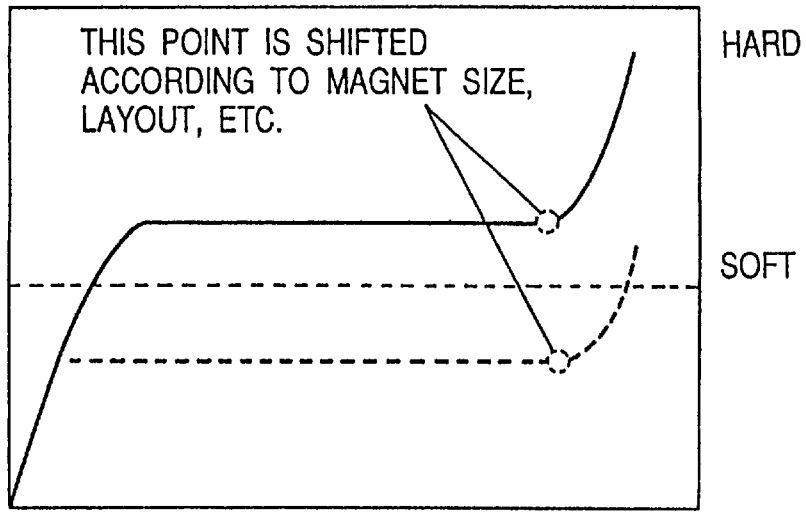
FIG. 27A is a graph explanatory of parameters that change a set load and a rising point in a load reflection curve of the vibration mechanism of FIG. 25 when the spring constant of metal springs or the magnet size was changed.
Figure 27B:
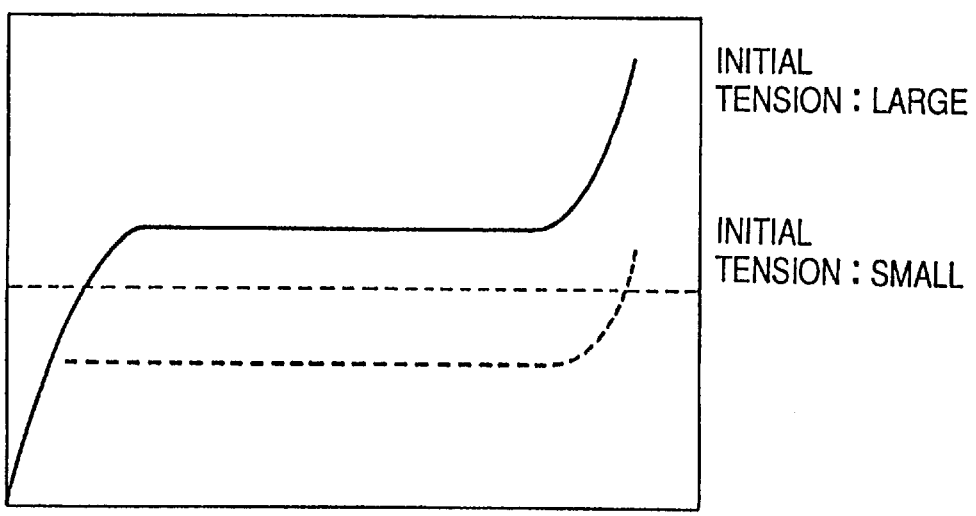
FIG. 27B is a graph similar to FIG. 27A when the initial tension of the metal springs was changed.

More specifically, as shown in FIG. 27A, the set load can be increased by enlarging the spring constant of the metal springs, while a rising point can be shifted leftwards in FIG. 27A by enlarging the magnet size. Even if the same magnets are used, the rising point can be moved rightwards or leftwards by changing the opposing area thereof. Also, as shown in FIG. 27B, the set load can be increased by enlarging the initial tension of the metal springs.

FIGS. 28A and 28B depict the X-shaped links disposed on respective sides of the vibration mechanism M2. When the vertical space (l) is identical, the rising point is located on the left-hand side in the case of FIG. 28B, in which the vibration mechanism M2 of FIG. 25 is employed, compared with the case of FIG. 28A. Furthermore, when the height (l) is increased (when the mechanism is thickened), the set load is increased, as shown in FIG. 28D. In addition, the generally horizontally extending region can be regulated by regulating the total stroke, making it possible to provide dynamic characteristics independent of the loaded mass.

Figure 29:
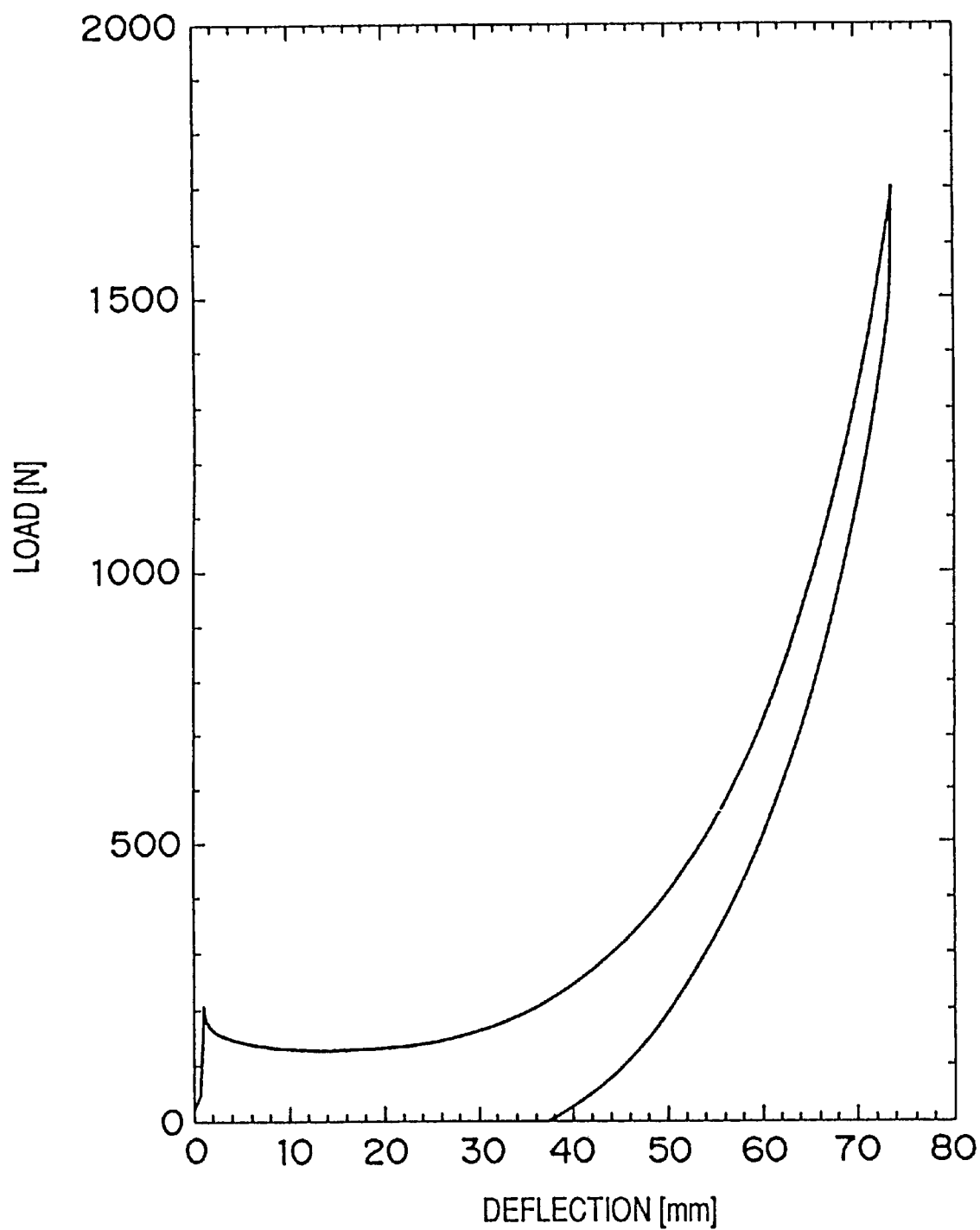
FIG. 29 is a graph showing a load-deflection curve when only permanent magnets having a size of 75 mmL×75 mmW×20 mmH were incorporated in the vibration mechanism of FIG. 25.
Figure 30:
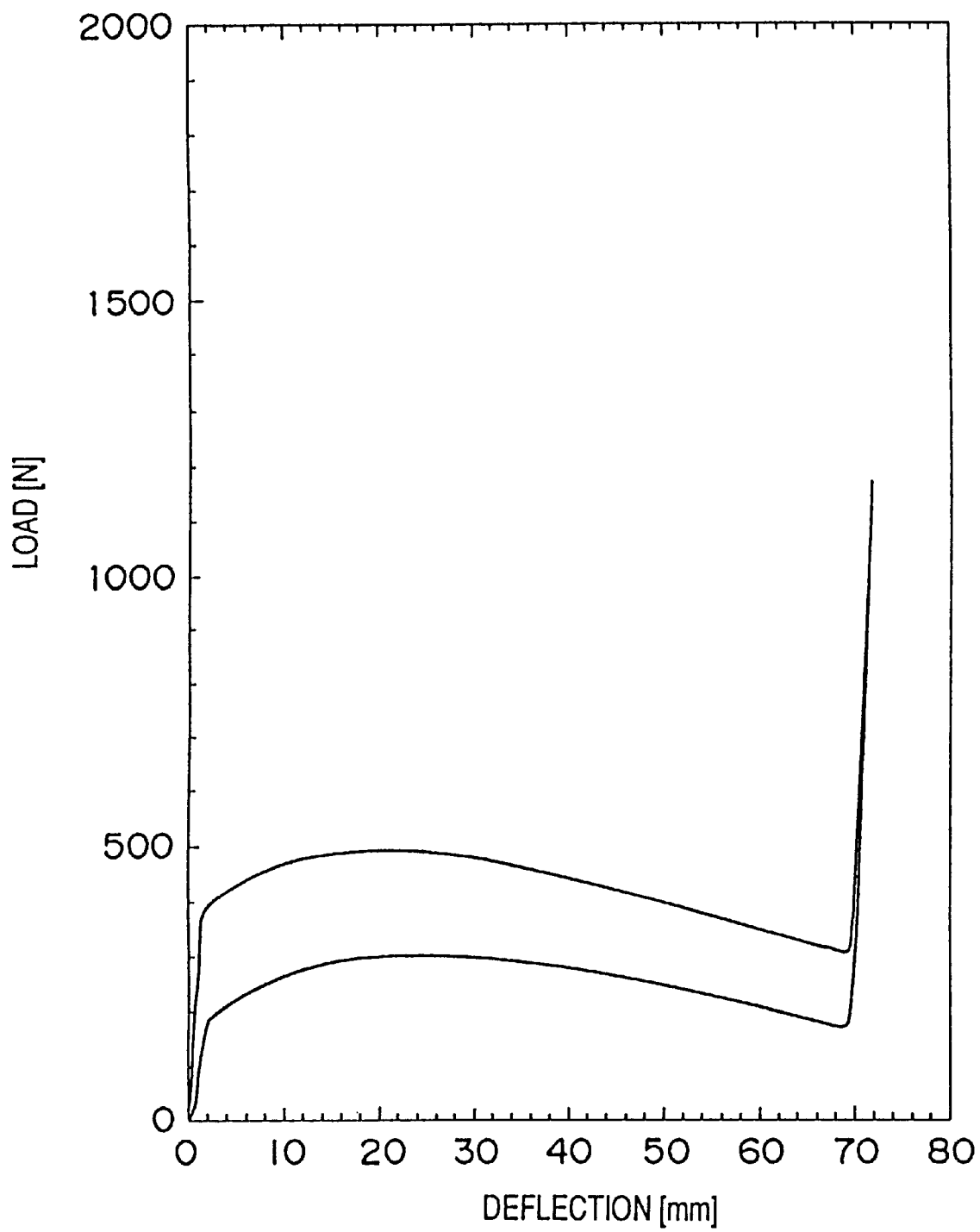
FIG. 30 is a graph showing a load-deflection curve when only four coil springs were incorporated in the vibration mechanism of FIG. 25.

FIG. 29 depicts a load-deflection curve when permanent magnets of 75 mmL×75 mmW×20 mmH were used for the first and second permanent magnets 32 and 34 and no coil springs were incorporated. FIG. 30 depicts a load-deflection curve when no permanent magnets were incorporated and only four coil springs were used. It is noted that link mechanisms used are not the same and, hence, the coefficient of friction of the X-shaped links 24 and that of the sliders 28 differ.

Figure 31:
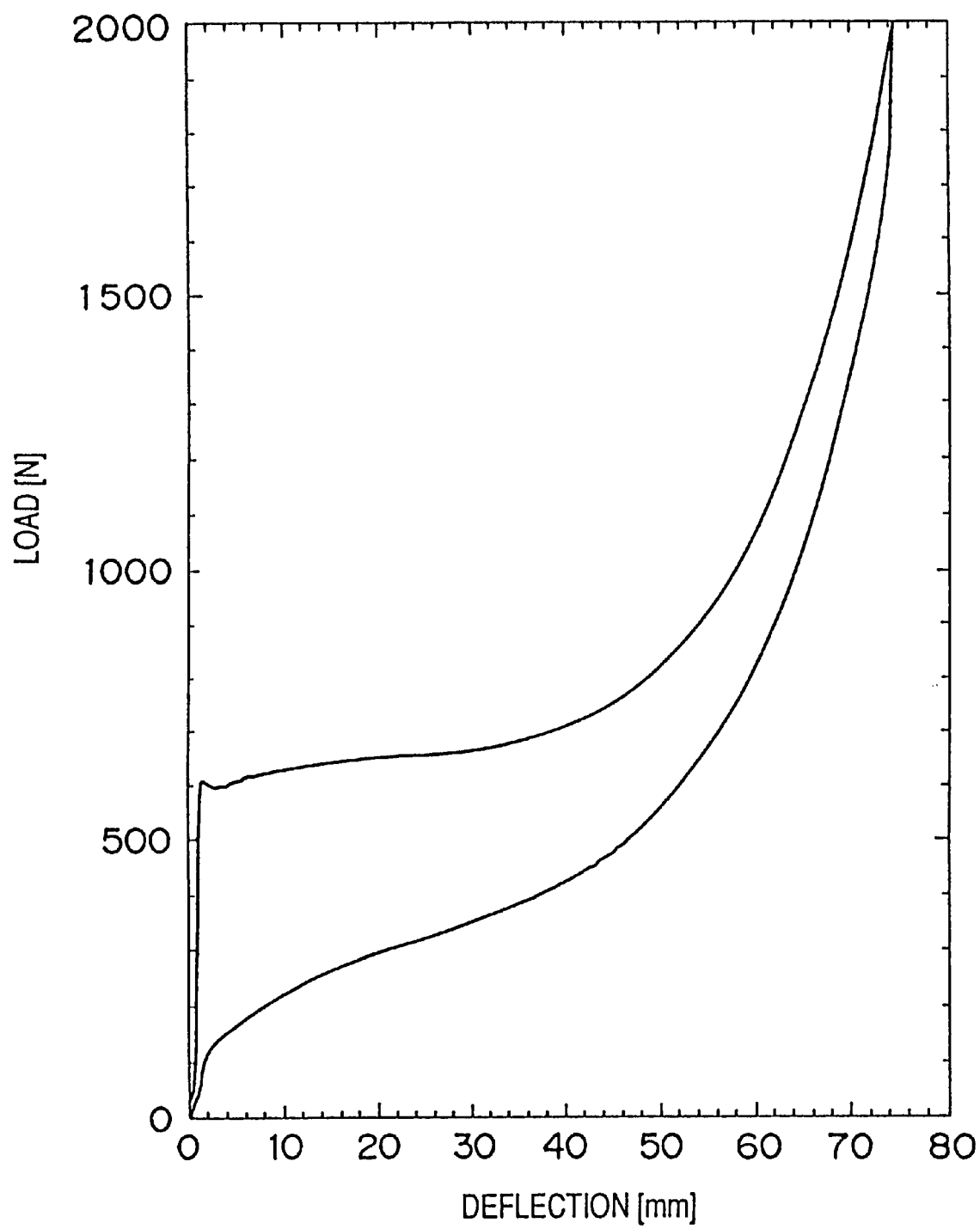
FIG. 31 is a graph showing a load-deflection curve when four coil springs were incorporated in a unit having the load-deflection curve of FIG. 29.
Figure 32:
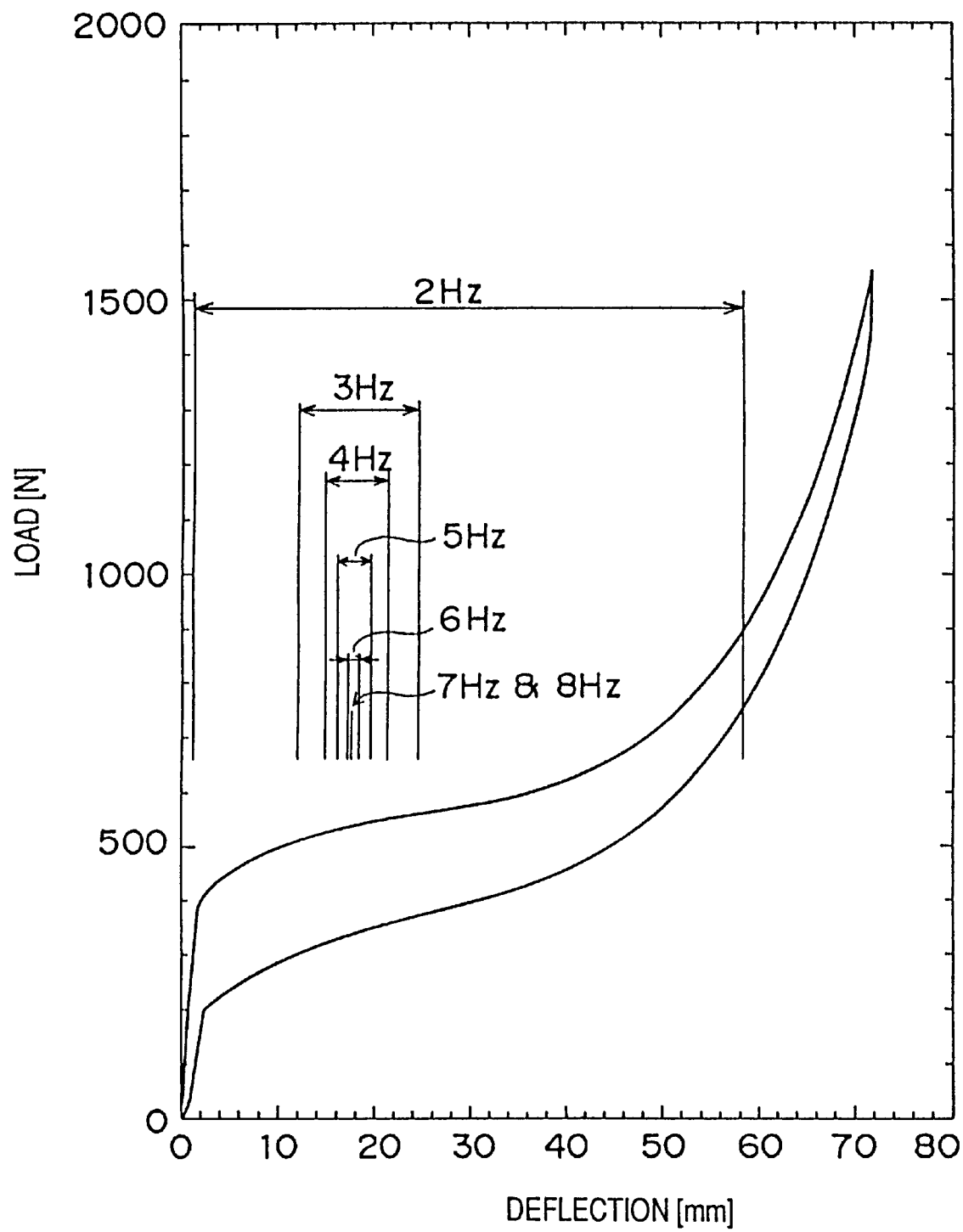
FIG. 32 is a graph showing a load-deflection curve when permanent magnets having a size of 75 mmL×75 mmW×20 mmH were used for first and second permanent magnets and four coil springs were used in the vibration mechanism of FIG. 25 with the loaded mass set to 43 kg.
Figure 33:
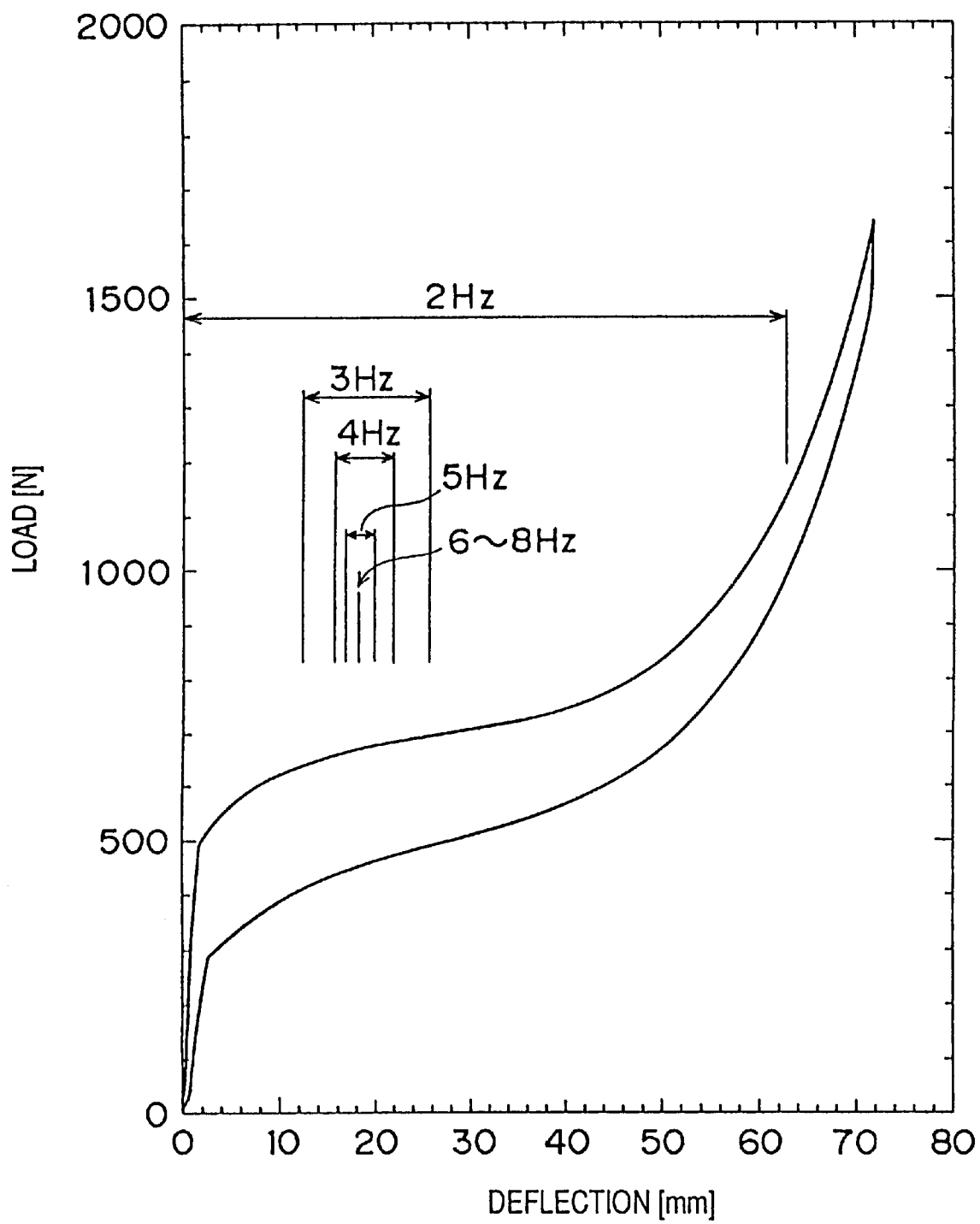
FIG. 33 is a graph similar to FIG. 32 when permanent magnets having a size of 75 mmL×75 mmW×20 mmH were used for the first and second permanent magnets and five coil springs were used in the vibration mechanism of FIG. 25 with the loaded mass set to 55 kg.
Figure 34:
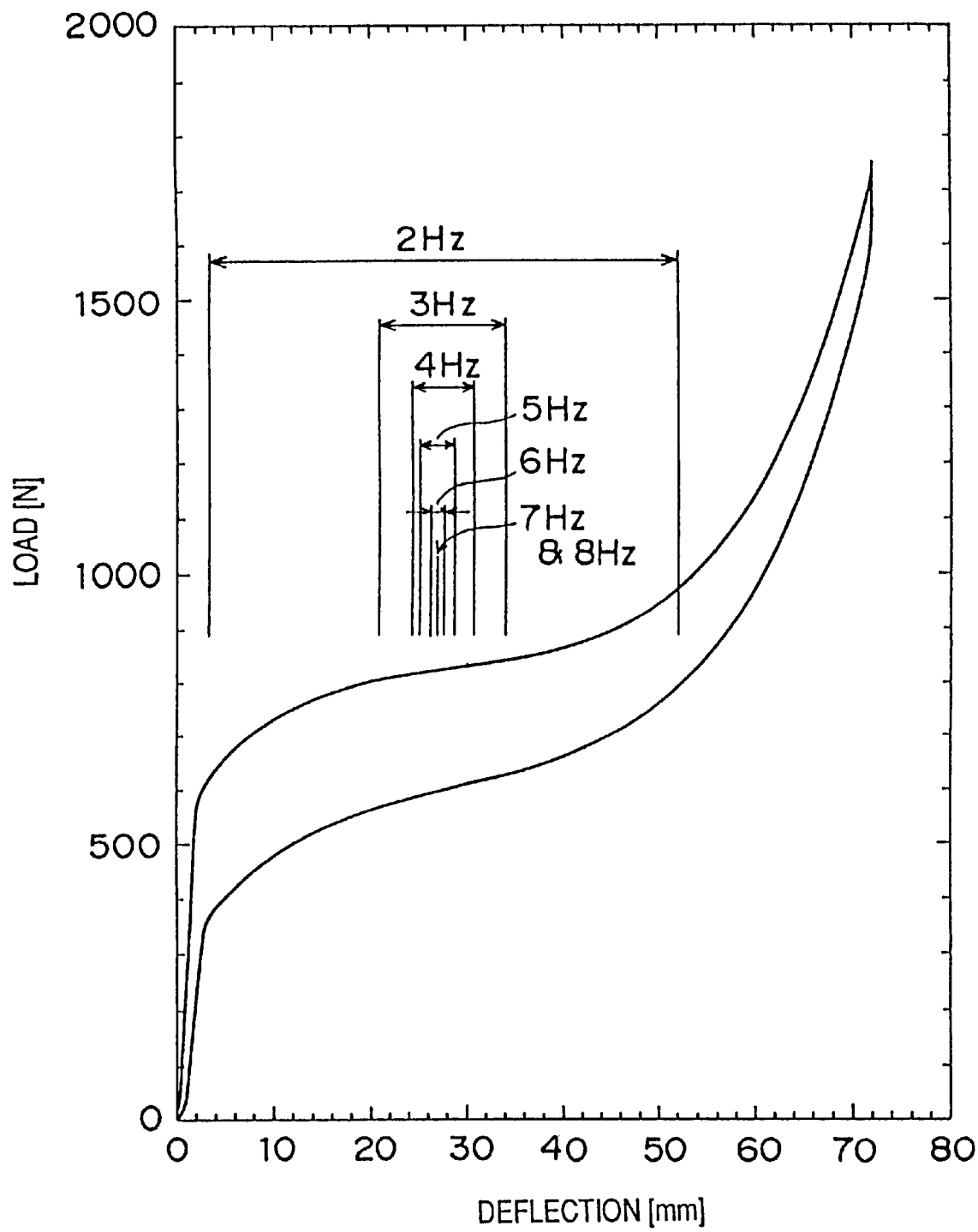
FIG. 34 is a graph similar to FIG. 32 when permanent magnets having a size of 75 mmL×75 mmW×20 mmH were used for the first and second permanent magnets and six coil springs were used in the vibration mechanism of FIG. 25 with the loaded mass set to 68 kg.

FIG. 31 depicts a load-deflection curve when four coil springs were incorporated into a vibration mechanism having the load-deflection characteristics of FIG. 29.

The vibration mechanism M2 having the static characteristics of FIG. 31 provides non-linear characteristics in which the spring constant increases gradually and smoothly from a small value (about 0.1 kg/mm) at a predetermined amount of deflection. When this vibration mechanism M2 is used for a suspension unit, not only the suspension unit can absorb low-frequency and large-amplitude vibration energy, but also a seat occupant feels no top-impinging shock at a large amplitude.

FIGS. 32 to 35 depict load-deflection curves, i.e., static characteristics of the vibration mechanism of FIG. 25 when permanent magnets of 75 mmL×75 mmW×20 mmH were used for the first and second permanent magnets 32 and 34 and when the coil springs 30 and the loaded mass were set to 4 pieces–43 kg, 5 pieces–55 kg, 6 pieces–68 kg, and 7 pieces–90 kg, respectively.

The graphs of FIGS. 32 to 35 reveal that the spring constant (the total spring constant of the permanent magnets and the coil springs) of the vibration mechanism M2 at a low-frequency region ranges 0.1–0.4 kg/mm of being small compared with the conventional suspension units. Accordingly, an automobile suspension unit employing this vibration mechanism M2 is not largely affected by load variations even when the amount of deflection is changed by an input from a vehicle floor. An optional spring constant can be obtained by appropriately changing the combination of the repulsive force (the magnet size) of the permanent magnets and the spring force of the coil springs. The spring constant is occasionally set to a value smaller than 2 kg/mm depending on the kind of automobiles. Also, the maximum amount of deflection is about 60 mm at 2 Hz or can be maintained below that value, making it possible to realize a suspension unit having a stroke smaller than that of the conventional ones. In a high-frequency region greater than 7 or 8 Hz, the amount of deflection is constant when vibration energy is small. At this moment, the vibration mechanism of FIG. 25 acts as a rigid body. In a high-frequency region where acceleration, i.e., vibration energy is large, a phase lag or reverse phase is caused which in turn reduces the vibration transmissibility to a small value.

Figure 35:
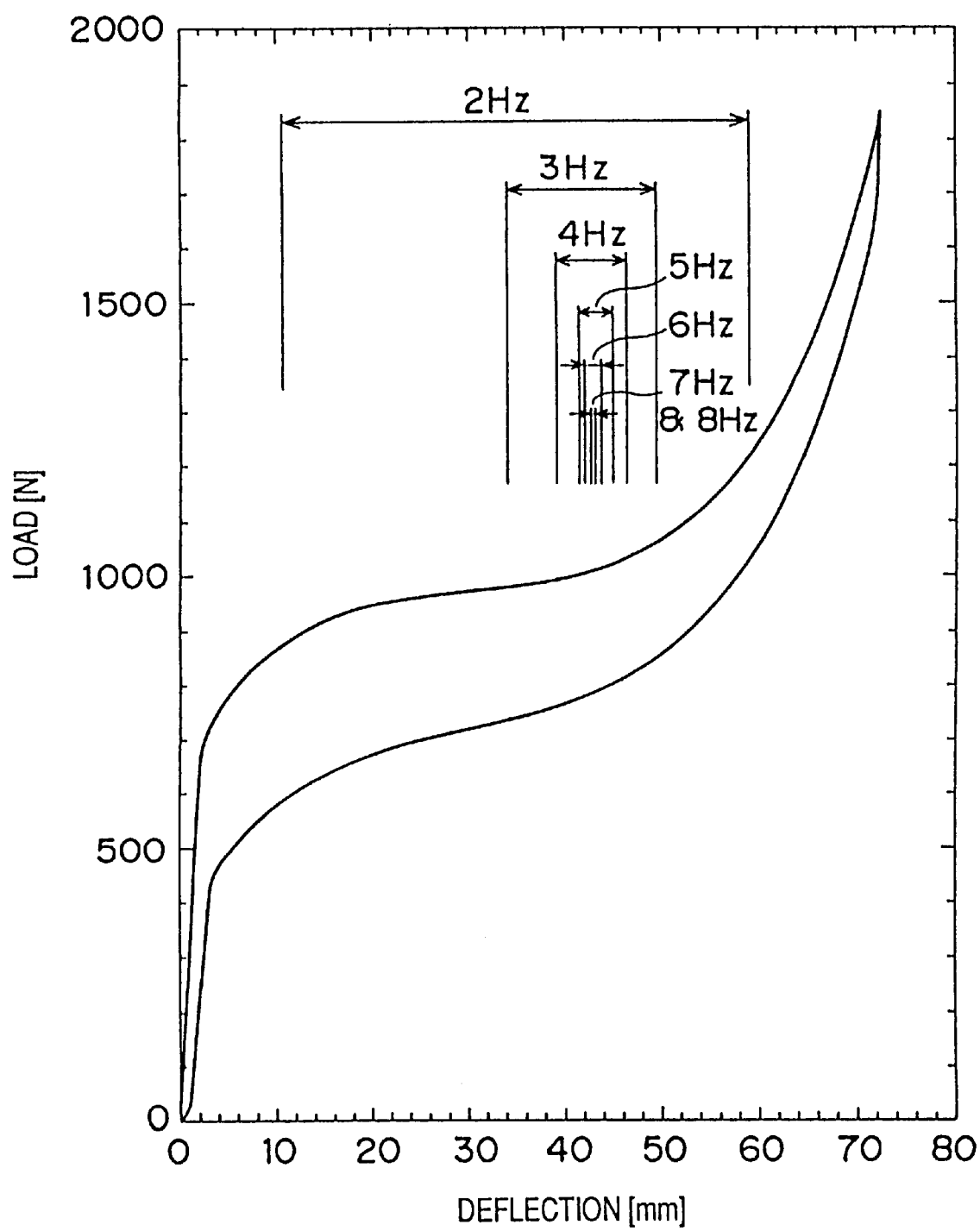
FIG. 35 is a graph similar to FIG. 32 when permanent magnets having a size of 75 mmL×75 mmW×20 mmH were used for the first and second permanent magnets and seven coil springs were used in the vibration mechanism of FIG. 25 with the loaded mass set to 90 kg.

FIG. 35 depicts a load-deflection curve of a suspension unit employing the vibration mechanism M2 according to the present invention and load-deflection curves of conventional suspension units.

Figure 36:
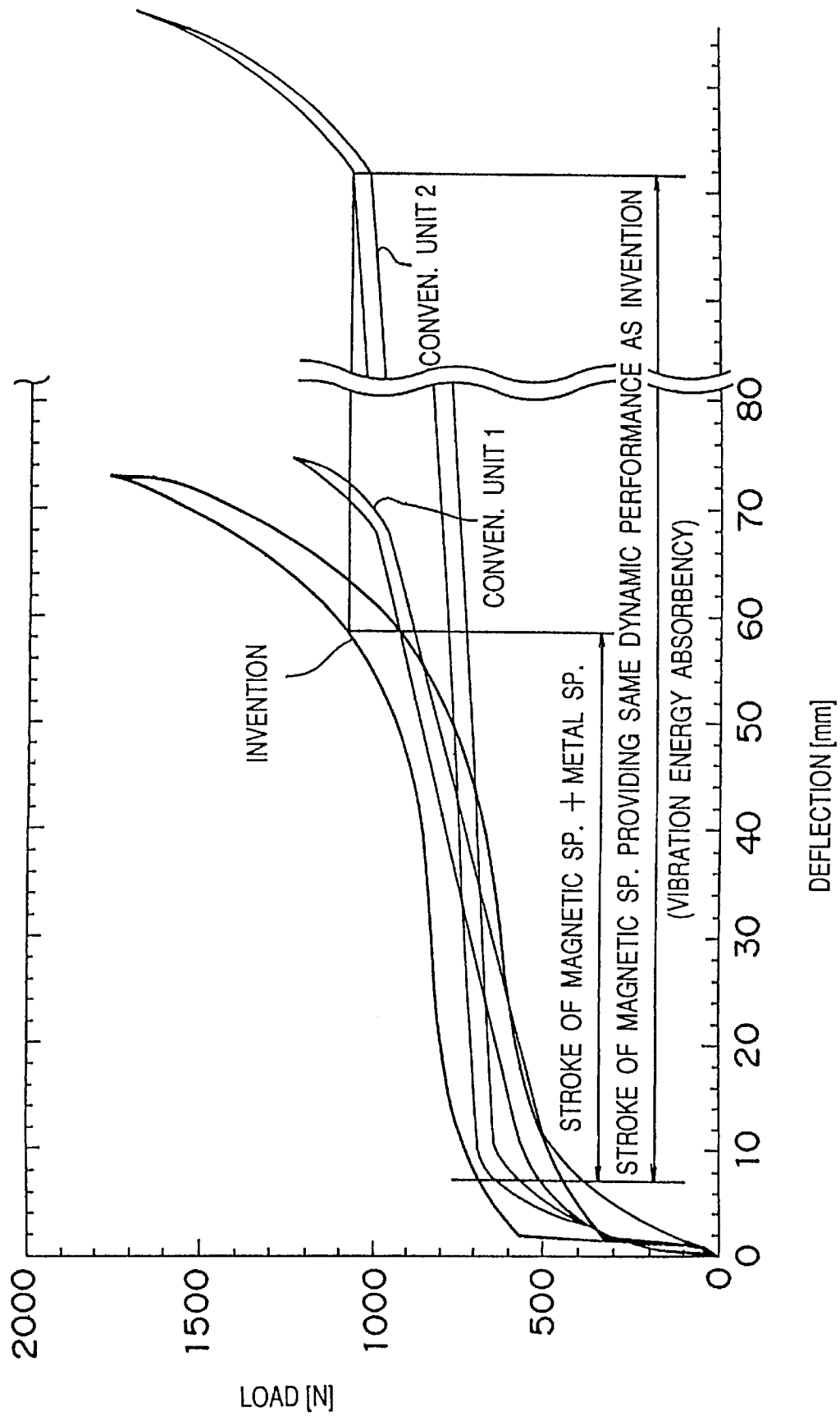
FIG. 36 is a graph showing a load-deflection curve of a suspension unit employing the vibration mechanism of FIG. 25 and those of conventional suspension units.

As shown in the graph of FIG. 36, the suspension unit according to the present invention has load-deflection characteristics obtained by a combination of the metal springs and the magnetic spring, and is characterized in that the characteristics of the metal springs are reduced, while those of the magnetic spring are increased in a bounce region where both the deflection and the load are increased. By applying to the independence of input the independence of the loaded mass that the magnetic spring has, i.e., the spring constant k=k(m) varying according to the mass, high damping at a resonant point is achieved with a small stroke, and the independence of input is also substantially achieved with respect to an input up to 0.3 G–0.6 G, thus providing high shock absorbency. Furthermore, by making good use of the characteristics in which the resonant frequency can be reduced even with a large spring constant of the magnetic spring, a suspension unit having high vibration absorbency that can be installed in a reduced space can be realized, which has not been hitherto accomplished by only the metal springs.

When the spring constant of the magnetic spring and that of the metal springs are $k_{magnet}$ and $k_{metal}$, respectively, the following relationship holds:

$k_{magnet} = 1/(k_{metal})^n \cdot A$ (A: coefficient).

The coefficient A is a value varying depending on the magnet size, the condition of use or variations of the metal springs or the like. By way of example, magnetic spring of $k_{magnet}=3.3$ has substantially the same resonant point as metal springs of $k_{metal}=0.74$ and, hence, $3.3=1/0.74^4 \cdot A$. In this case, $A \approx 1.0$.

On the other hand, a conventional suspension unit 1 has linear characteristics in which the spring constant is substantially constant. Because the spring constant abruptly increases at a large amplitude, there is a possibility that a top-impinging shock may be caused. A conventional suspension unit 2 provides the same characteristics as the suspension unit according to the present invention with the use of only metal springs. With only the metal springs, the stroke is considerably large and the characteristic change is large when a stroke end has been reached, thus causing a bottom-impinging shock. Also, the space in which the suspension unit is installed cannot be reduced. In order to restrain the spring constant to a small value and to make both the spring constant and the initial tension variable within a limited space, it is necessary to increase the size and the number of the metal springs. Because of this, the loaded mass is influenced by such a limited space and, in the case of conventional seats, the critical value thereof is about 120 kg.

Figure 37:
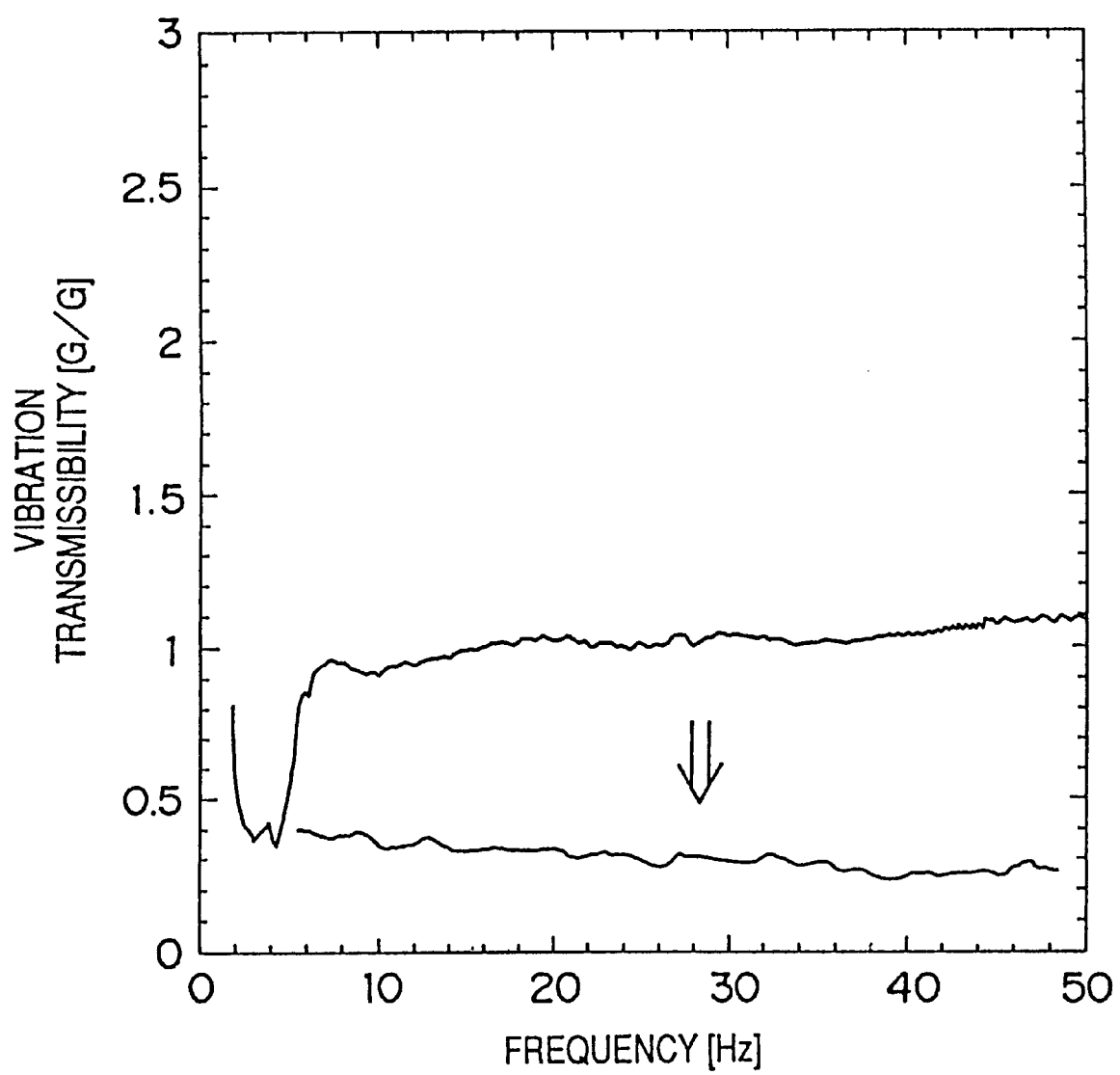
FIG. 37 is a graph showing dynamic characteristics of only a suspension unit employing the vibration mechanism of FIG. 25 when permanent magnets having a size of 75 mmL×75 mmW×25 mmH and six coil springs were used, with a loaded mass of 68 kg applied.

FIG. 37 is a graph depicting the vibration transmissibility, i.e., dynamic characteristics of only a suspension unit employing the vibration mechanism M2 of FIG. 25 when a sinusoidal wave with a constant acceleration has been applied. In this suspension unit, the first and second permanent magnets 32 and 34 were set to a size of 75 mmL×75 mmW×25 mmH and six coil springs were used with a loaded mass of 68 kg applied.

As can be seen from this graph, the vibration transmissibility is restrained small of being less than 1 G/G in a low-frequency region of 2–10 Hz and, hence, vibration energy is sufficiently absorbed. On the other hand, in a high-frequency region greater than 10 Hz where vibration energy is small, the vibration transmissibility is about 1 G/G. This means that dynamic friction of the X-shaped links turned to static friction and the suspension unit acted as a rigid body. When the vibration energy becomes large, a reverse phase is caused which in turn reduces the vibration transmissibility, as shown by an arrow.

When urethane is used for a cushioning material for a seat placed on the suspension unit, urethane fully exhibits its characteristics in the frequency region where the suspension unit acts as a rigid body.

Figure 38:
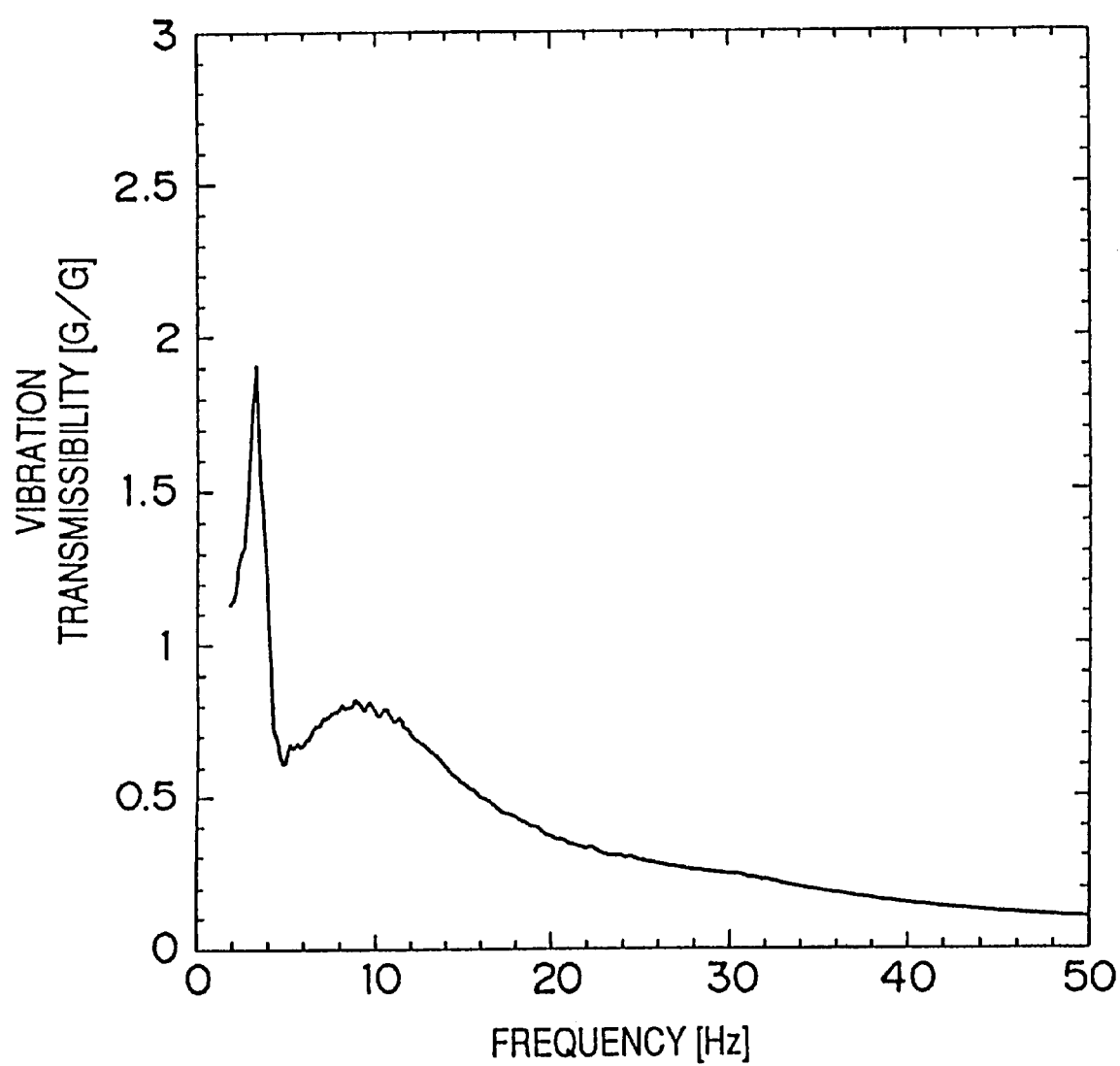
FIG. 38 is a graph showing dynamic characteristics of a seat when urethane was used as a cushioning material.
Figure 39:
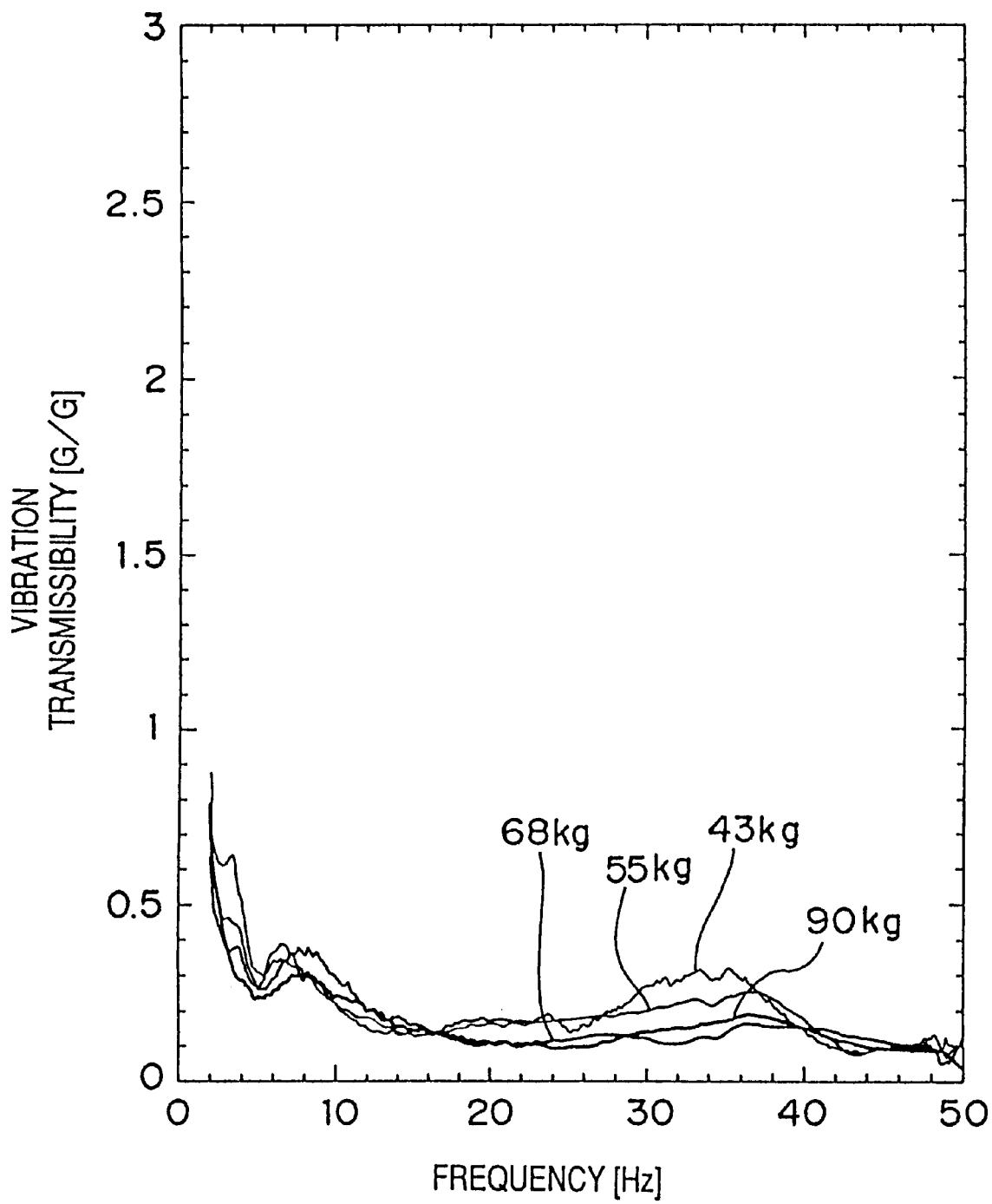
FIG. 39 is a graph showing dynamic characteristics of a suspension seat in which a seat employing urethane as the cushioning material was placed on the vibration mechanism of FIG. 25.

FIG. 38 is a graph depicting characteristics of highly elastic urethane when a loaded mass of 68 kg was applied, while FIG. 39 is a graph depicting dynamic characteristics of a suspension seat in which a seat employing urethane as a cushioning material was placed on the vibration mechanism M2 according to the present invention. Urethane having a hardness of 17 and a thickness of 100 mm and permanent magnets of 75 mmL×75 mmW×20 mmH were used.

The graph of FIG. 39 reveals that in the case of the suspension seat in which the vibration mechanism M2 according to the present invention was incorporated, because vibration energy is small when the loaded mass is light, the vibration transmissibility has a tendency to become slightly large at a specific high-frequency region, and that this suspension seat provides substantially the same characteristics, irrespective of the magnitude of the loaded mass, in a region of 2–20 Hz that the human bodies mainly sense.

Figure 40:
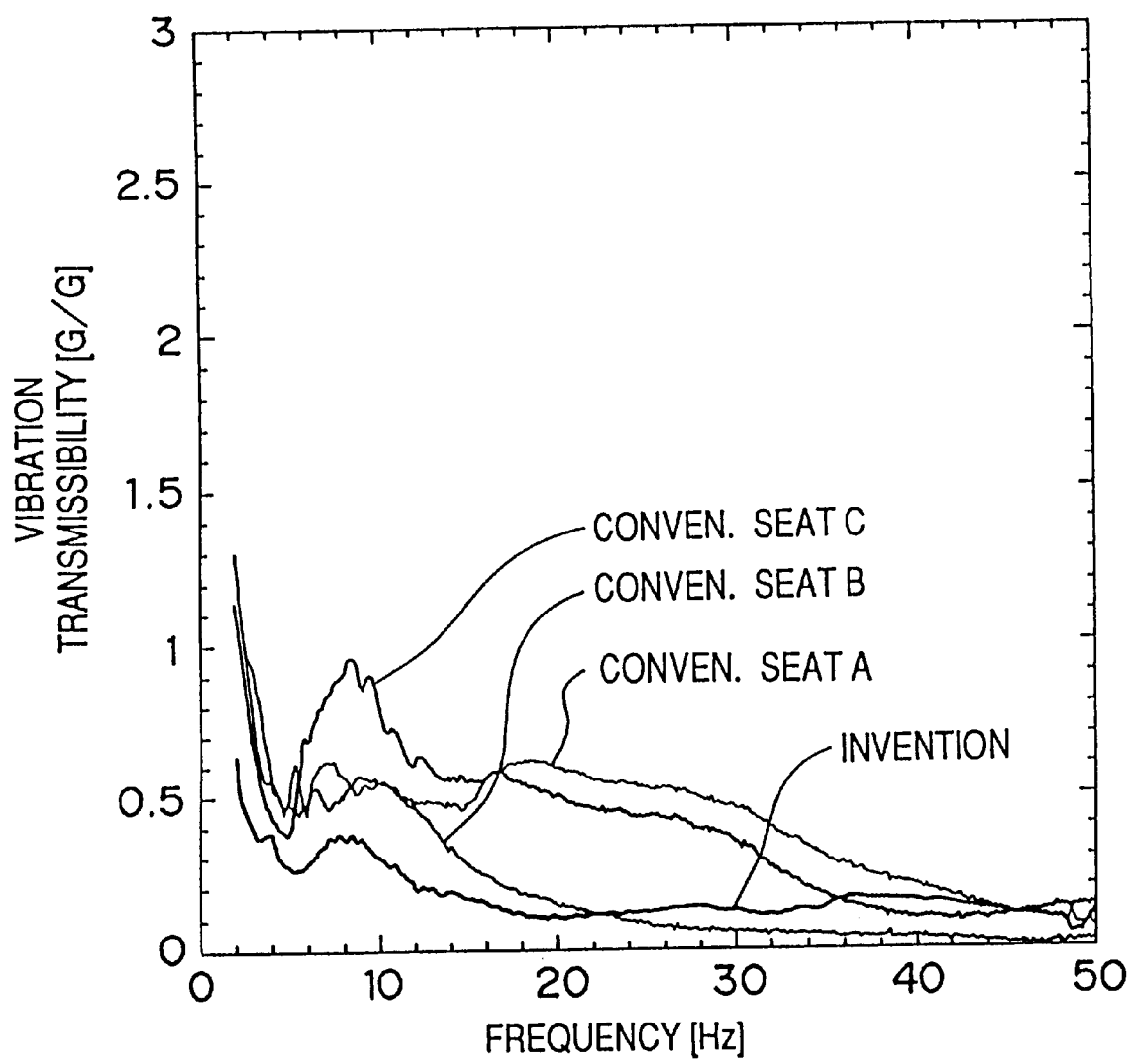
FIG. 40 is a graph showing dynamic characteristics of the suspension seat having the vibration mechanism of FIG. 25 and those of conventional suspension seats.

FIG. 40 is a graph depicting dynamic characteristics of three conventional suspension seats A, B and C and those of the suspension seat in which the vibration mechanism M2 according to the present invention was incorporated. With the suspension seat having the vibration mechanism M2 according to the present invention, not only the vibration transmissibility is sufficiently small in a low-frequency region, but also the dynamic characteristics is improved in the whole frequency region.

In obtaining the graph of FIG. 40, all the loaded masses were set to 68 kg and the magnet size in the vibration mechanism M2 (suspension unit) was 75 mmL×75 mmW× 20 mmH. Also, six coil springs were used.

Figure 41:
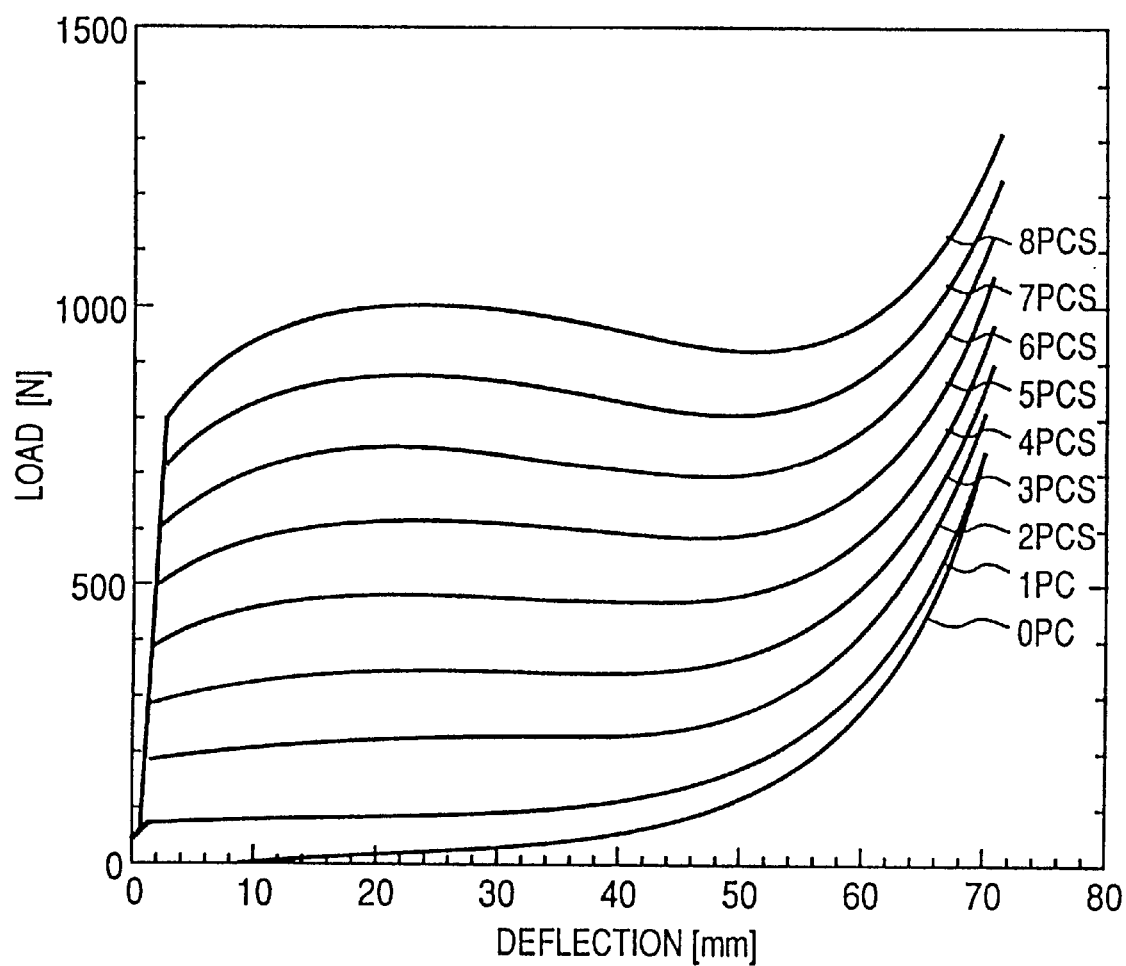
FIG. 41 is a graph showing static characteristics of the vibration mechanism of FIG. 25 having only the permanent magnets and static characteristics in which those of only the coil springs were added thereto.

FIG. 41 is a graph depicting static characteristics of the vibration mechanism M2 of FIG. 25 when the number of coil springs 30 was changed from zero to eight under the condition in which the size of the first and second permanent magnets 32 and 34 were made constant (50 mmL×50 mmW×20 mmH). As can be seen from this graph, as the number of coil springs 30 increases, the repulsive force of the permanent magnets 32 and 34 is reduced relative to the spring force of the coil springs 30 and, hence, the total spring constant of both the permanent magnets 32 and 34 and the coil springs 30 indicates negative values, making it possible to provide a structure having the same static characteristics as the vibration mechanism M1 of FIG. 18.

Figure 42:
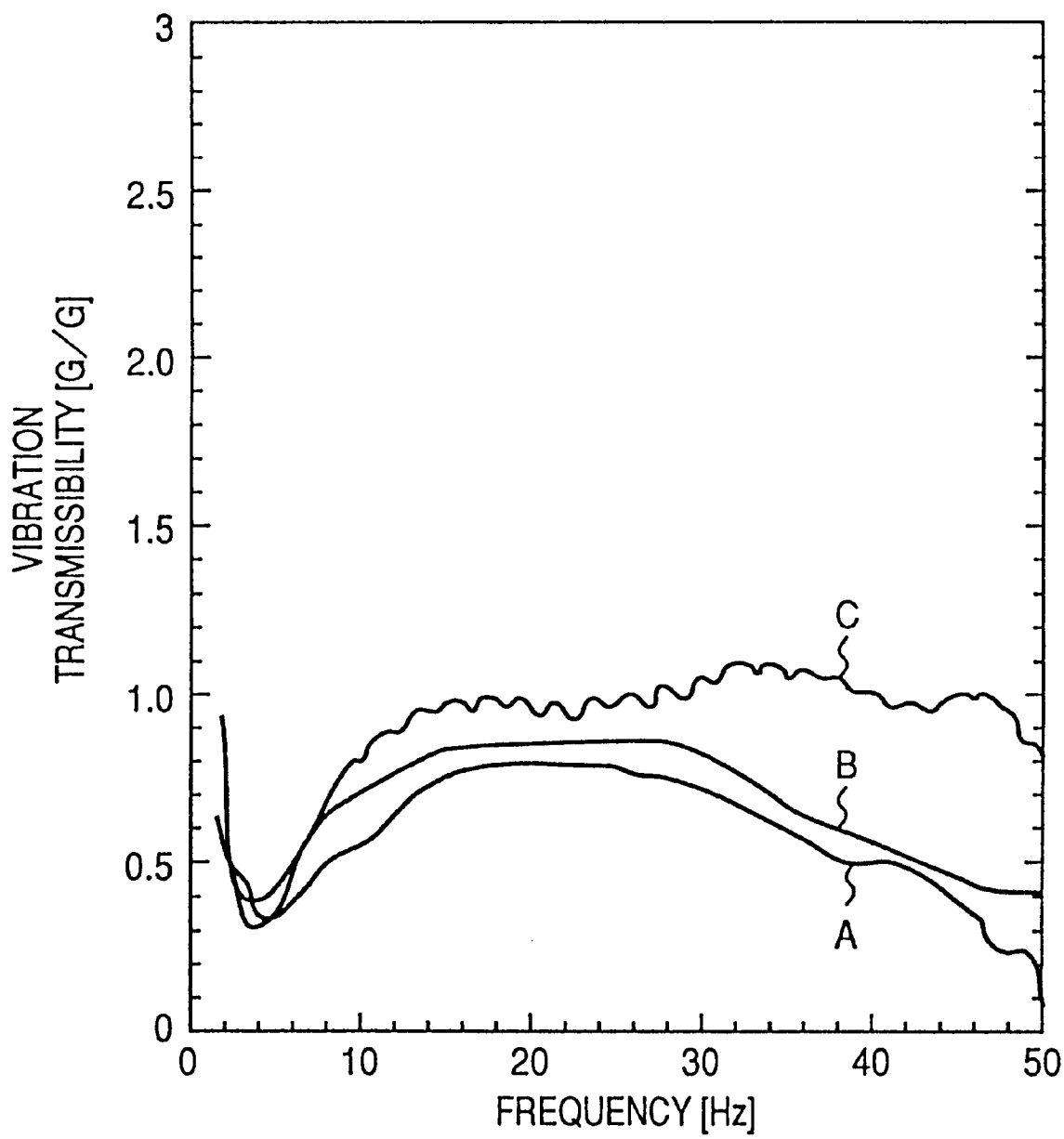
FIG. 42 is a graph showing dynamic characteristics of the vibration mechanism of FIG. 25 when the magnet size was changed, with the loaded mass set to 68 kg.
Figure 43:
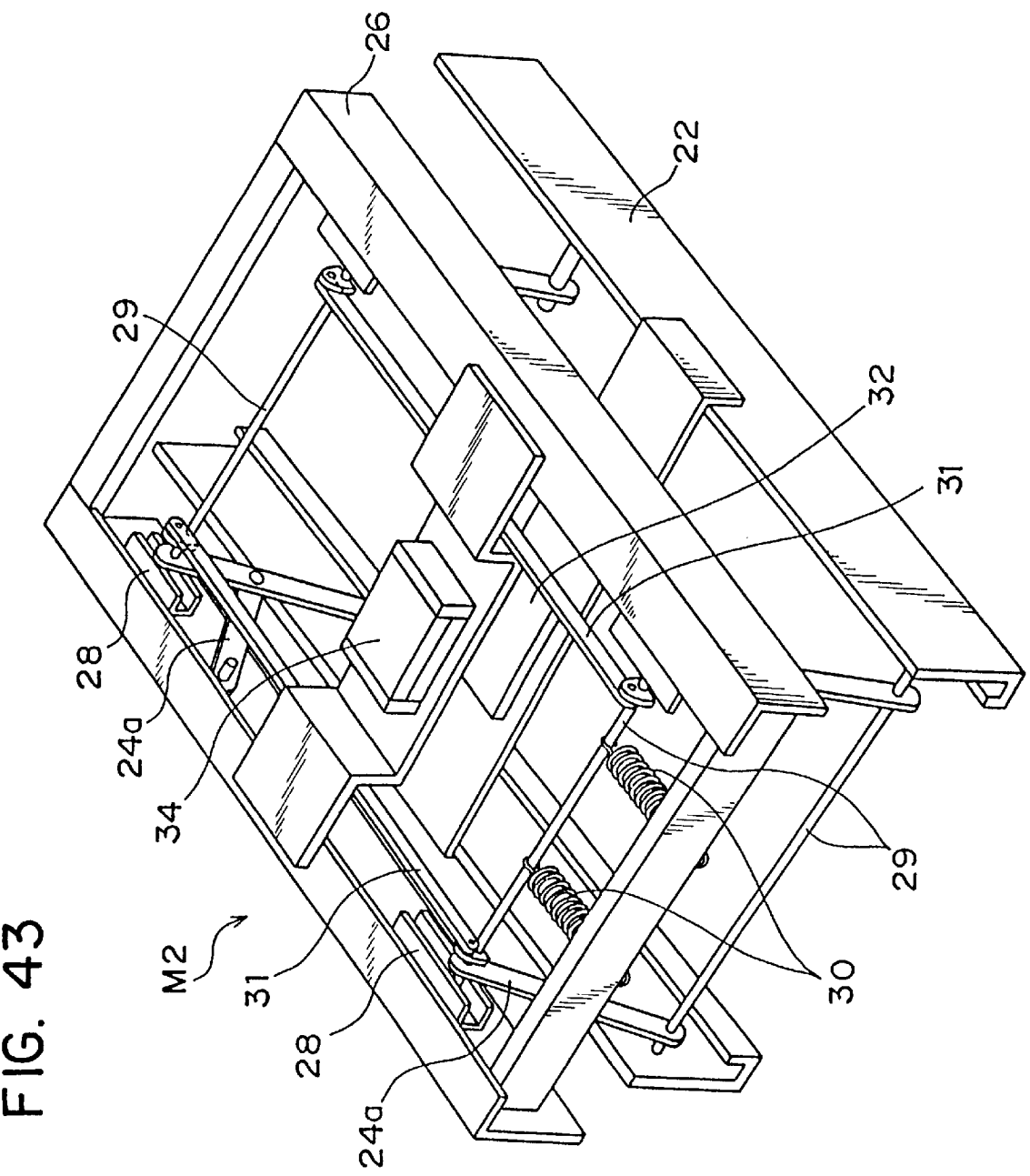
FIG. 43 is a perspective view of a modification of the vibration mechanism of FIG. 25.

FIG. 42 is a graph depicting dynamic characteristics of the vibration mechanism M2 of FIG. 25 when the loaded mass was set to 68 kg, while the size of the permanent magnets 32 and 34 was set to 50 mmL×50 mmW×15 mmH (A), 50 mmL×50 mmW×20 mmH (B), 75 mmL×75 mmW×15 mmH (C), respectively. As can be seen from this graph, as the repulsive force of the permanent magnets 32 and 34 becomes small, the vibration mechanism becomes sensitive to input vibration energy and causes a phase lag or reverse phase, thus reducing the vibration transmissibility at the high-frequency region. In the case of the magnetic spring, the balanced point is created where the loaded mass is supported by means of the repulsive force of the permanent magnets facing each other. Hard springs are resistant to an impact force and cause relatively small deflection even when input variations occur. On the other hand, soft springs cause relatively large variations in deflection when input variations occur. The resultant amplitude causes a phase lag or reverse phase, which in turn reduces the vibration transmissibility. However, the soft springs are susceptible to the impact force and have a tendency to cause a bottom-impinging shock. Because of this, it is necessary for the soft springs to have a separate damping material or elastic material to remove the bottom-impinging shock. In the graph of FIG. 42, the spring constant (the total spring constant of the permanent magnets and the coil springs) of the curve C is substantially zero, the spring constant of the curve B is about −1 kg/mm, while the spring constant of the curve A is set smaller than that of the curve B.

Although in the above-described embodiment the lower frame 22 and the upper frame 26 have been described as each having one permanent magnet, each of them may have a plurality of permanent magnets with the same magnetic poles opposed to each other.

Furthermore, although in the above-described embodiment the link mechanism has been described as being made up of a plurality of X-shaped links 24, Y-shaped links 24a can be also used in place of the X-shaped links to further reduce the frictional resistance of the link mechanism.

Figure 44:
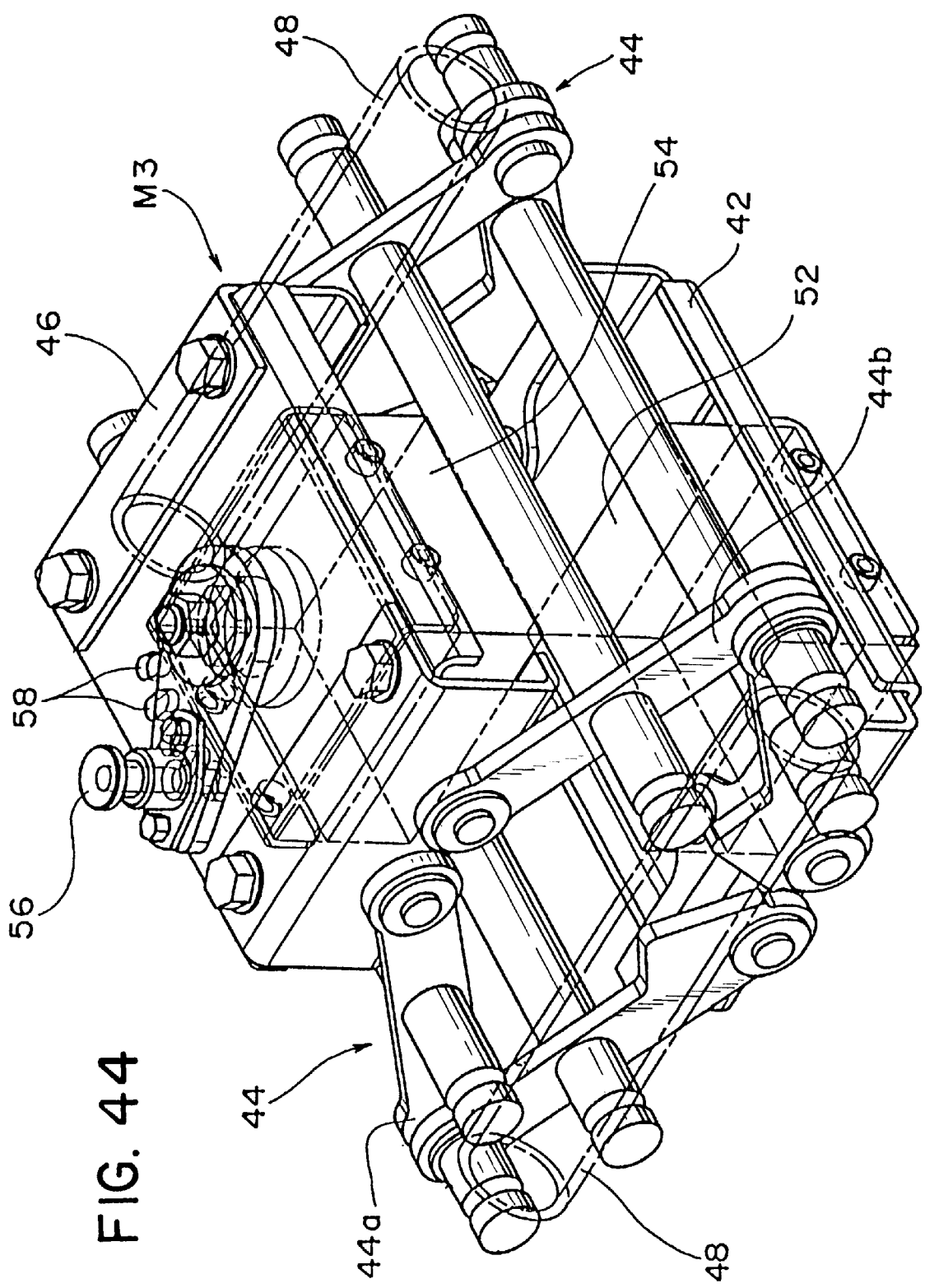
FIG. 44 is a perspective view of a vibration mechanism having a magnetic spring according to a third embodiment of the present invention.

FIG. 44 depicts a vibration mechanism M3 having a magnetic spring according to a third embodiment of the present invention. As shown therein, the vibration mechanism includes a lower frame 42 mounted on a floor or the like on the side of a vibration source and an upper frame 46 vertically movably mounted on the lower frame 42 via pantograph-type link mechanisms 44 each having a plurality of links.

Each of the link mechanisms is made up of two sets of symmetrical paired links 44a and 44b with the links constituting each pair connected to each other so as to generally represent a figure "L". Intermediate portions of the paired links 44a and 44b are connected to opposite ends of a coil spring 48 so that the coil spring 48 may bias the paired links 44a and 44b inwardly to produce a lifting force of the upper frame 46.

Figure 45:
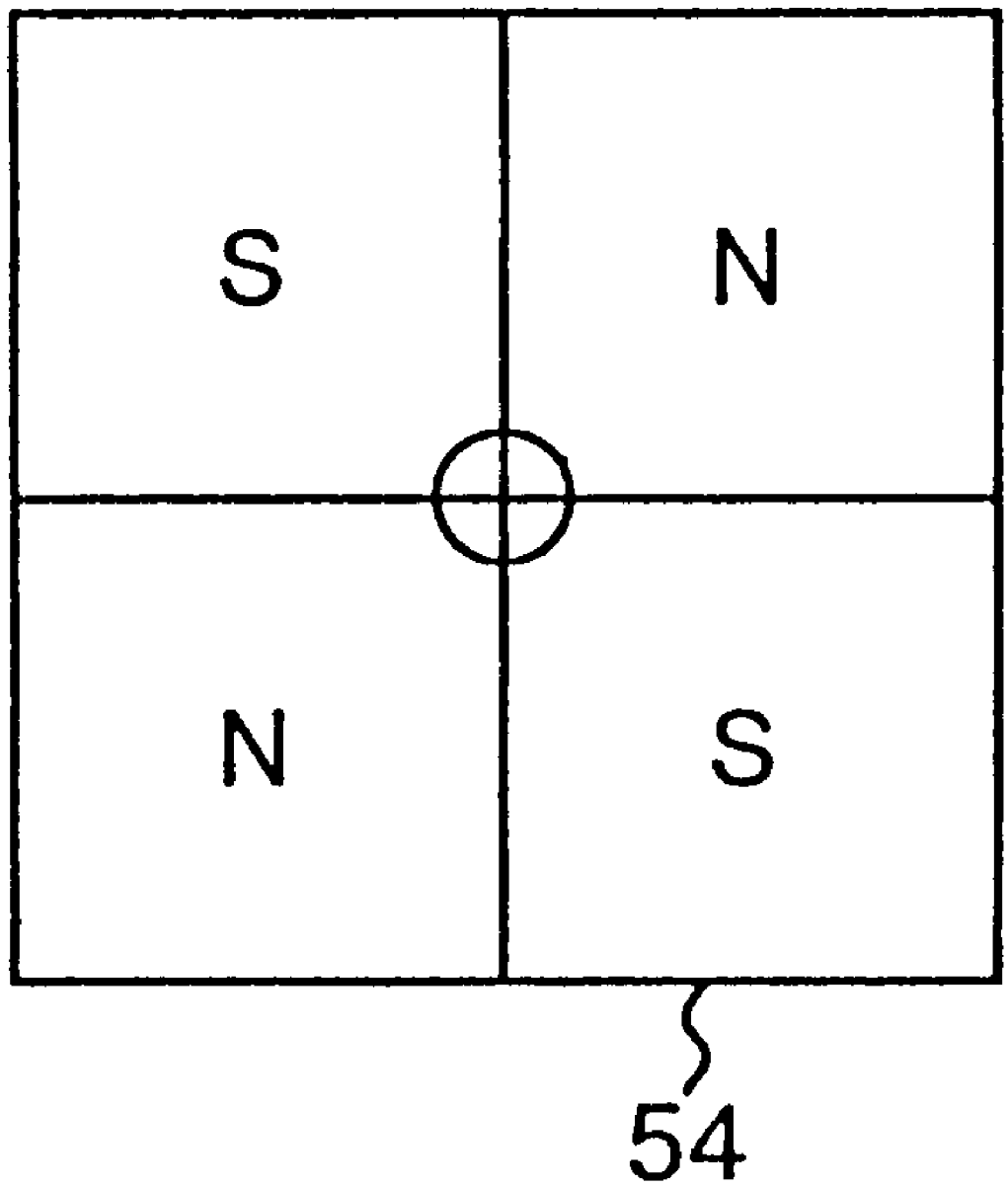
FIG. 45 is a top plan view of permanent magnets mounted in the vibration mechanism of FIG. 44.

The lower frame 42 has a first permanent magnet 52 secured thereto substantially at the center thereof, while the upper frame 46 has a second permanent magnet 54 rotatably mounted thereon substantially at the center thereof so as to face the first permanent magnet 52. Each of the first and second permanent magnets 52 and 54 has two N-poles and two S-poles disposed alternately at intervals of 90°, as shown in FIG. 45. The repulsive force or attraction can be regulated by appropriately rotating the second permanent magnet 54 relative to the first permanent magnet 52 using a rotating knob 56. The angle of rotation of the second permanent magnet 54 is maintained by inserting a pin connected to the rotating knob 56 into one of a plurality of holes 58 defined in the upper frame 46.

When static characteristics and dynamic characteristics of the vibration mechanism M3 of the above-described construction were investigated, substantially the same results as those of the vibration mechanism M2 according to the second embodiment of the present invention were obtained and, hence, graphs showing the static characteristics and the dynamic characteristics are omitted.

Figure 46:
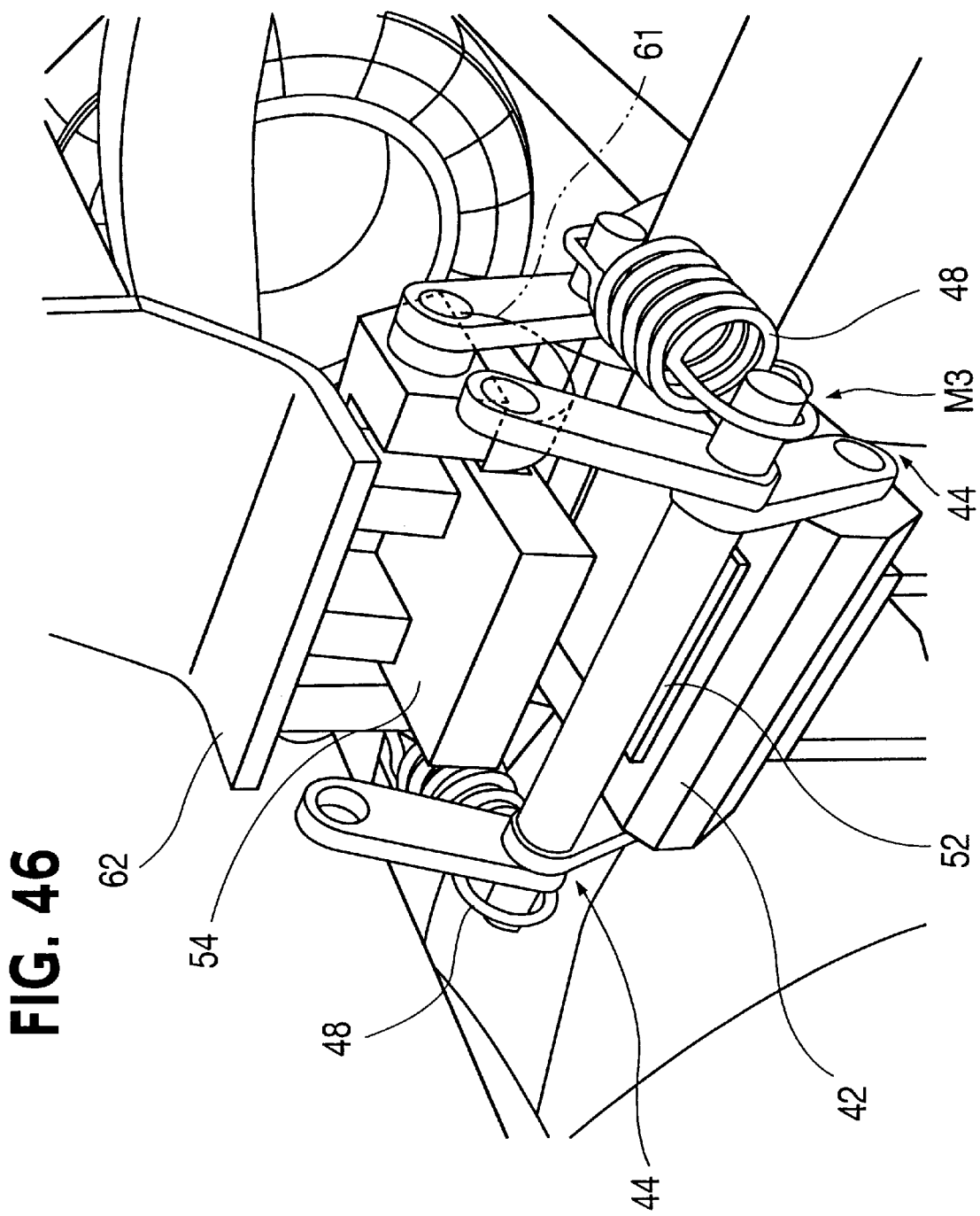
FIG. 46 is a fragmentary perspective view of the vibration mechanism of FIG. 44 when it was used for an automobile cab mount.
Figure 47:
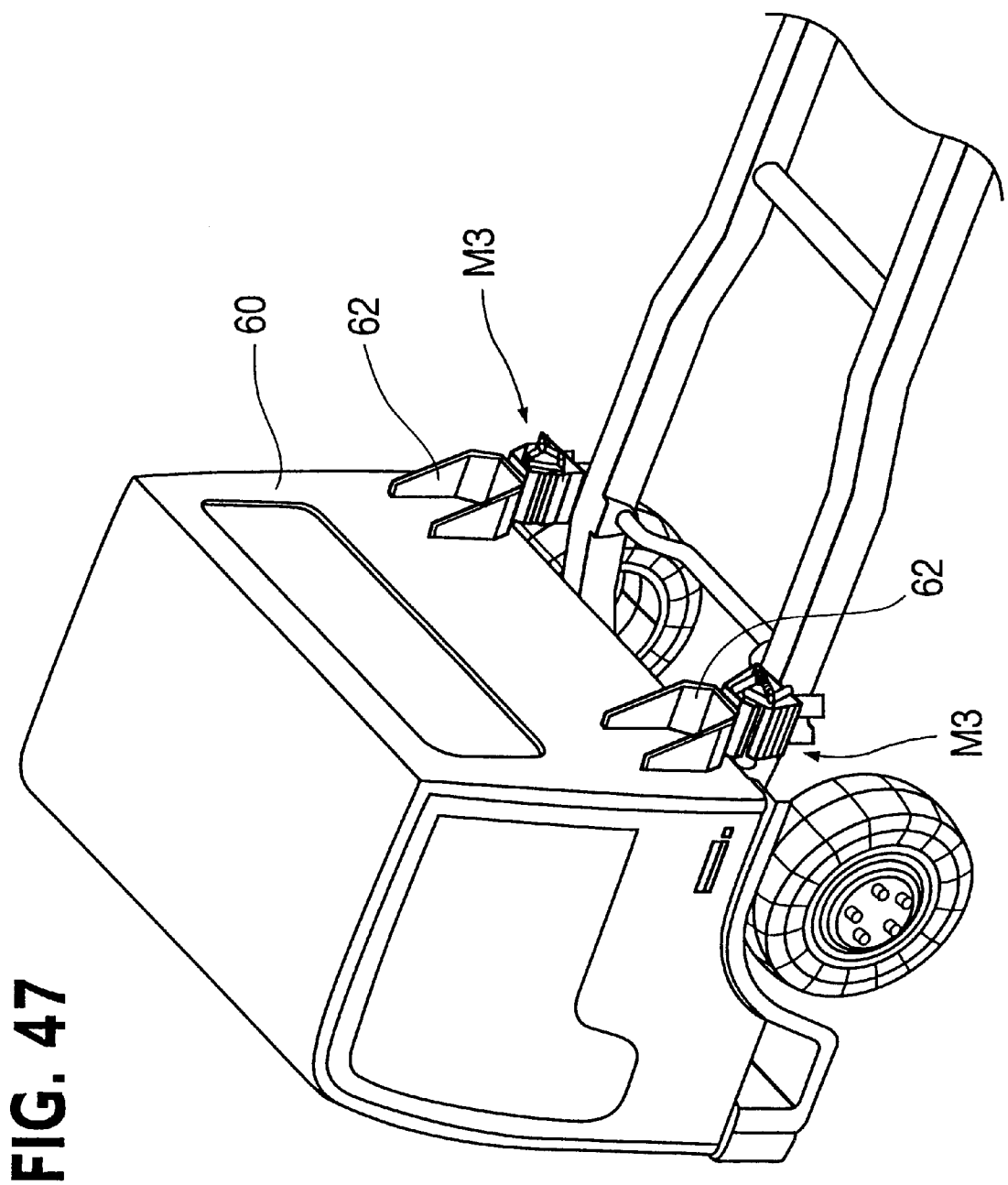
FIG. 47 is a fragmentary perspective view of an automobile in which the cab mount of FIG. 46 was incorporated.

FIGS. 46 and 47 depict a condition in which the vibration mechanism M3 shown in FIG. 44 was used for a cab mount for supporting a cab 60 of an automotive vehicle. Two vibration mechanisms (not shown) are mounted on the front side of the cab 60, while two vibration mechanisms are mounted on the rear side of the cab 60. As shown in both the figures, the lower frames 42 are mounted on the vehicle body, while the upper frames 46 are fixed to lower surfaces of brackets 62 secured to the cab 60.

As described previously, because the vibration mechanism M3 of FIG. 44 has substantially the same dynamic characteristics as those of the vibration mechanism M2 of FIG. 25, the cab mounts can considerably reduce the vibration transmissibility in a low-frequency region when vibrations are transmitted to the cab 60 from the road surface. Simultaneous use of a rubber-based spring system 61 as indicated by a double-dotted chain line in FIG. 46 can reduce not only energy in a high-frequency region where both the deflection and acceleration are large, but also energy close to an impact force. The vibration transmissibility in the high-frequency region can also be reduced by adopting urethane as a cushioning material for a seat mounted in the cab 60.

Figure 48:
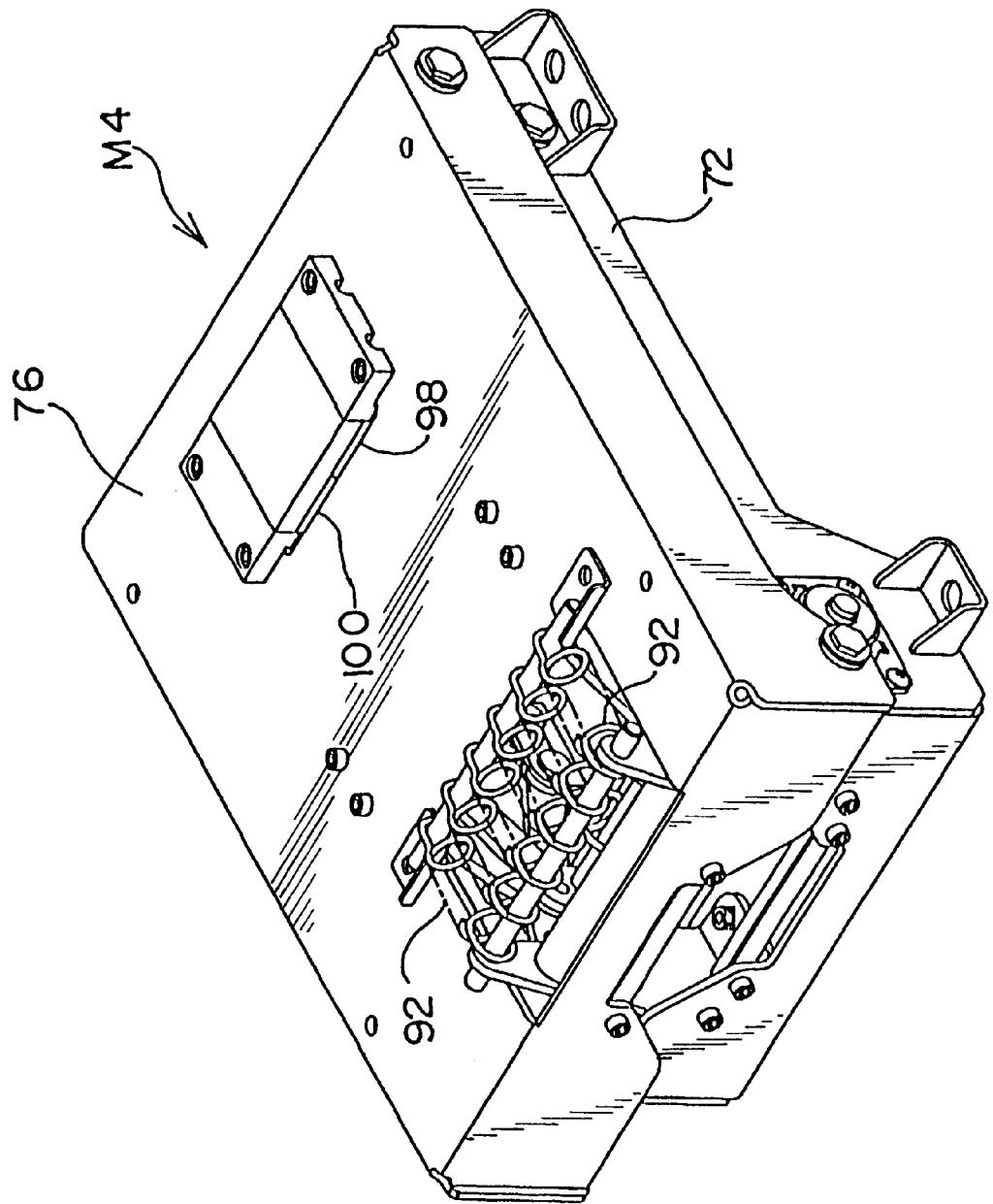
FIG. 48 is a perspective view of a vibration mechanism having a magnetic spring according to a fourth embodiment of the present invention.
Figure 49:
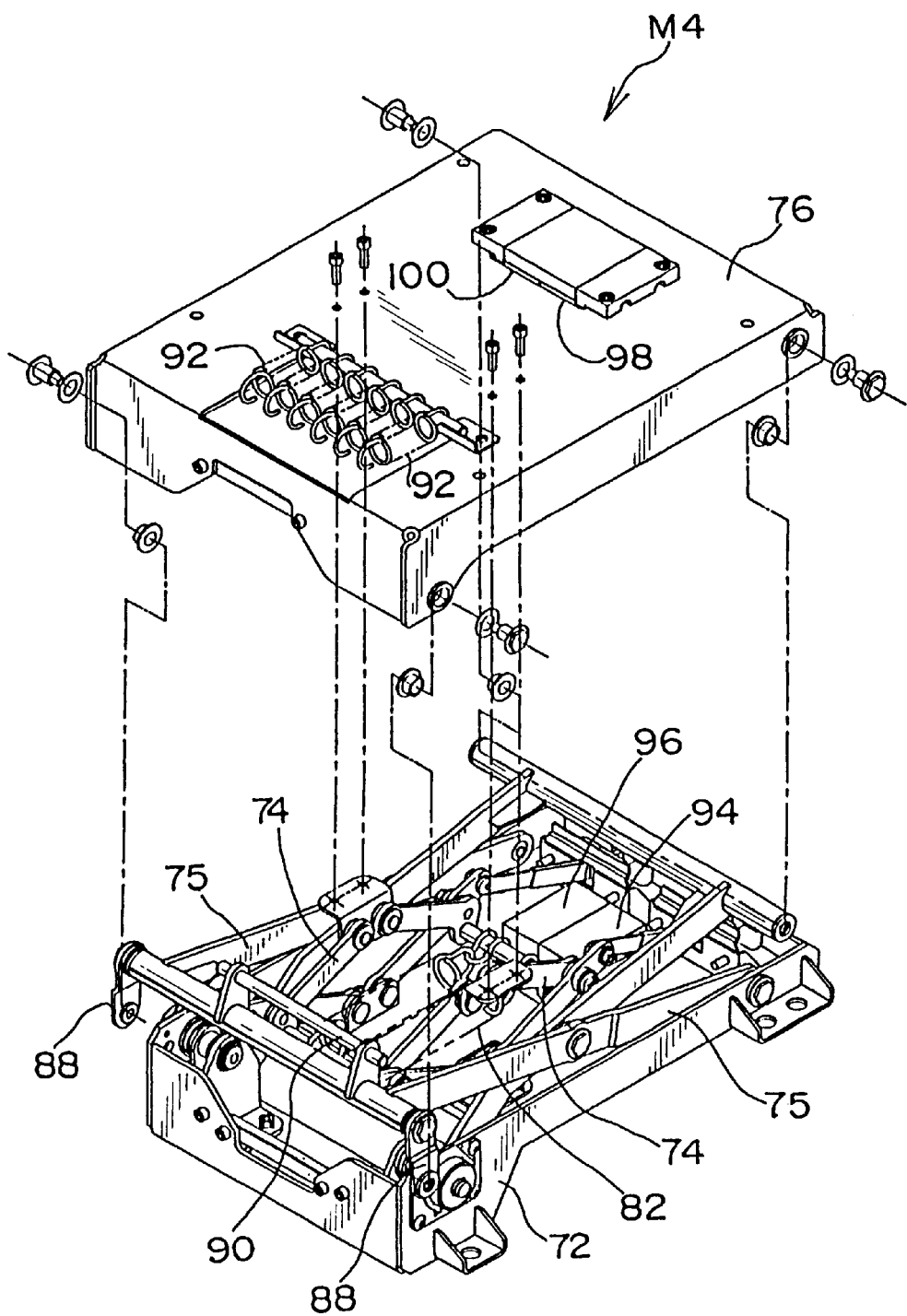
FIG. 49 is an exploded perspective view of the vibration mechanism of FIG. 48.

FIGS. 48 and 49 depict a vibration mechanism M4 having a magnetic spring according to a fourth embodiment of the present invention. As shown therein, the vibration mechanism includes a lower frame 72 mounted on a floor or the like on the side of a vibration source and an upper frame 76 vertically movably mounted on the lower frame 72 via a pair of pantograph-type link mechanisms 74 each having a plurality of links and via a pair of X-shaped links 75.

Figure 50:
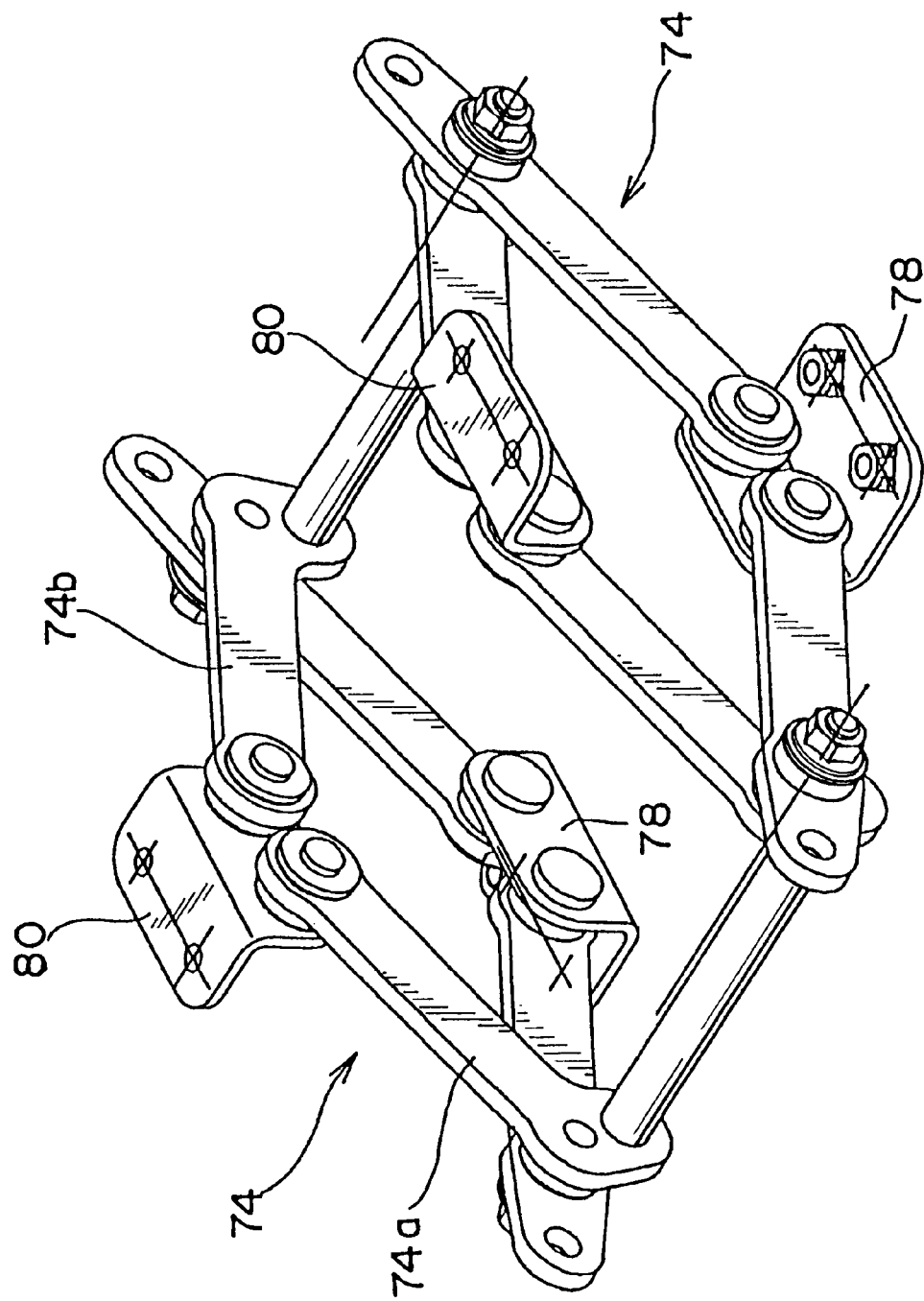
FIG. 50 is a perspective view of a pantograph-type link mechanism mounted in the vibration mechanism of FIG. 48.

As shown in FIG. 50, each of the pantograph-type link mechanisms 74 is made up of two sets of symmetrical paired links 74a and 74b with the links constituting each pair connected to each other so as to generally represent a figure "L". Lower ends of the paired links 74a and 74b are pivotally connected to the lower frame 72 via respective brackets 78, while upper ends of the paired links 74a and 74b are pivotally connected to the upper frame 76 via respective brackets 80. Intermediate portions of the paired links 74a and 74b are connected to opposite ends of each of a plurality of coil springs 82 so that the coil springs 48 may bias the paired links 74a and 74b inwardly to produce a lifting force and a lowering force of the upper frame 76.

Figure 51:
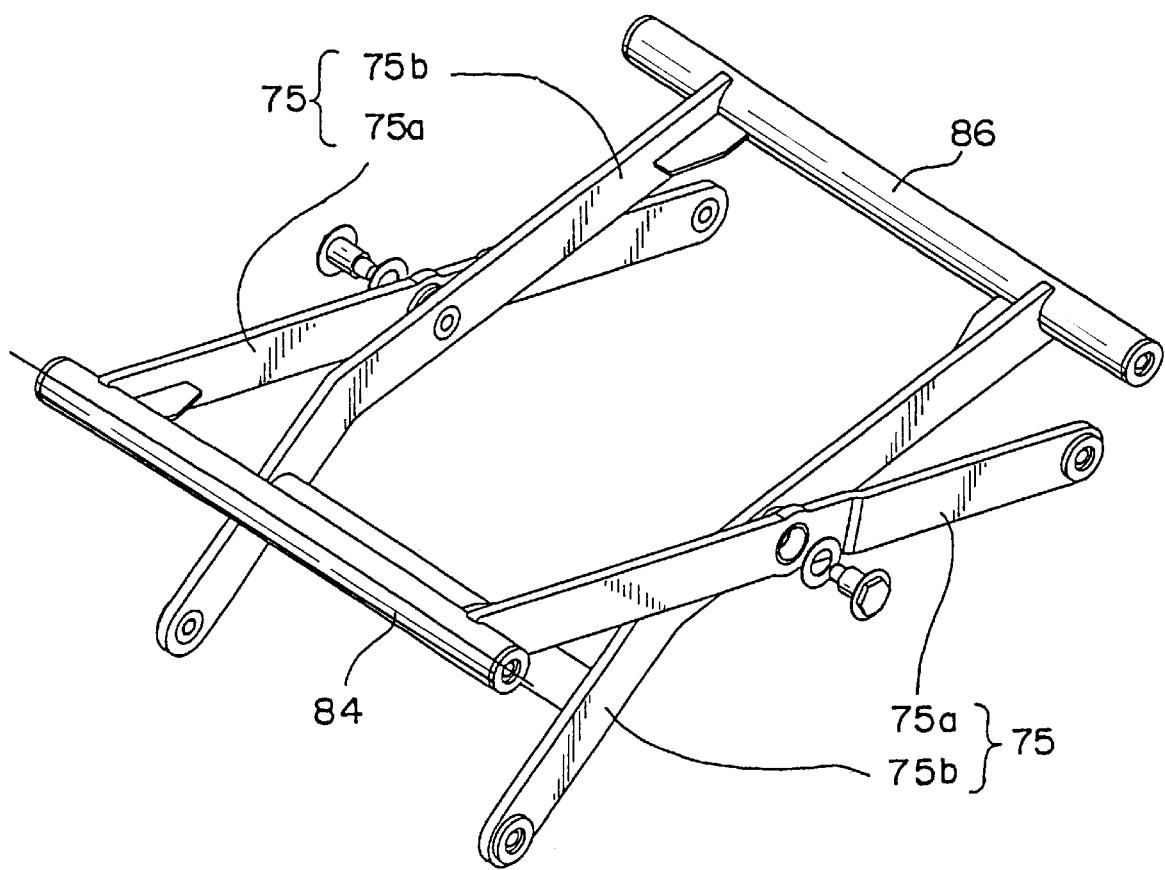
FIG. 51 is an exploded perspective view of an X-shaped link mounted in the vibration mechanism of FIG. 48.
Figure 52:
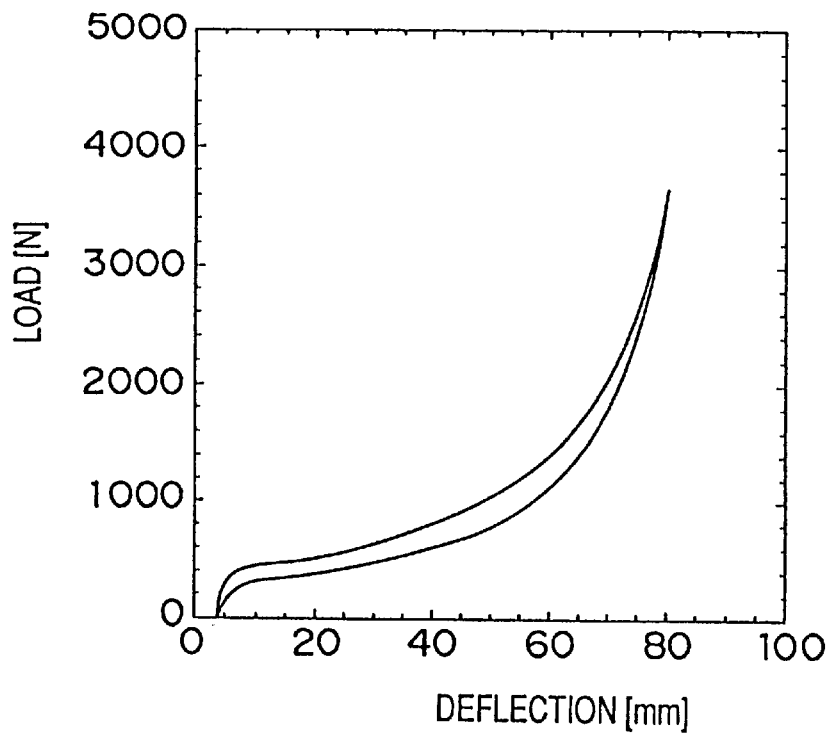
FIG. 52 is a graph showing static characteristics of the vibration mechanism of FIG. 48 having no upper coil springs.
Figure 53:
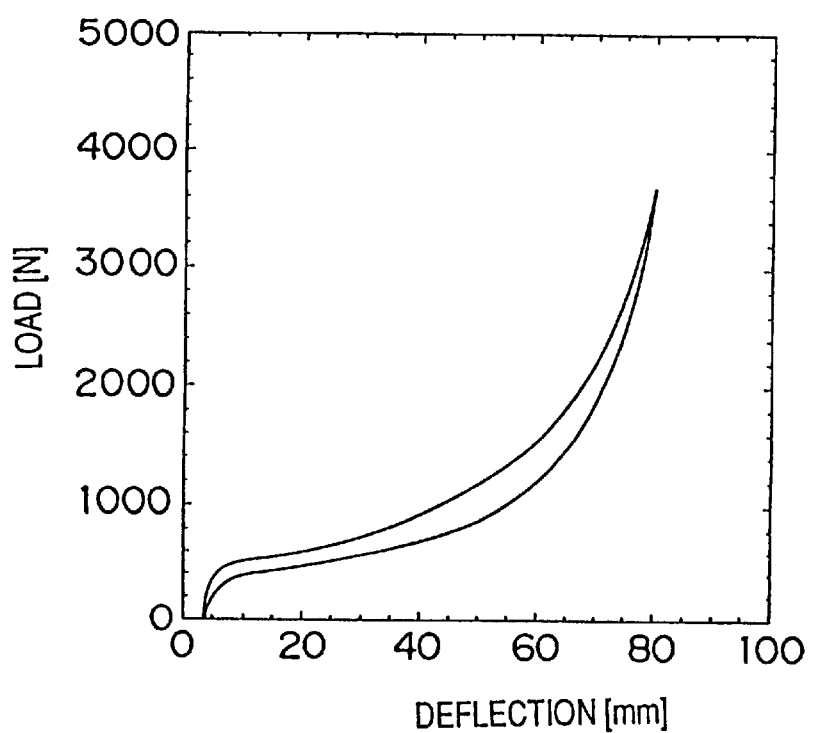
FIG. 53 is a graph similar to FIG. 52 when two upper coil springs were attached.
Figure 54:
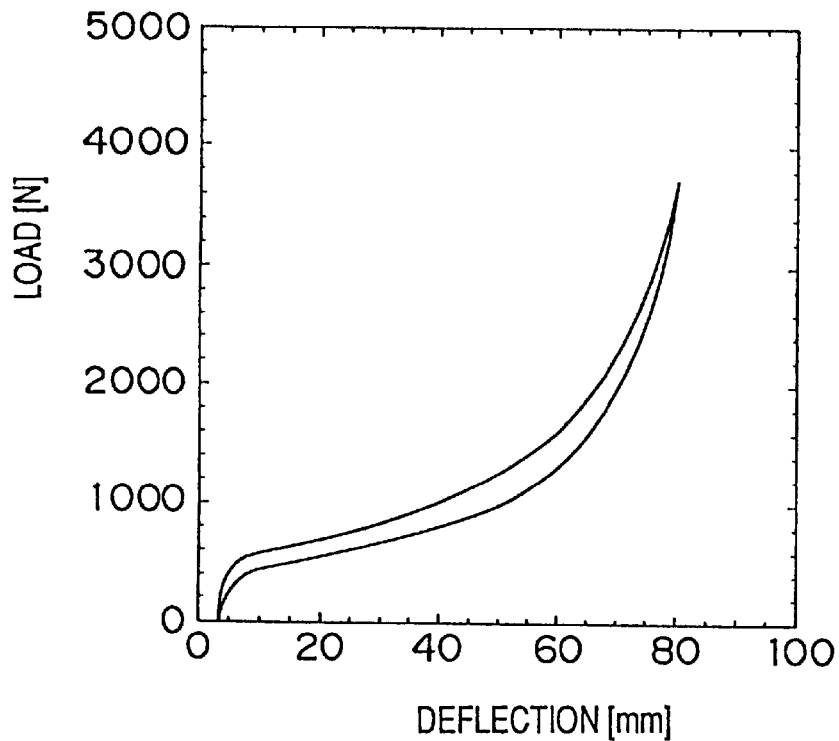
FIG. 54 is a graph similar to FIG. 52 when four upper coil springs were attached.
Figure 55:
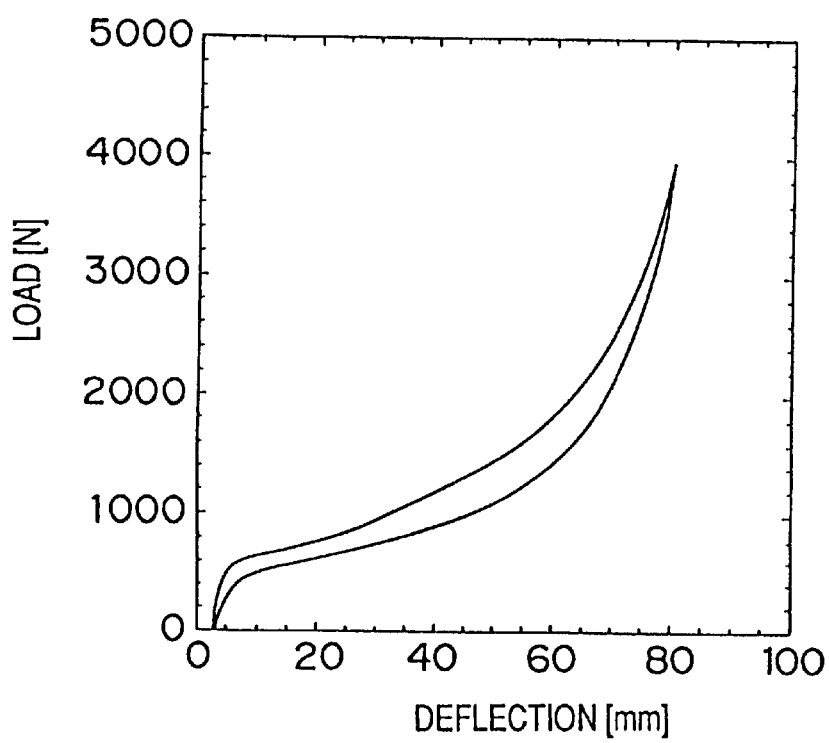
FIG. 55 is a graph similar to FIG. 52 when six upper coil springs were attached.

On the other hand, as shown in FIG. 51, each of the X-shaped links 75 is made up of two levers 75a and 75b, substantially central portions of which are rotatably connected to each other. Each of the levers 75a and 75b has a lower end pivotally connected to the lower frame 72 and an upper end secured to a hollow shaft 84 or 86. The hollow shaft 84 is rotatably connected to the upper frame 76 via levers 88, while the hollow shaft 86 is rotatably and directly connected to the upper frame 76. The hollow shaft 84 has a rod 90 mounted thereon and spaced therefrom so as to extend parallel thereto. Each of a plurality of coil springs 92 is connected at one end thereof to the rod 90 and at the other end thereof to the upper frame 76, thereby producing a lifting force of the upper frame 76.

Furthermore, two permanent magnets 94 and 96, opposite magnetic poles of which are directed upwardly, are secured to the lower frame 72 by the side of the pantograph-type link mechanisms 74, while two permanent magnets 98 and 100 are secured to the upper frame 76 with the same magnetic poles opposed to each other with respect to the corresponding permanent magnets 94 and 96, thereby causing repulsive forces generated between the permanent magnets 94 and 96 and the permanent magnets 98 and 100 to lift the upper frame 76.

In order to investigate static characteristics of the vibration mechanism M4 of the above-described construction, when permanent magnets having a size of 75 mmL×75 mmW×20 mmH (two poles) were used for the permanent magnets 94 and 96 and also for the permanent magnets 98 and 100 with the number of the coil springs 92 changed, graphs of FIGS. 52 to 55 were obtained. The static characteristics of FIG. 52, that of FIG. 53, that of FIG. 54, and that of FIG. 55 correspond to the case where no coil springs were attached, the case where two coil springs were attached, the case where four coil springs were attached, and the case where six coil springs were attached, respectively.

As can be seen from the graphs of FIGS. 52 to 55, as the number of the coil springs increases, the total spring constant of the coil springs 92 and the permanent magnets 94, 96, 98 and 100 becomes large. Accordingly, a vibration mechanism M4 having a desired spring constant and desired static characteristics best fit to different loaded masses can be realized by appropriately selecting the number of the coil springs 92 and the size of the permanent magnets 94, 96, 98 and 100.

Figure 56:
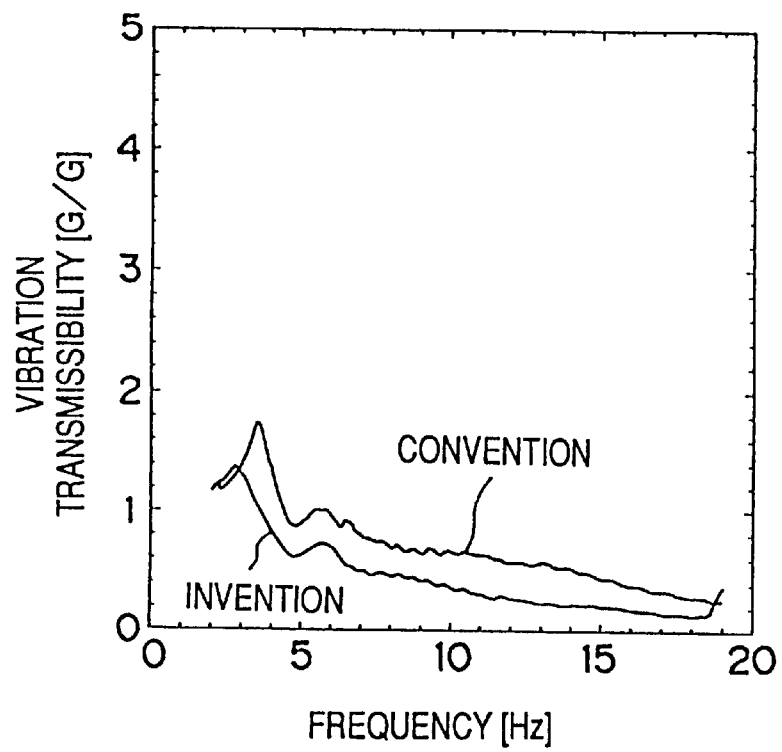
FIG. 56 is a graph showing dynamic characteristics of the vibration mechanism of FIG. 48 and those of a conventional structure having a shock absorber.

FIG. 56 depicts dynamic characteristics of the vibration mechanism M4 according to the present invention and those of a conventional mechanism having a shock absorber. A subject weighed 73 kg. As can be seen from the graph of FIG. 56, the vibration mechanism M4 according to the present invention can sufficiently reduce the vibration transmissibility in a low-frequency region and can improve the vibration characteristics without the provision of any shock absorber, unlike the conventional mechanism.

Figure 57:
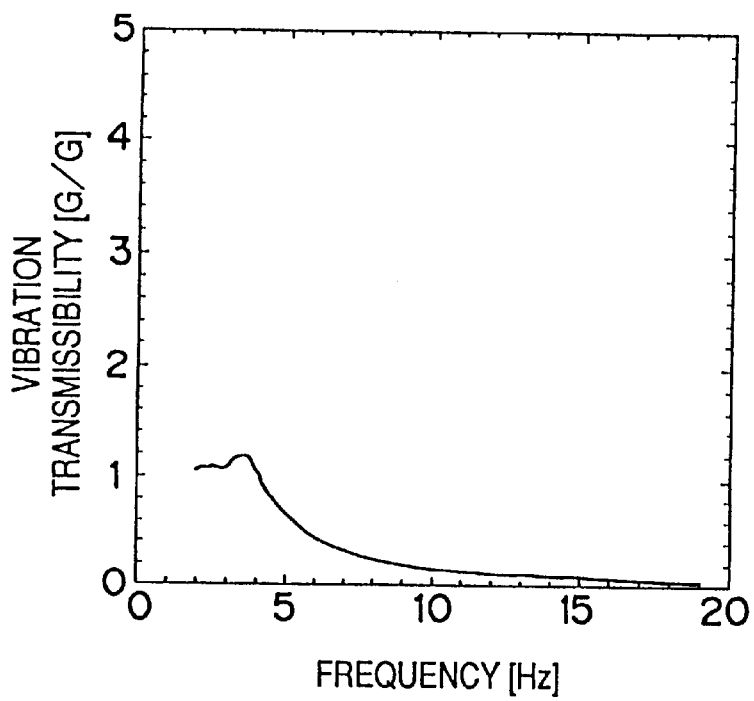
FIG. 57 is a graph showing dynamic characteristics of the vibration mechanism of FIG. 48 when a subject weighed 80 kg.

FIG. 57 depicts dynamic characteristics where a subject weighed 80 kg, particularly showing that the vibration transmissibility in the low-frequency region is further reduced. Although a reverse phase is not caused in ordinary seats without any active control, the vibration mechanism M4 according to the present invention causes the reverse phase according to input vibration energy when a predetermined weight is applied thereto, making it possible to considerably reduce the vibration transmissibility.

Figure 58:
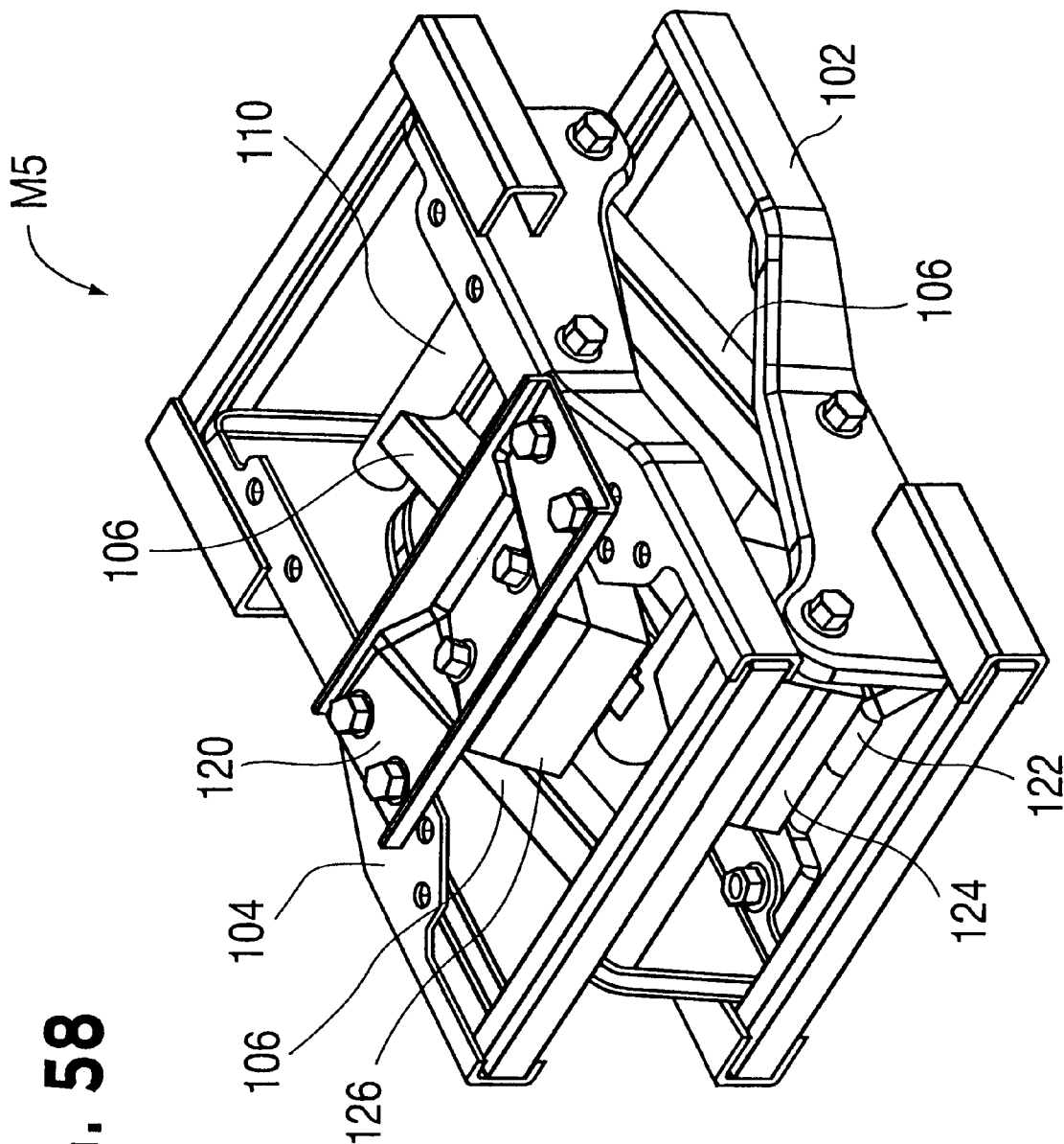
FIG. 58 is a perspective view of a vibration mechanism having a magnetic spring according to a fifth embodiment of the present invention.
Figure 59:
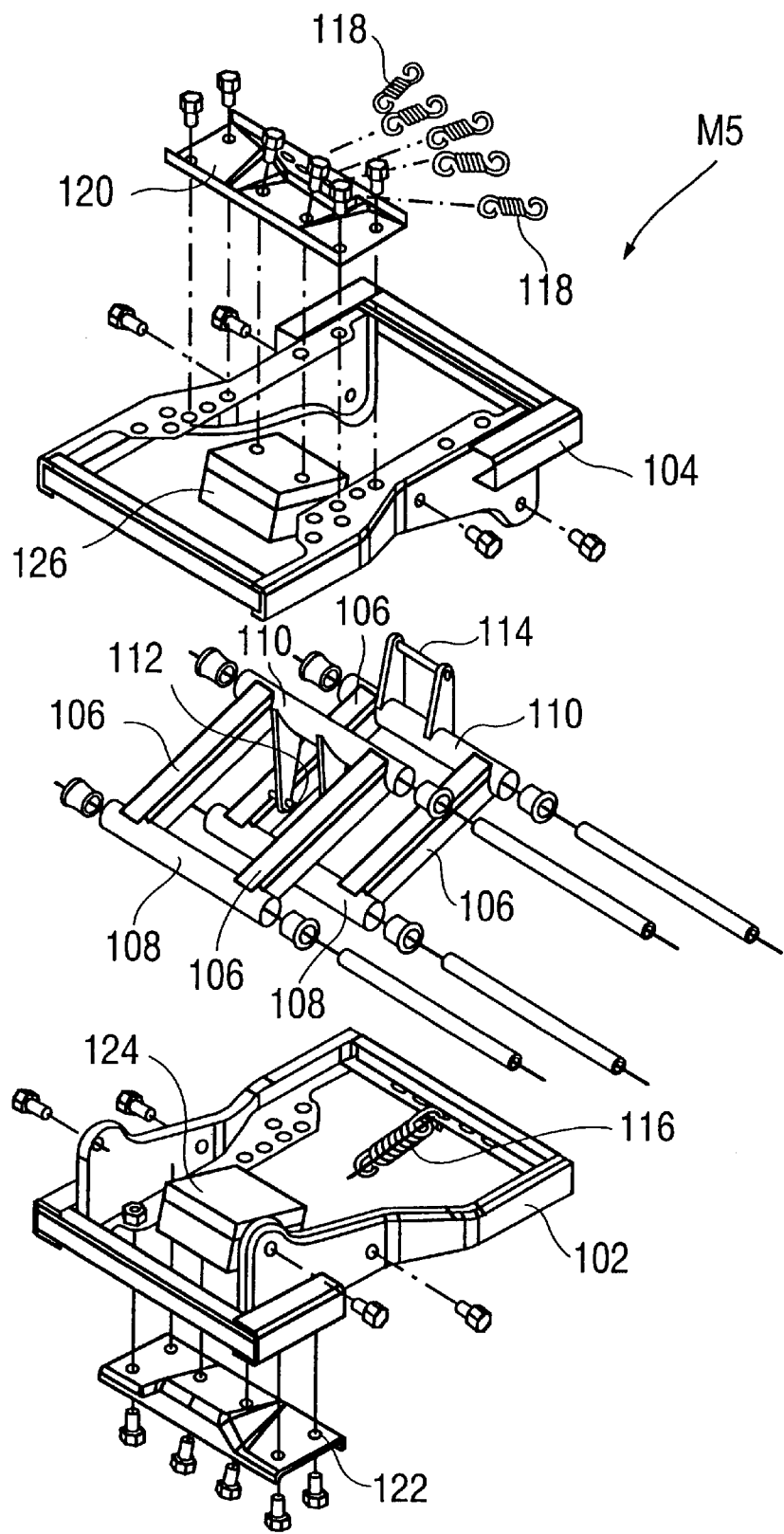
FIG. 59 is an exploded perspective view of the vibration mechanism of FIG. 58.

FIGS. 58 and 59 depict a vibration mechanism M5 having a magnetic spring according to a fifth embodiment of the present invention, but FIG. 58 particularly depicts a fundamental structure thereof having only the magnetic spring. As shown therein, the vibration mechanism includes a lower frame 102 mounted on a floor or the like on the side of a vibration source and an upper frame 104 vertically movably mounted on the lower frame 102 via link mechanisms. The link mechanisms are disposed on respective sides of the vibration mechanism M5, and each of them includes a parallel link made up of two levers 106. Each lever 106 has a lower end secured to a hollow shaft 108 pivotally connected to the lower frame 102 and an upper end secured to a hollow shaft 110 pivotally connected to the upper frame 104.

Of the hollow shafts 110 to which the upper ends of the levers 106 are secured, the front hollow shaft 110 has a rod 112 secured thereto via brackets and spaced downwardly a predetermined distance therefrom, while the rear hollow shaft 110 has a rod 114 secured thereto via brackets and spaced upwardly a predetermined distance therefrom. A coil spring 116 is connected at one end thereof to the front rod 112 and at the other end thereof to the lower frame 102. When a predetermined load is applied to the upper frame 104, the coil spring 116 contracts and is held substantially horizontally. When the upper frame 104 is moved upwardly or downwardly, the spring force of the coil spring 116 acts to reduce a top- or bottom-impinging shock. On the other hand, each of a plurality of coil springs 118 is connected at one end thereof to the rear rod 114 and at the other end to a mounting member 120 screwed to the upper frame 104, thereby producing a lifting force of the upper frame 104.

The lower frame 102 has a permanent magnet 124 secured thereto at a front center thereof via a mounting member 122 with the permanent magnet 124 inclined a predetermined angle to the horizontal plane, while the upper frame 104 has a permanent magnet 126 secured to the mounting member 120 so that the lower surface of the permanent magnet 126 may extend parallel to the upper surface of the permanent magnet 124 with the same magnetic poles opposed to each other. The repulsive force of the two permanent magnets 124 and 126 acts to lift the upper frame 104.

Figure 60:
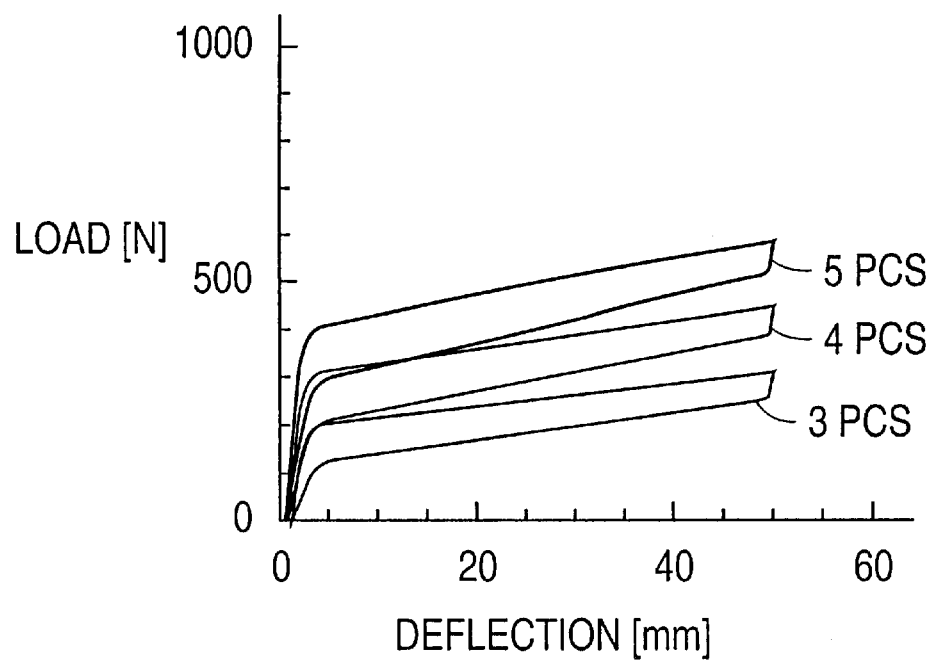
FIG. 60 is a graph showing static characteristics of the vibration mechanism of FIG. 58 when only the upper coil springs were attached thereto.
Figure 61:
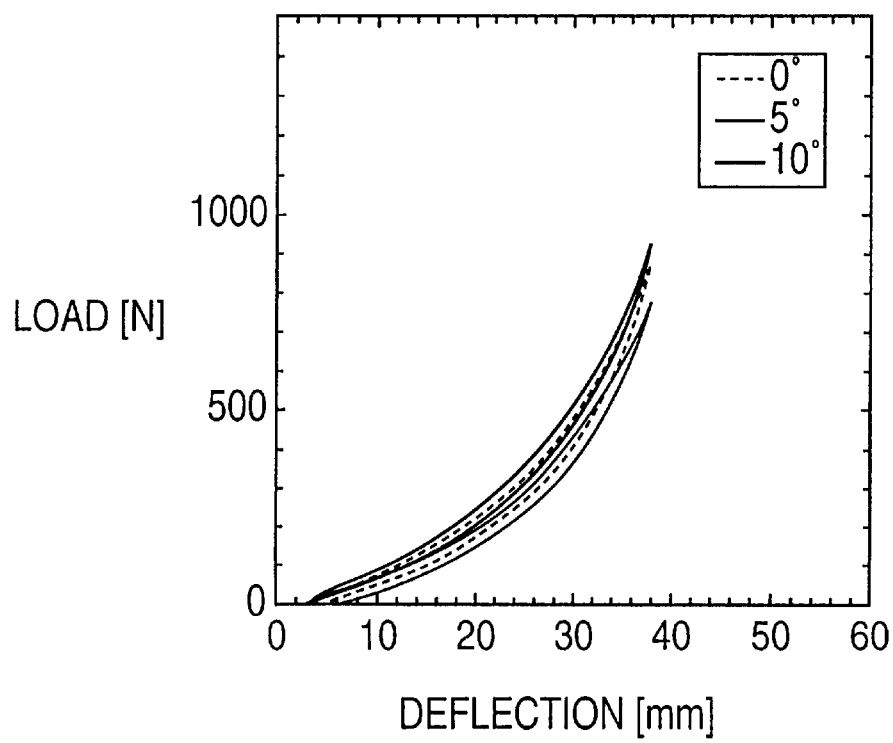
FIG. 61 is a graph showing static characteristics of the vibration mechanism of FIG. 58 when only the permanent magnets were attached thereto.
Figure 62:
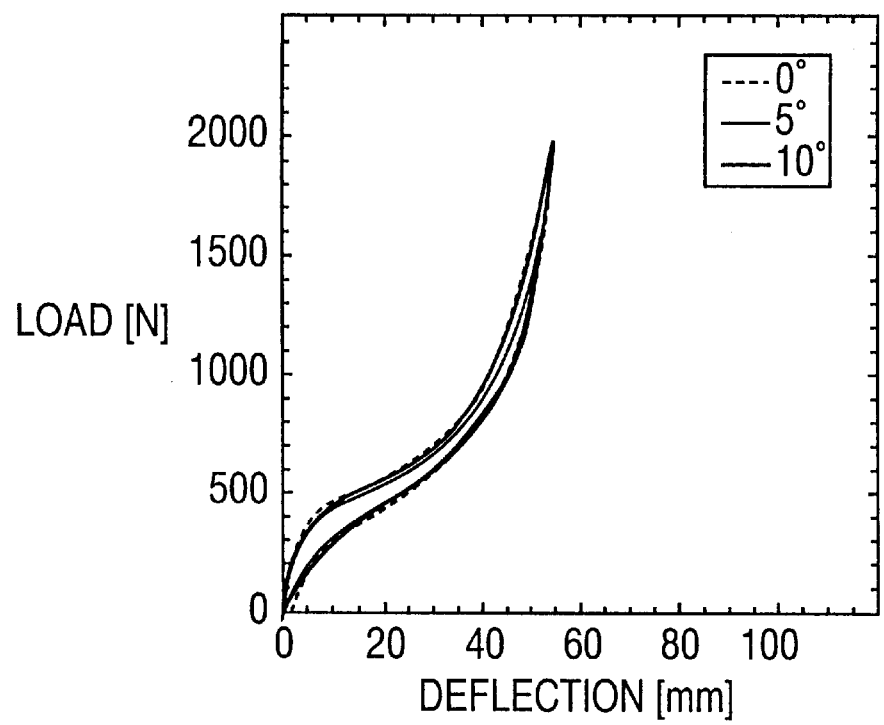
FIG. 62 is a graph showing static characteristics of the vibration mechanism of FIG. 58 when the permanent magnets and the upper coil springs were attached thereto.

When static characteristics of the vibration mechanism M5 of the above-construction were investigated, results as shown in FIGS. 60 to 62 were obtained. FIG. 60 is a graph depicting static characteristics when only the upper coil springs 118 were attached with no permanent magnets and no lower coil springs attached and when the number of the upper coil springs 118 was changed. FIG. 61 is a graph depicting static characteristics when only the permanent magnets 124 and 126 were attached with no coil springs attached. FIG. 62 is a graph depicting static characteristics when the permanent magnets 124 and 126 and five upper coil springs 118 were attached. It is to be noted that the lower coil spring 116 acts to increase a sense of spring, lower a balanced point, smooth the characteristic curve and reduce a top- or bottom-impinging shock. Angles of 0°, 5°, 10° as shown in the graphs of FIG. 61 and 62 are the angles at which the permanent magnets 124 and 126 are mounted. Dynamic characteristics of the vibration mechanism M5 are explained hereinafter in connection with the mounting angles of the permanent magnets 124 and 126.

Figure 63:
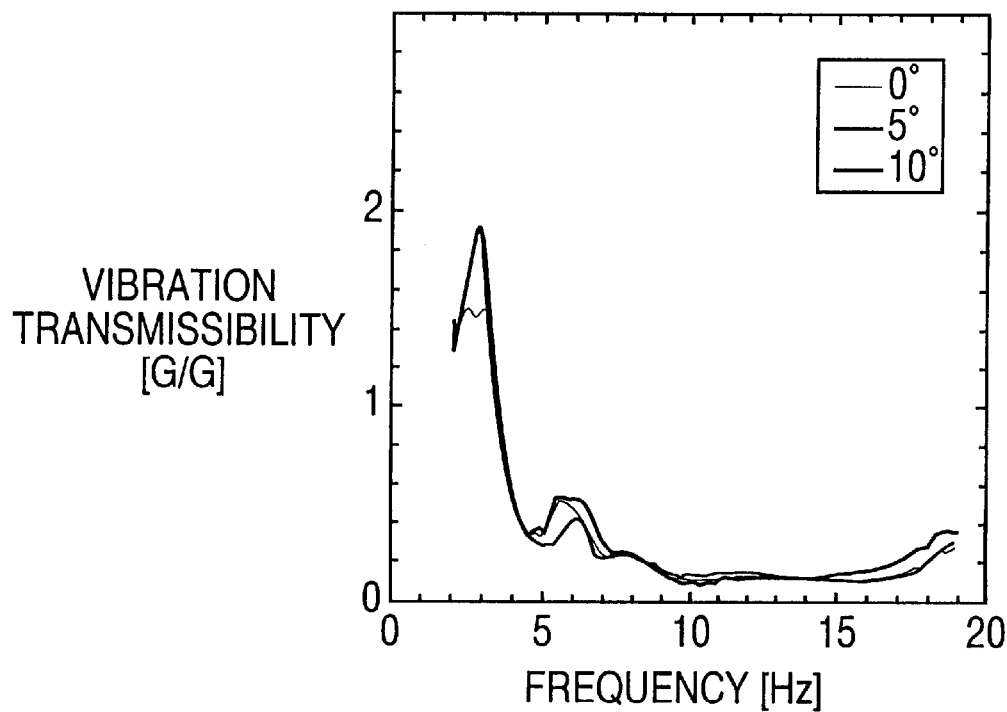
FIG. 63 is a graph showing dynamic characteristics of the vibration mechanism of FIG. 58 when a load of 68 kg was applied to a platen placed thereon.
Figure 64:
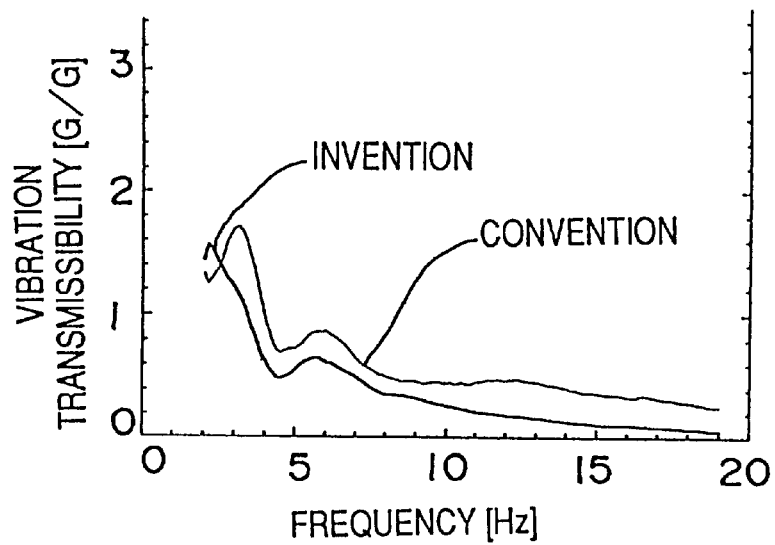
FIG. 64 is a graph showing dynamic characteristics of a seat attached to the vibration mechanism of FIG. 58 when a load of 55 kg was applied thereto.

From the graphs of FIGS. 61 and 62, although it appears that the relationship between the deflection and the load changes only slightly when the mounting angle of the permanent magnets 124 and 126 is changed by 5°, the vibration transmissibility in a low-frequency region is reduced at a predetermined mounting angle (10° in FIG. 63) under the influence of a reverse phase, as shown in graphs of FIGS. 63 and 64. The graph of FIG. 63 shows the case where a load (a subject) of 68 kg was applied to a platen (only the vibration mechanism with no seat), while the graph of FIG. 64 shows the case where a load of 55 kg was applied to a seat on the vibration mechanism.

Figure 65:
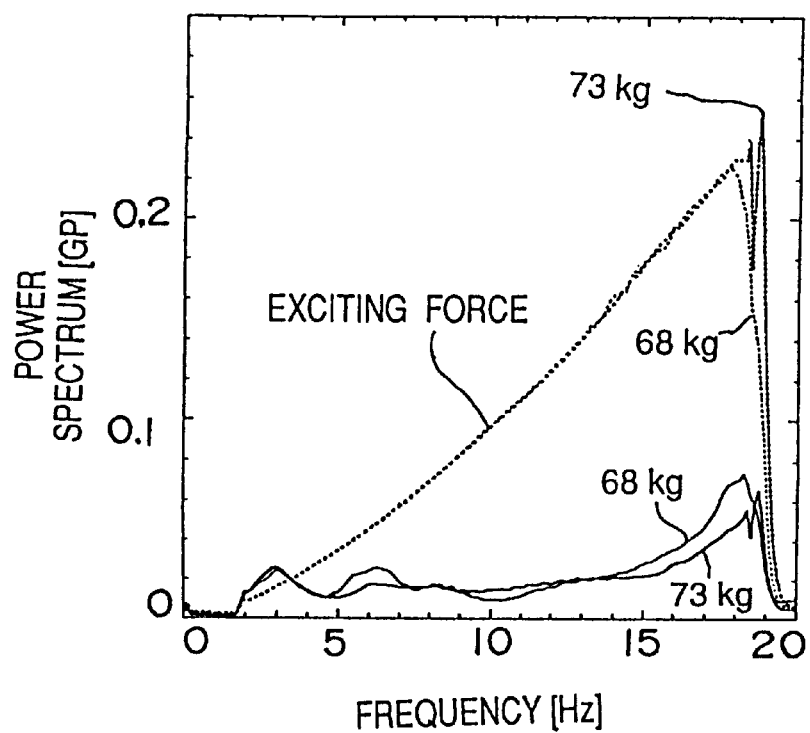
FIG. 65 is a graph showing a power spectrum when a platen was attached to the vibration mechanism of FIG. 58 with the permanent magnets inclined by 10°.

FIG. 65 depicts a power spectrum when loads of 68 kg and 73 kg were oscillated on the platen with the mounting angle of the permanent magnets 124 and 126 set to 10°. As can be seen from this graph, load vibrations are considerably attenuated throughout almost the whole frequency with respect to exciting forces shown by dotted lines, and it is recognized that a reverse phase occurred at low frequencies.

Figure 66:
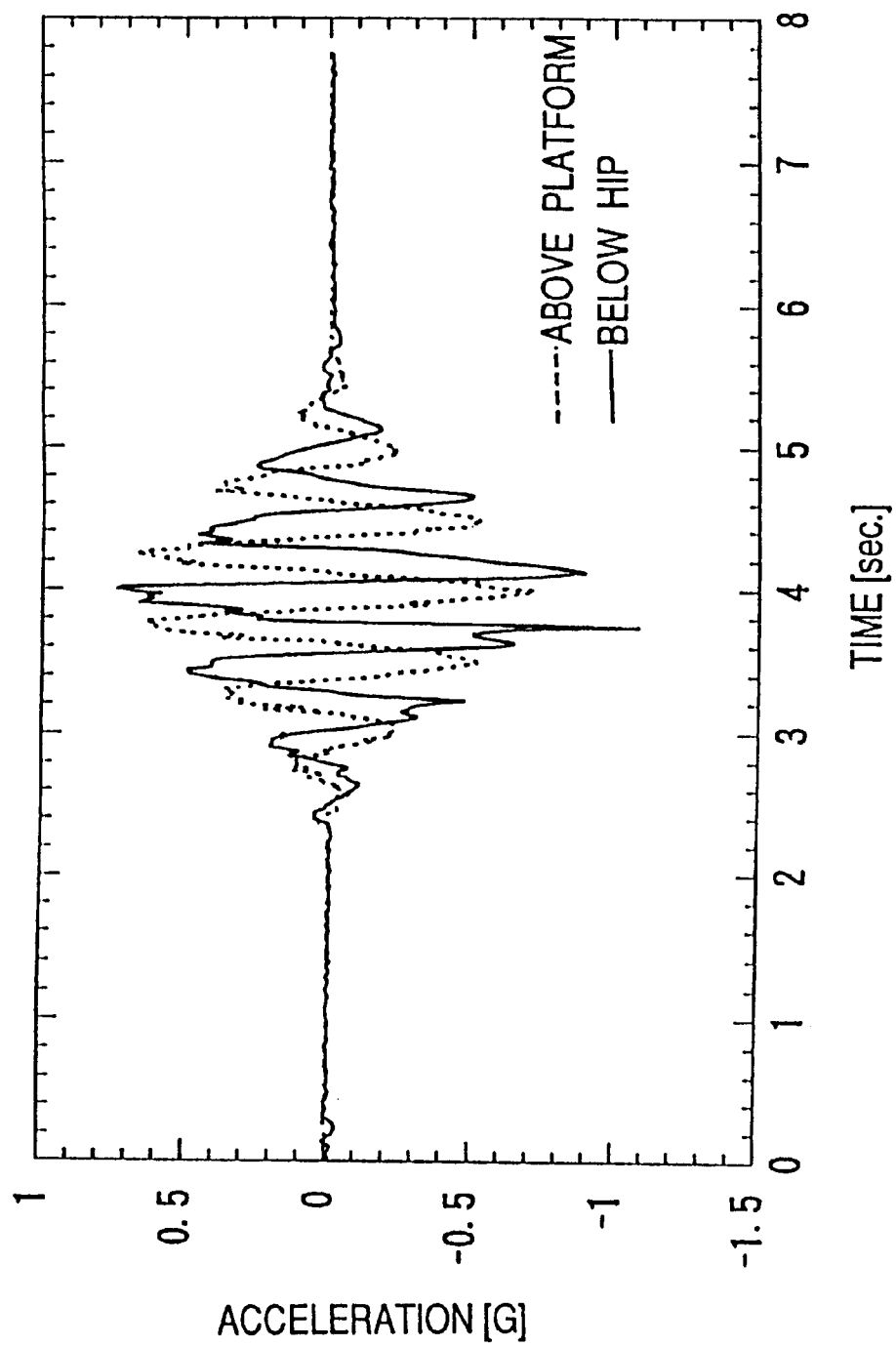
FIG. 66 is a graph showing a waveform above an exciting platform and that below a hip of a subject when the vibration mechanism of FIG. 58 was used.

FIG. 66 depicts a waveform above an exciting platform and that below a hip of a subject where the subject weighed 94 kg and was oscillated at a frequency of 2 Hz. As can be seen from this graph, in the vibration mechanism employing the magnetic spring, a phase lag occurs which in turn reduces the vibration transmissibility.

The mounting angle of the permanent magnets 124 and 126 is further discussed below.

Figure 67:
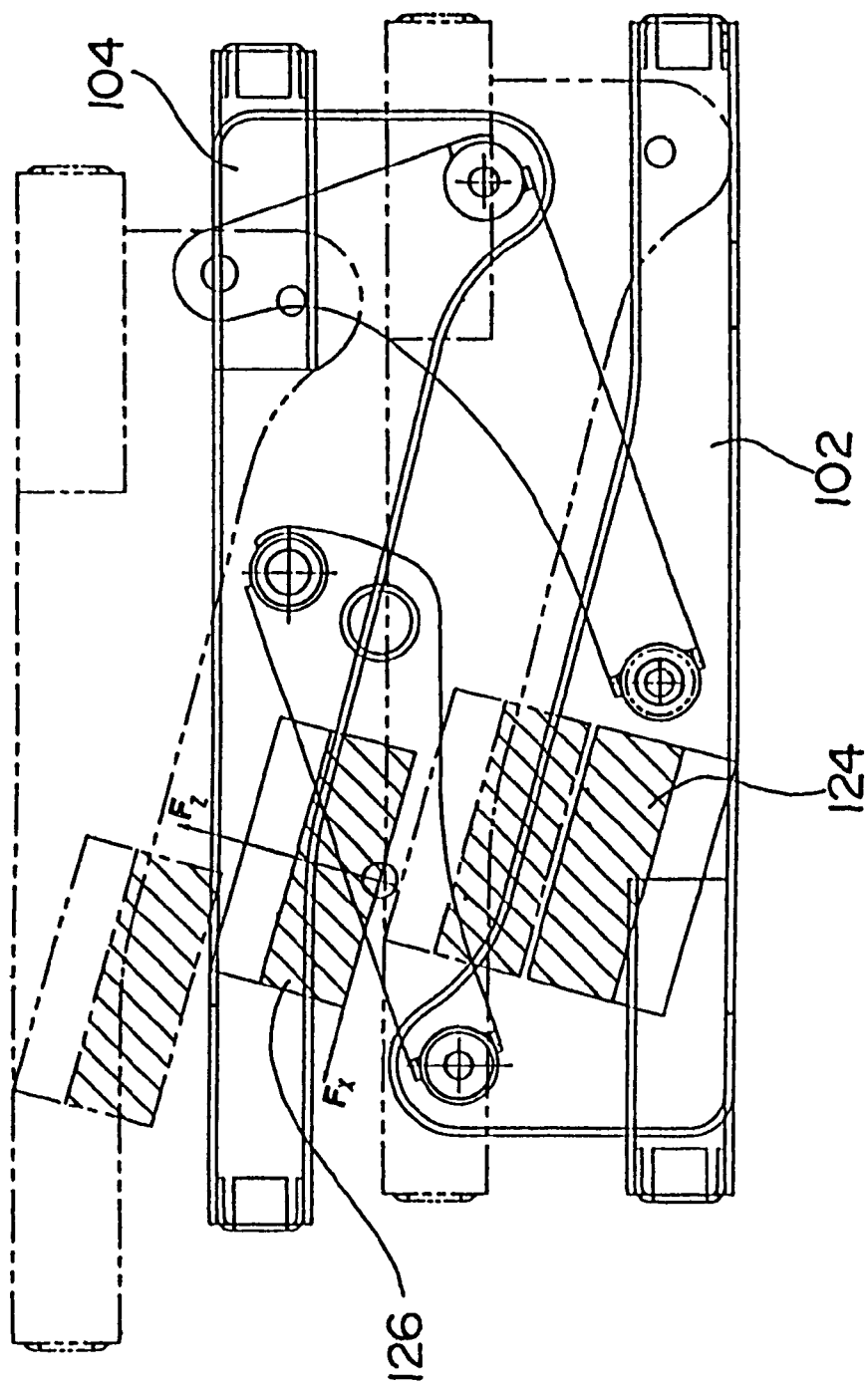
FIG. 67 is a schematic side view of the vibration mechanism of FIG. 58, particularly showing the mounting angle of the permanent magnets.

In this specification, a mounting angle of 0° means the condition in which the permanent magnets 124 and 126 are inclined a specific angle to the lower frame 102 and the upper frame 104, respectively, as shown in FIG. 67. A mounting angle of 5° means the condition in which the permanent magnets 124 and 126 are inclined 5° clockwise from the above condition, while a mounting angle of 10° means the condition in which the permanent magnets 124 and 126 are further inclined 5° clockwise.

Figure 68:
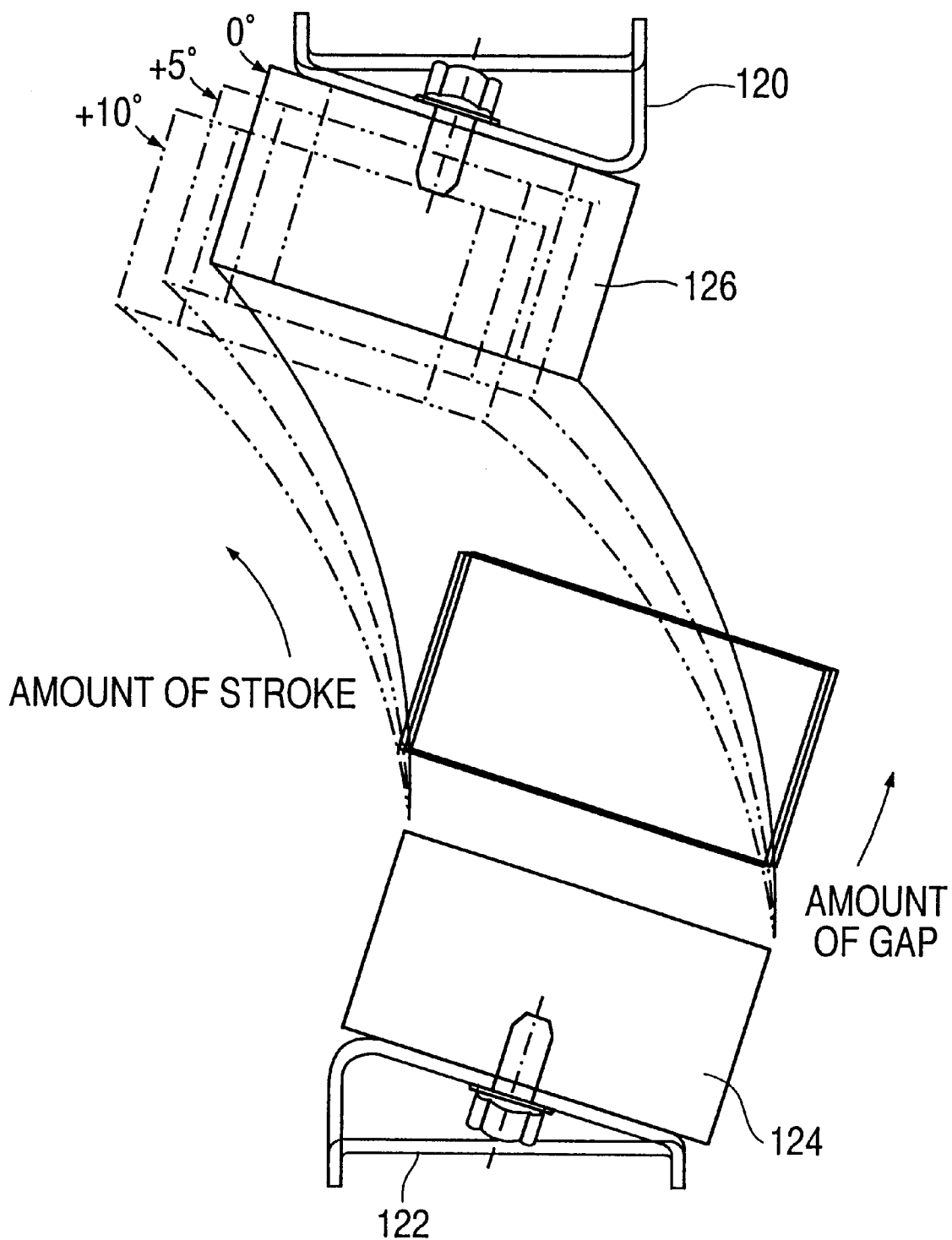
FIG. 68 is a schematic side view showing loci of movement of an upper permanent magnet in the vibration mechanism of FIG. 58 when the mounting angle of the permanent magnets was changed.

FIG. 68 depicts loci of movement of the upper permanent magnet 126 relative to the lower permanent magnet 124 when the mounting angles are 0°, 5° and 10°, respectively. Although the amount of stroke is constant, a change in the opposing area increases with an increase in the mounting angle.

Figure 69:
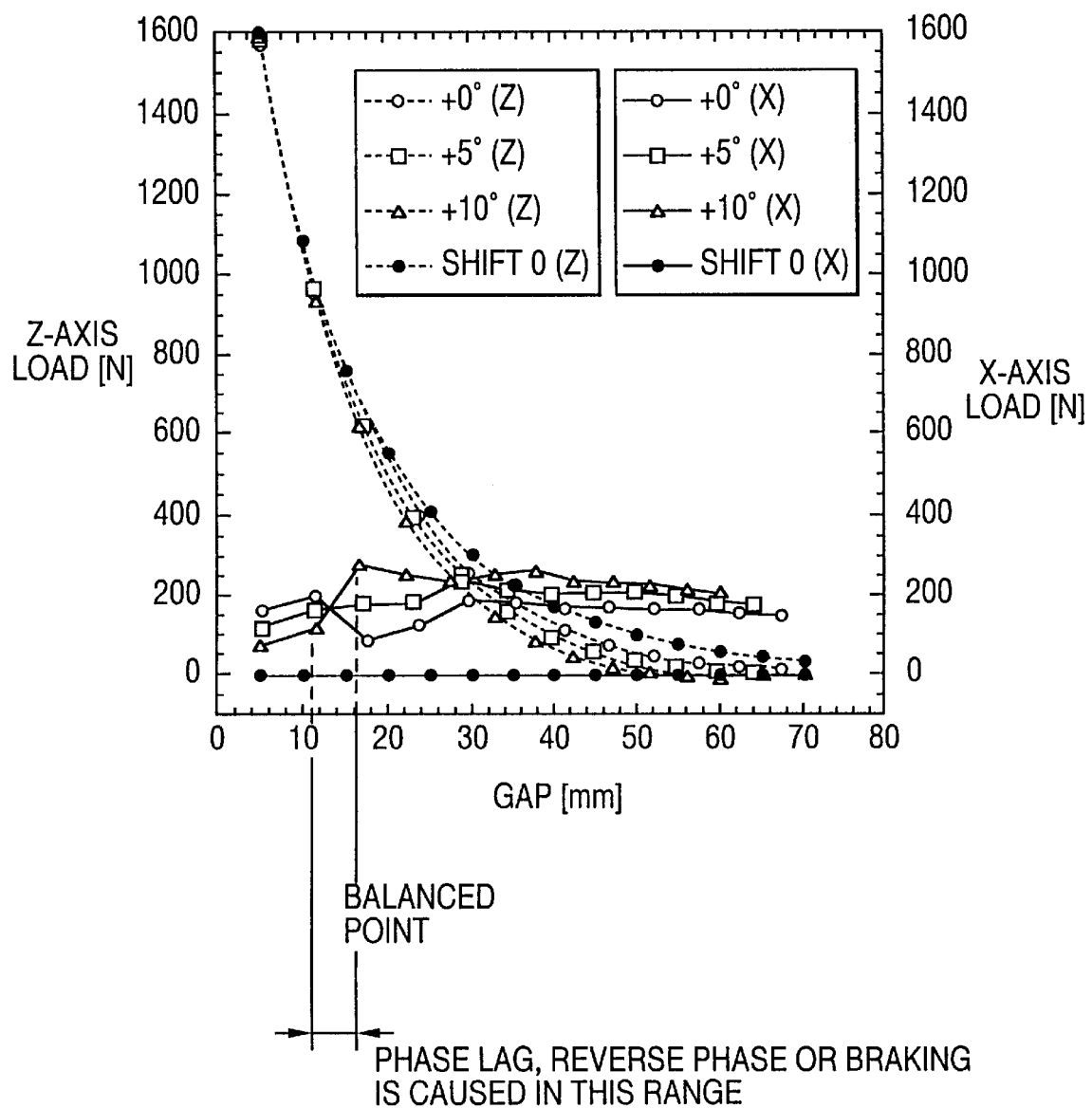
FIG. 69 is a graph showing a relationship between the X- and Z-axis loads and the amount of gap when the mounting angle of the permanent magnets was changed.
Figure 70:
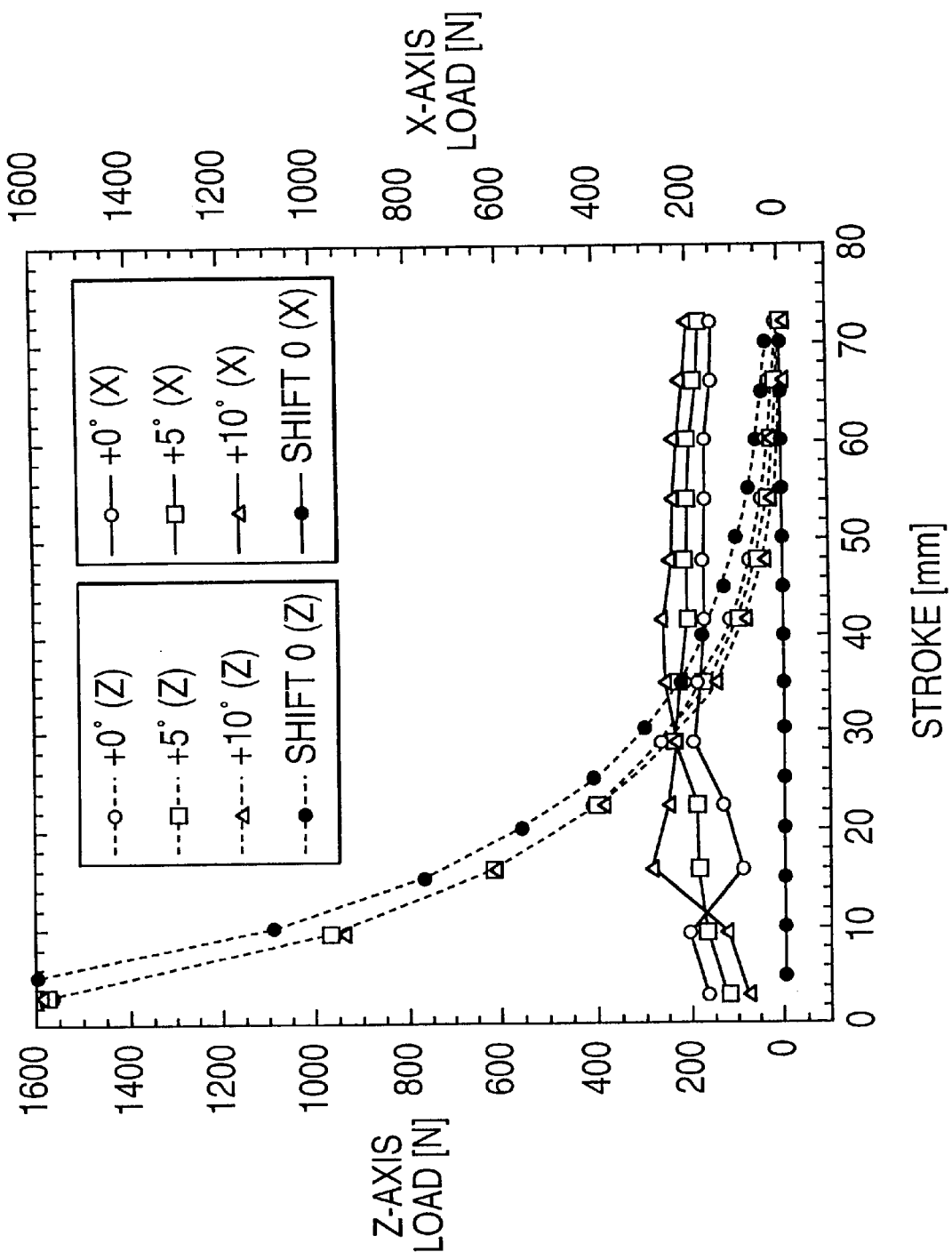
FIG. 70 is a graph showing a relationship between the X- and Z-axis loads and the amount of stroke when the mounting angle of the permanent magnets was changed.
Figure 71:
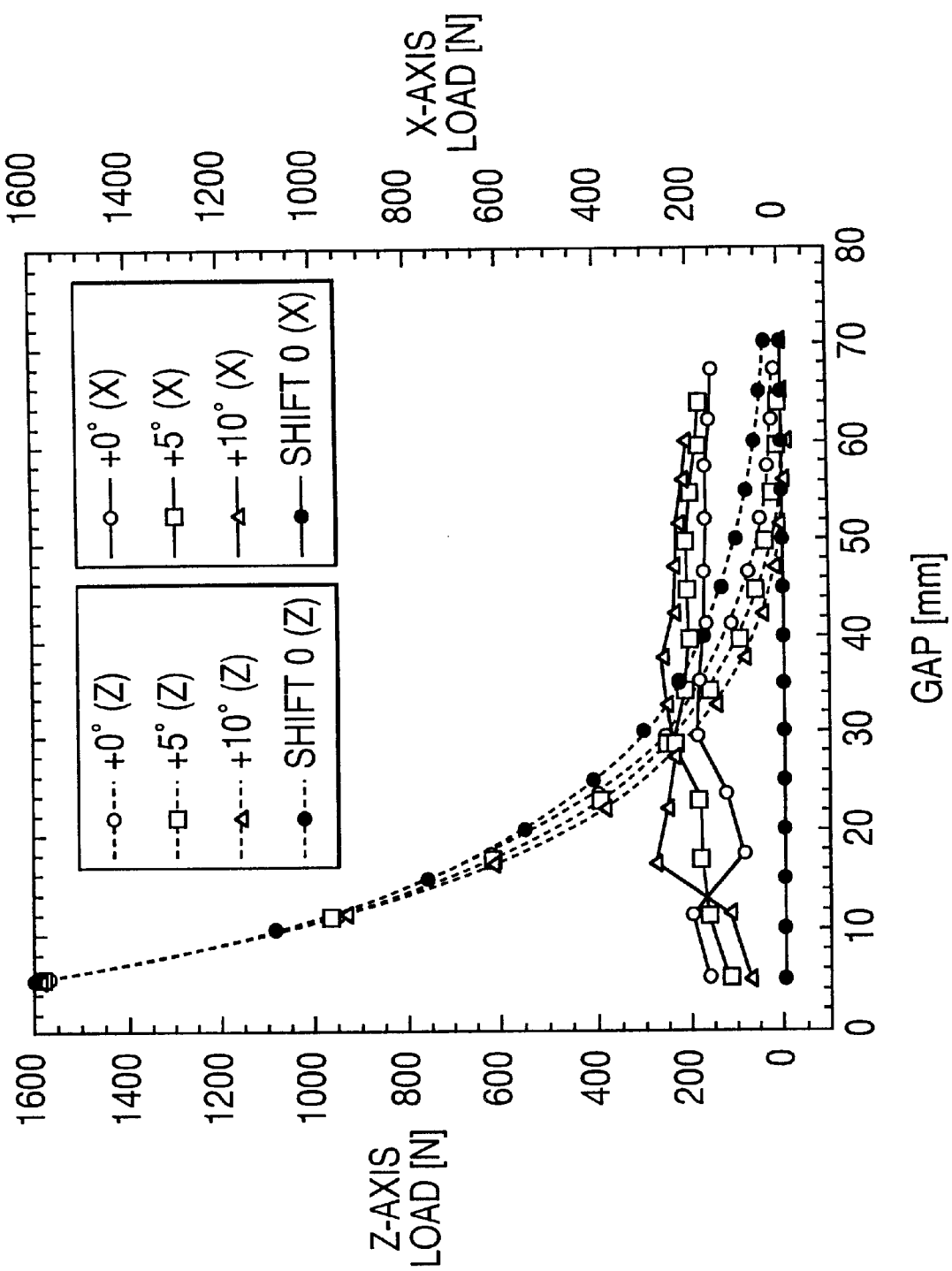
FIG. 71 is a graph similar to FIG. 69, when different permanent magnets were used.
Figure 72:
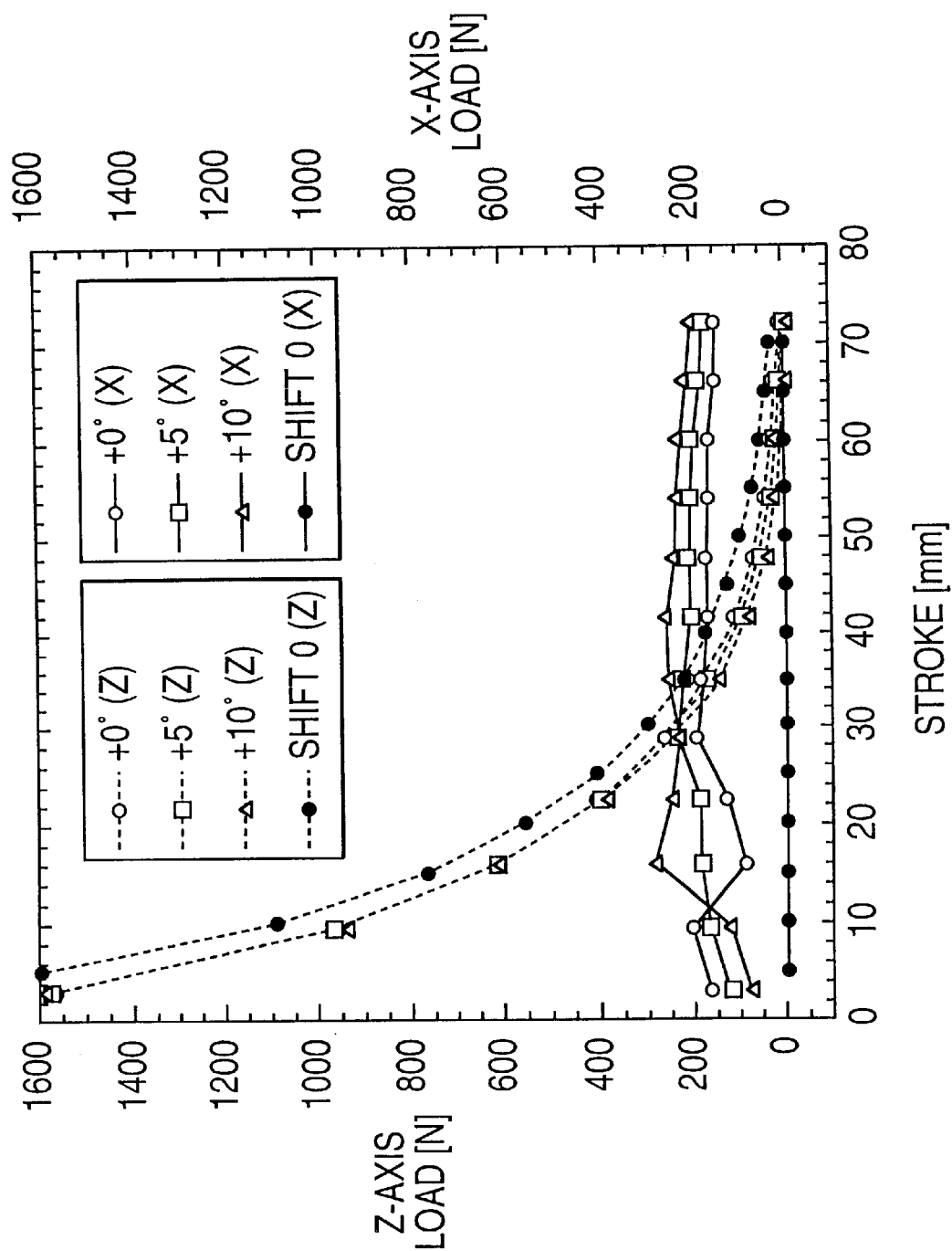
FIG. 72 is a graph similar to FIG. 70, when different permanent magnets were used.

FIGS. 69 and 70 depict the load in the X-axis direction and that in the Z-axis direction relative to the amount of gap and the load in the X-axis direction and that in the Z-axis direction relative to the amount of stroke, respectively, when permanent magnets having a size of 75 mmL×75 mmW×20 mmH were used for the permanent magnets 124 and 126. FIGS. 71 and 72 depict the load in the X-axis direction and that in the Z-axis direction relative to the amount of gap and the load in the X-axis direction and that in the Z-axis direction relative to the amount of stroke, respectively, when permanent magnets having a size of 75 mmL×75 mmW×15 mmH were used for the permanent magnets 124 and 126. In the figures, "shift 0" means the condition in which only the distance in the Z-axis direction was changed with the opposing area maintained constant. These graphs were obtained by making use of the input/output characteristics of FIG. 6.

In the graphs of FIGS. 69 to 72, although the load in the Z-axis direction increases as the mounting angle of the permanent magnets 124 and 126 decreases, the load in the X-axis direction increases as the mounting angle of the permanent magnets 124 and 126 increases in the case where the amount of gap or stroke is greater than a predetermined value. Because both the load in the Z-axis direction and that in the X-axis direction act as a moment in terms of the lifting force of the upper frame 104, the amount of change in static magnetic energy can be effectively converted into the lifting force of the upper frame 104 by appropriately setting the mounting angle of the permanent magnets 124 and 126 to a predetermined angle.

Furthermore, although the influence of the reverse phase is recognized in the graphs of FIGS. 63 and 64, as described previously, it is considered that this was caused by the load in the X-axis direction that was generated by virtue of inclination of the permanent magnets 124 and 126, and that a downward movement of the upper permanent magnet 126 from a balanced point of a gap of 16 mm, which was caused by input, reduced the gap and abruptly changed the load in the X-axis direction, thereby giving rise to a phase lag, a reverse phase or braking. Also, when the mounting angle was set to 0°, a braking effect has been recognized with respect to a low-frequency impact force through sensual evaluation.

Figure 73:
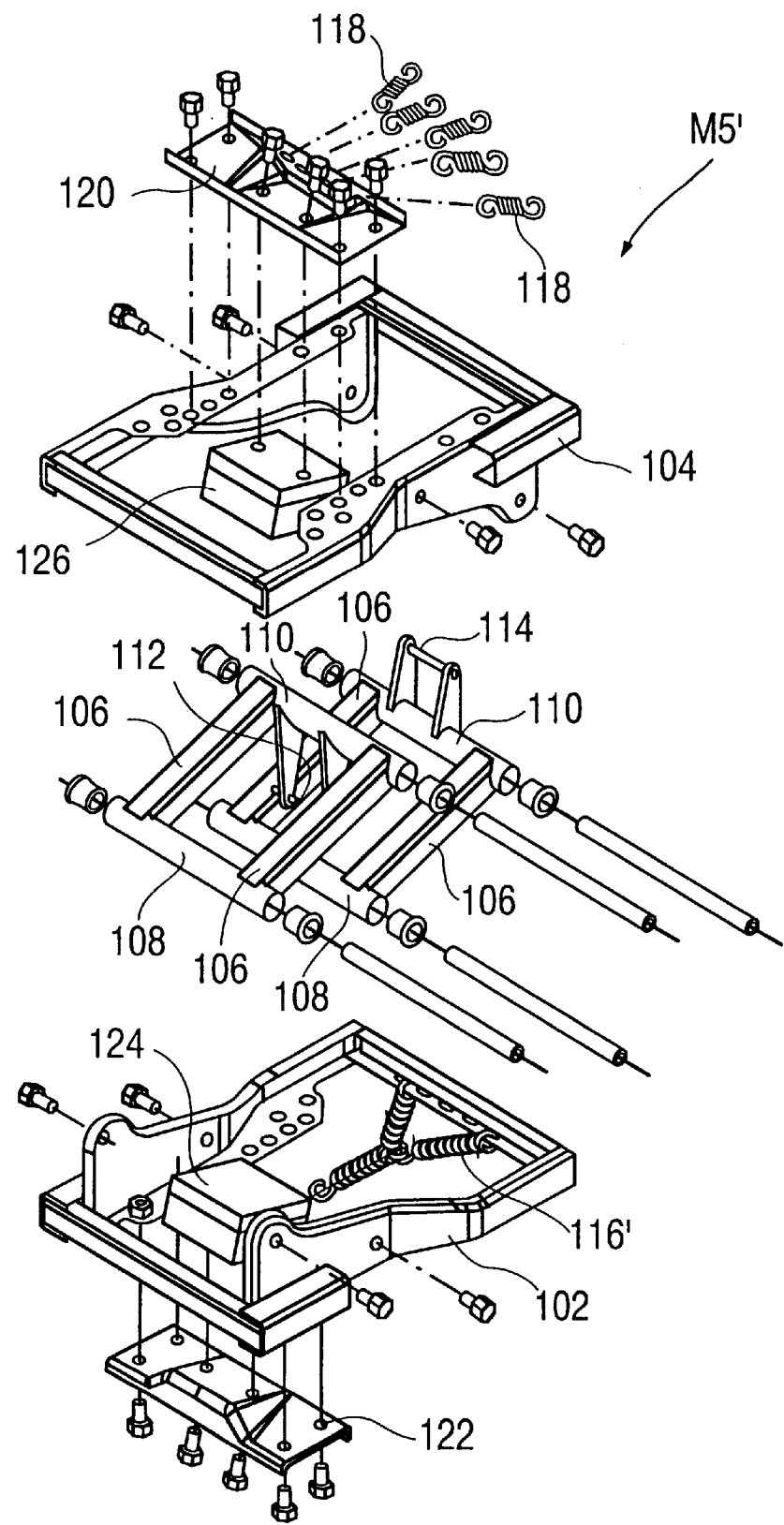
FIG. 73 is an exploded perspective view of a modification of the vibration mechanism of FIG. 59.

FIG. 73 depicts a modification M5' of the vibration mechanism M5 shown in FIG. 59 wherein the lower coil spring 116 mounted in the vibration mechanism M5 was replaced by a Y-shaped coil spring 116'.

Figure 74:
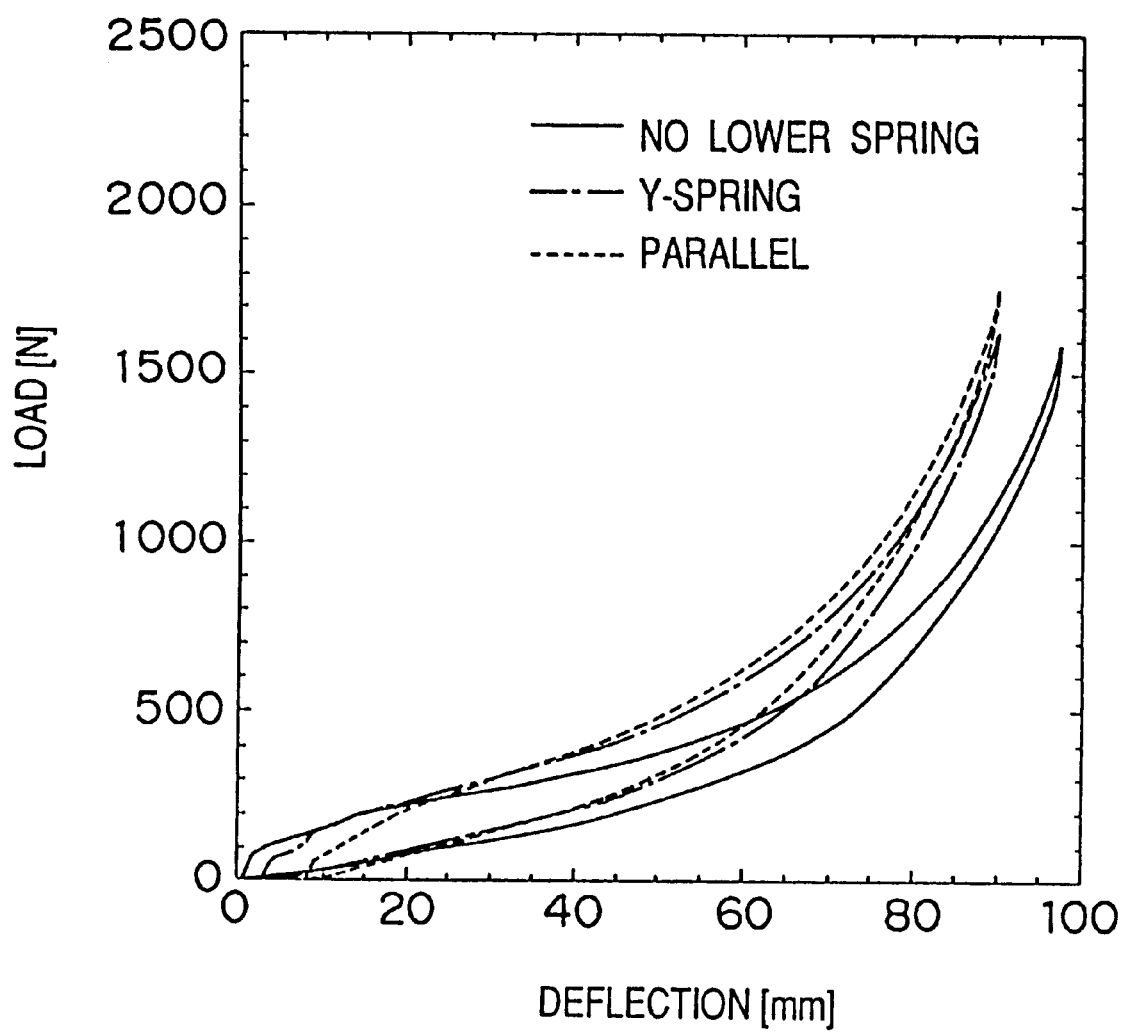
FIG. 74 is a graph showing static characteristics of the vibration mechanism of FIG. 73 and those of other vibration mechanisms according to the present invention.

FIG. 74 depicts static characteristics of the vibration mechanism M5', that of the vibration mechanism M5 of FIG. 59 with the lower coil spring 116 removed, and that of a vibration mechanism (not shown) having a plurality of lower coil springs 116 extending parallel to one another.

As can be seen from this graph, the static characteristics can be appropriately changed by the form (Y-shape, parallel and the like) of the lower coil springs, and optimization of the load-deflection curves can be accomplished depending on the input conditions or load to be set.

Figure 75:
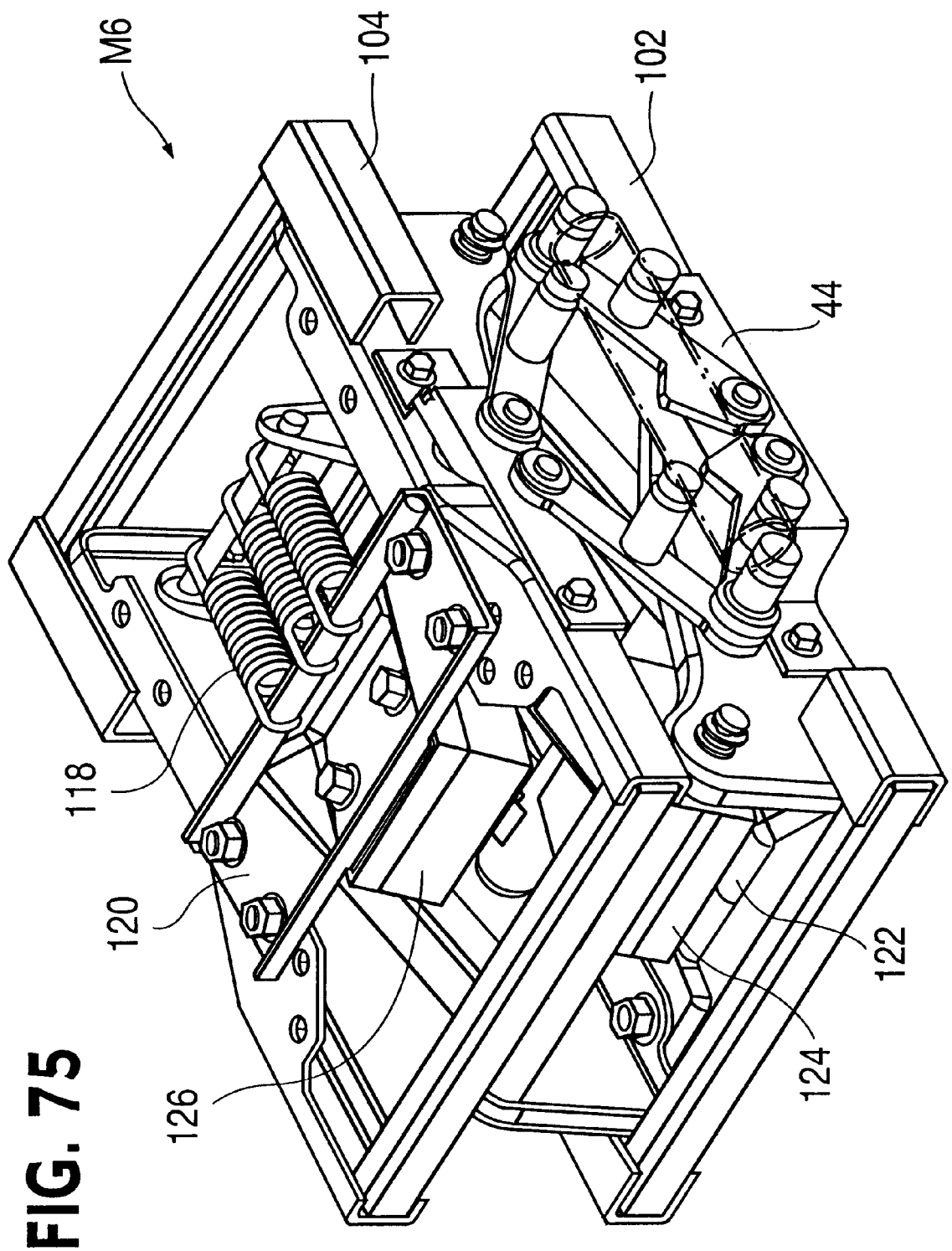
FIG. 75 is a perspective view of a vibration mechanism having a magnetic spring according to a sixth embodiment of the present invention.
Figure 76:
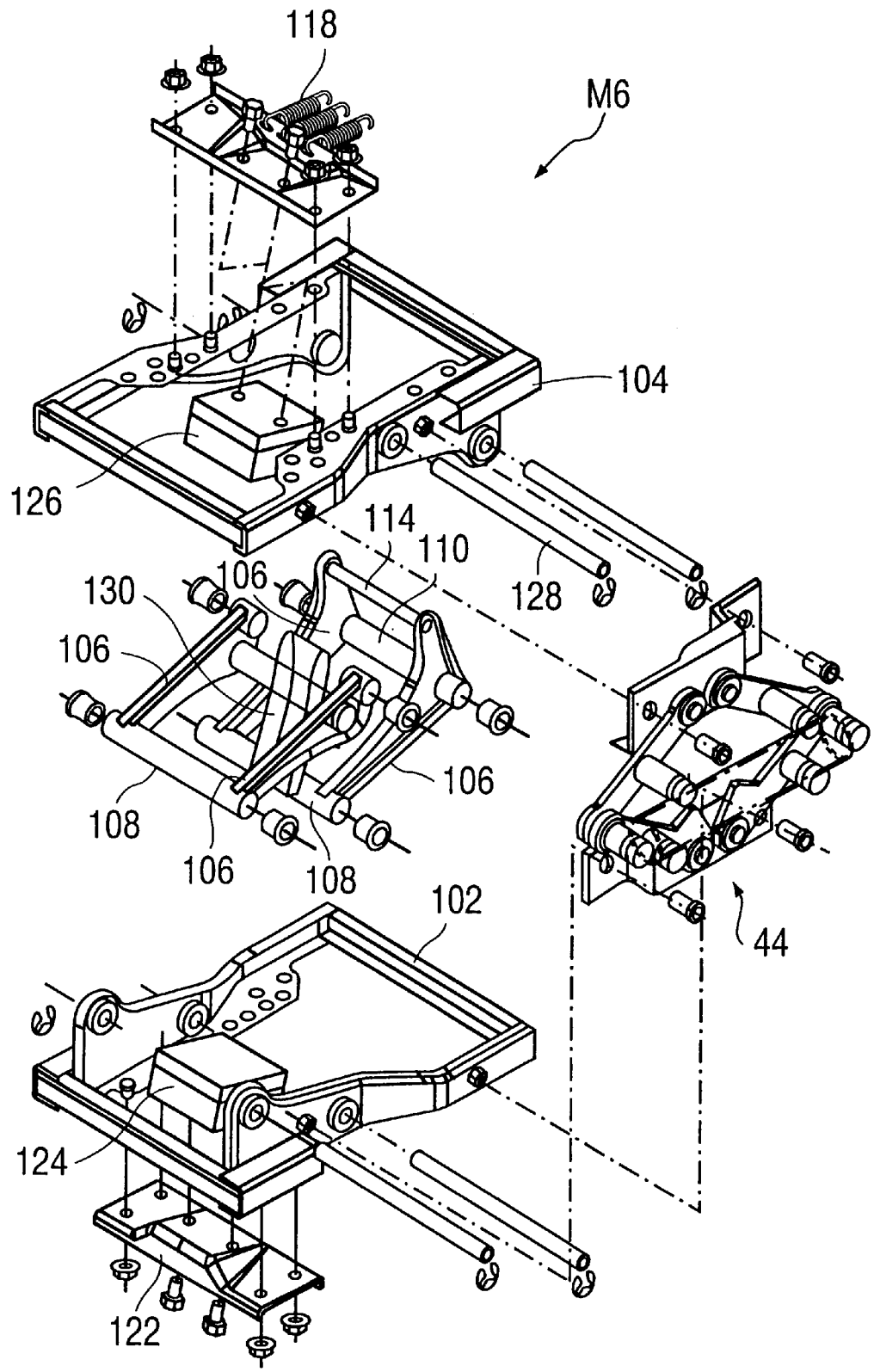
FIG. 76 is an exploded perspective view of the vibration mechanism of FIG. 75.

FIGS. 75 and 76 depict a vibration mechanism M6 having a magnetic spring according to a sixth embodiment of the present invention, which is of substantially the same construction as the vibration mechanism of FIG. 59 in which the lower coil spring 116 is removed and the opposite ends of one of the pantograph-type link mechanisms 44 are pivotally connected to the lower frame 102 and the upper frame 104, respectively, on one side thereof.

Figure 77:
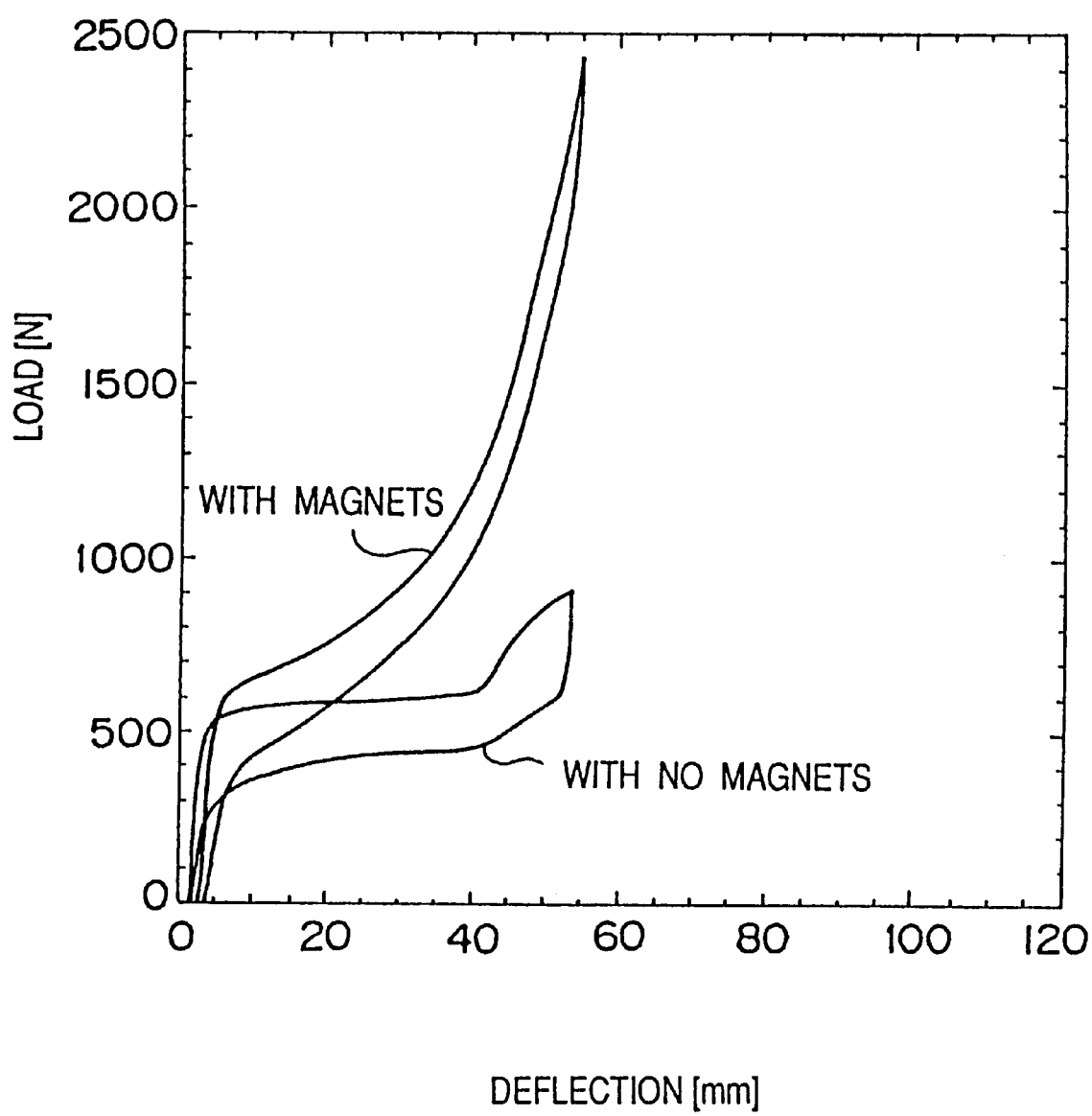
FIG. 77 is a graph showing static characteristics of the vibration mechanism of FIG. 75 and static characteristics when no permanent magnets were attached thereto.

FIG. 77 depicts static characteristics of the vibration mechanism M6 of the above-described construction and those of the vibration mechanism M6 when the permanent magnets have been removed. As can be seen from the graph of FIG. 77, when no permanent magnets have been attached, the static characteristics are generally flat and weight adjustments are required, whereas attachment of the permanent magnets enlarges the range of load that can be supported thereby, requires no weight adjustments, and improves the vibration isolation characteristics. The reason for this is that the characteristics of the magnetic spring and those of the metal springs on which the magnetic spring does not exert much influence function separately in dynamic characteristics.

Figure 78:
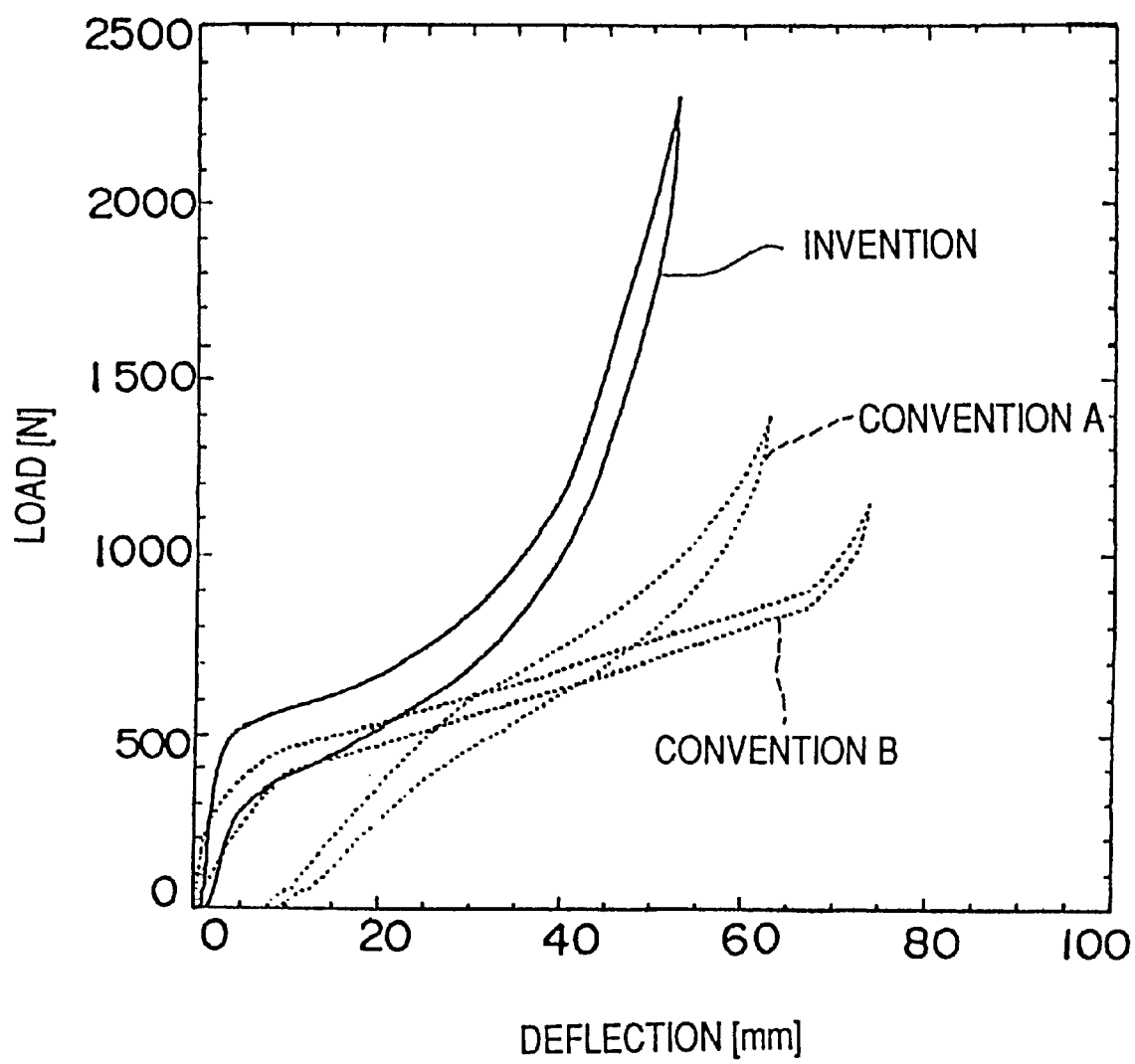
FIG. 78 is a graph showing static characteristics of the vibration mechanism of FIG. 75 and those of conventional mechanisms.
Figure 79:
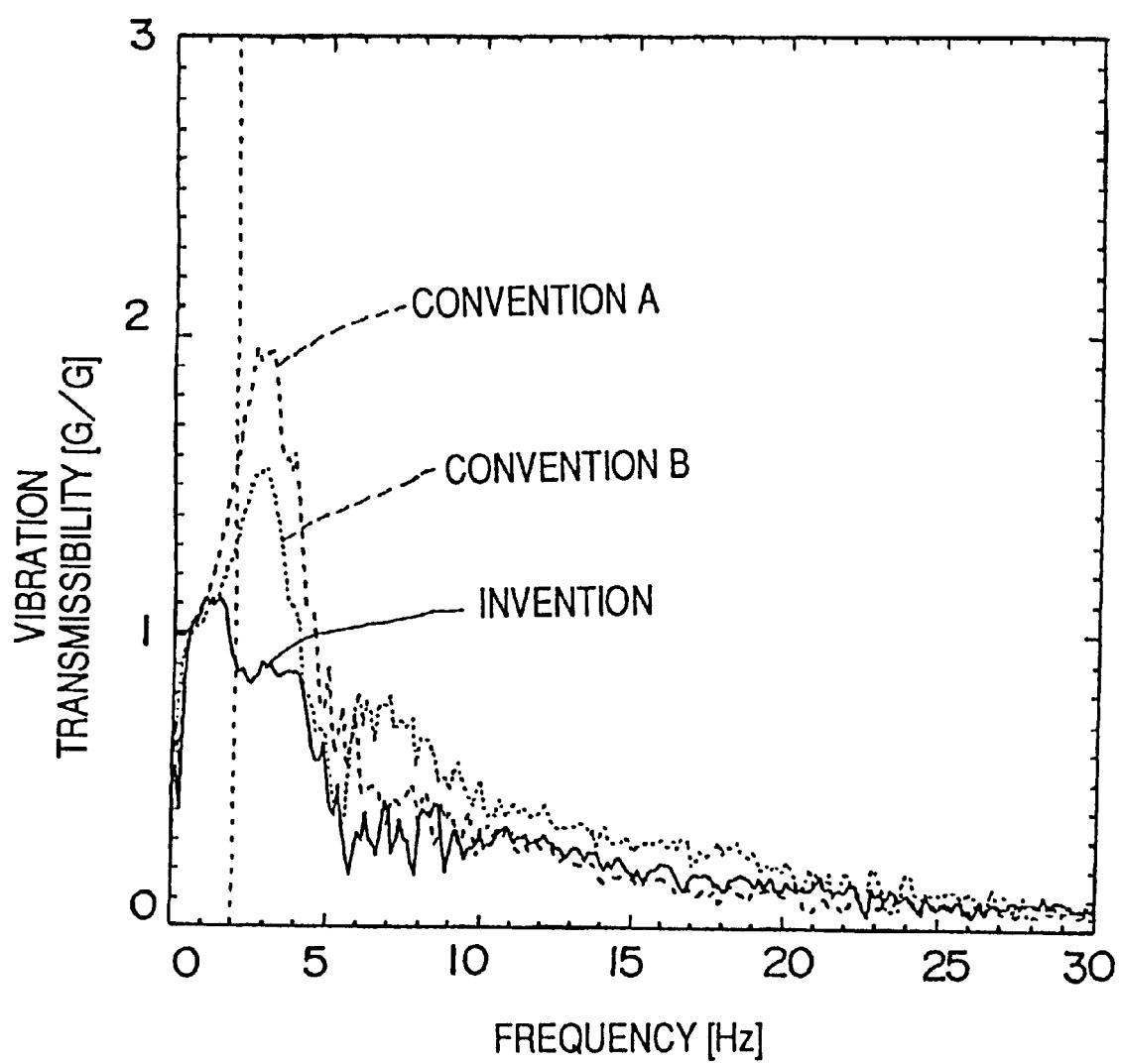
FIG. 79 is a graph showing dynamic characteristics of the vibration mechanism of FIG. 75 and those of the conventional mechanisms.

FIG. 78 depicts static characteristics of the vibration mechanism M6 and those of conventional mechanisms, while FIG. 79 depicts dynamic characteristics when a random wave has been inputted thereto. The conventional mechanisms A and B described in both the figures are a rubber suspension and a metal-spring suspension, respectively. In the case of the vibration mechanism M6, not only the stroke is small, but also the vibration transmissibility is reduced under the influence of a phase lag or reverse phase particularly in a low-frequency region of 0–10 Hz, compared with the conventional mechanisms.

In the above-described vibration mechanism M6, if a belt 130 is passed around the hollow shaft 108 to which the lower ends of the rear levers 106 are secured and the rod 128 to which the front levers 106 are pivotally connected to restrict the stroke of the vibration mechanism M6, the vibration mechanism can be made thin and no weight adjustments are required.

Figure 80:
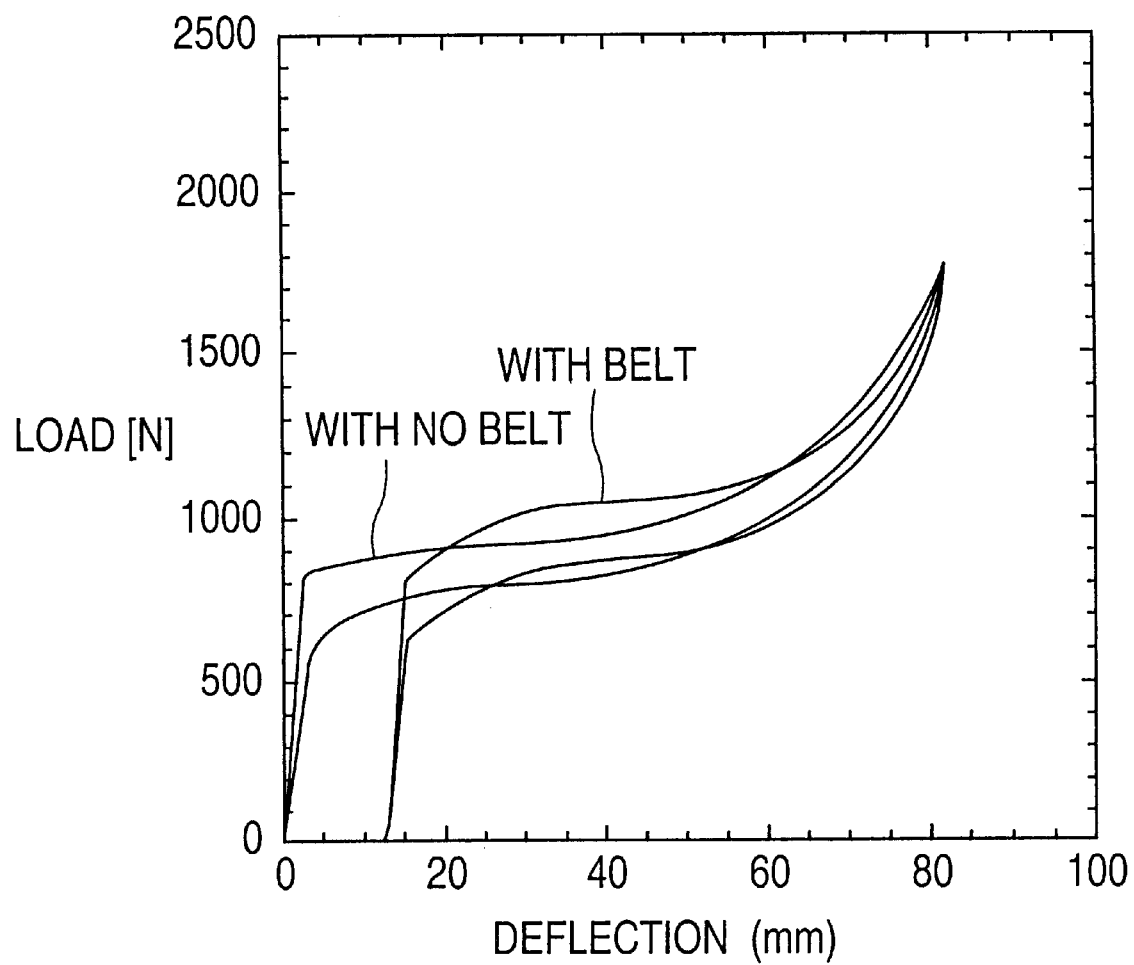
FIG. 80 is a graph showing static characteristics of the vibration mechanism of FIG. 75 when the stroke thereof was restricted.

Because such a belt 130 is applicable to each of the vibration mechanisms M1 to M5 according to the first to fifth embodiments of the present invention, static characteristics of the vibration mechanism M2 to which the belt 130 has been incorporated is depicted in FIG. 80 for reference.

As described above, according to the present invention, an upper frame is vertically movably mounted on a lower frame via link mechanisms and is supported by at least two permanent magnets and a plurality of coil springs, wherein the total spring constant of the permanent magnets and the coil springs is partially set to a negative value or substantially zero, thereby making it possible to make a balanced point unstable to cause a reverse phase. The unstable balanced point has a tendency to give rise to acceleration, and an unstable condition at a bottom dead point is brought into a stable condition by the magnetic spring. At a top dead point, the upper frame can be returned to the stable condition by decelerating or attenuating it with the use of rubber or the like, thus making it possible to realize a simple and inexpensive vibration isolator unit or exciting unit.

Furthermore, a phase lag or reverse phase is caused in a low-frequency region, in which the vibration energy is small, by setting the total spring constant to be greater than about −1 kg/mm, thus providing a simple and inexpensive vibration isolator unit.

When each of the link mechanisms includes a parallel link and when the vibration transmissibility at frequencies of 2 to 10 Hz is suppressed below 1 G/G, low-frequency vibrations can be effectively attenuated.

When the total spring constant is set to be greater than about −2 kg/mm, it is possible to accelerate return of one of the upper and lower frames to the other after the upper and lower frames have approached each other. By so doing, the upper frame can be pushed up against the gravity thereof, making it possible to manufacture a simple and inexpensive machine for use in an amusement park.

The vibration mechanism according to the present invention can be designed such that when the vibration transmissibility at frequencies of 2 to 10 Hz, in which the amplitude is relatively large, is below 1 G/G and when the vibration transmissibility in a high-frequency region over 10 Hz, in which the amplitude is relatively small but the acceleration is large, is about 1 G/G. By this construction, low-frequency vibrations are suppressed, and high-frequency vibrations can be reduced by means of the characteristics of highly elastic urethane.

When each of the link mechanisms is constituted by a plurality of X-or Y-shaped links or a pantograph-type link mechanism, a suspension unit of a simple construction can be manufactured at a low cost.

Also, when the total spring constant of the permanent magnets and the springs is set below 2 kg/mm, the vibration isolating performance in a low-frequency region can be improved. In that case, each of the link mechanisms can be constituted by a parallel link, at least one X-shaped link, a plurality of Y-shaped links, or a combination of such link or links with a pantograph-type link mechanism, making it possible to manufacture a suspension unit of a simple construction at a low cost.

In the case where the two permanent magnets having the same magnetic poles opposed to each other are inclined, the amount of change in static magnetic energy can be effectively converted into the lifting force of the upper frame, making it possible to provide a vibration mechanism in which a phase lag or reverse phase or a braking force is utilized.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A vibration mechanism having a magnetic spring and used for an automobile suspension unit, comprising:

a lower frame mounted on a vibration-source side;

an upper frame vertically movably mounted on said lower frame;

a plurality of link mechanisms for connecting said lower frame and said upper frame;

at least two permanent magnets mounted on said lower frame and said upper frame, respectively, with same magnetic poles opposed to each other; and a plurality of springs connected to said link mechanisms to produce a lifting force of said upper frame, wherein a vibration transmissibility at frequencies of 2 to 10 Hz is below 1 G/G, a vibration transmissibility in a high-frequency region over 10 Hz is about 1 G/G, said at least two permanent magnets are inclined to said upper frame and said lower frame, respectively, and a force acting in parallel with opposing surfaces of said at least two permanent magnets and generated when a vertical movement of said upper frame relative to said lower frame changes an opposing area of said at least two permanent magnets is utilized as the lifting force of said upper frame.

2. A vibration mechanism having a magnetic spring and used for an automobile suspension unit, comprising:

a lower frame mounted on a vibration-source side;

an upper frame vertically movably mounted on said lower frame;

a plurality of link mechanisms for connecting said lower frame and said upper frame;

at least two permanent magnets mounted on said lower frame and said upper frame, respectively, with same magnetic poles opposed to each other; and a plurality of springs connected said link mechanisms to produce a lifting force of said upper frame, wherein a total spring constant of said permanent magnets and said springs is set below 2 kg/mm, said at least two permanent magnets are inclined to said upper frame and said lower frame, respectively, and force acting in parallel with opposing surfaces of said at least two permanent magnets and generated when a vertical movement of said upper frame relative to said lower frame changes an opposing area of said at least two permanent magnets is utilized as the lifting force of said upper frame.

* * * * *